(12) United States Patent
Kobara

(10) Patent No.: US 7,773,609 B2
(45) Date of Patent: Aug. 10, 2010

(54) OVERLAY NETWORK SYSTEM WHICH CONSTRUCTS AND MAINTAINS AN OVERLAY NETWORK

(75) Inventor: Makoto Kobara, Fuchu (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 55 days.

(21) Appl. No.: 12/332,749

(22) Filed: Dec. 11, 2008

(65) Prior Publication Data

US 2009/0154476 A1 Jun. 18, 2009

(30) Foreign Application Priority Data

Dec. 13, 2007 (JP) ............................. 2007-322468

(51) Int. Cl.
*H04L 12/56* (2006.01)
(52) U.S. Cl. ........................ 370/400; 370/401; 370/398
(58) Field of Classification Search ................. 370/401, 370/392, 328; 709/223, 204, 249
See application file for complete search history.

(56) References Cited

U.S. PATENT DOCUMENTS

| 5,878,232 | A * | 3/1999 | Marimuthu ................. 709/249 |
|---|---|---|---|
| 6,366,554 | B1 * | 4/2002 | Isaksson et al. ............. 370/206 |
| 6,366,582 | B1 * | 4/2002 | Nishikado et al. .......... 370/401 |
| 7,454,488 | B2 * | 11/2008 | Wechter et al. ............. 709/223 |
| 7,561,571 | B1 * | 7/2009 | Lovett et al. ................ 370/392 |
| 7,613,796 | B2 * | 11/2009 | Harvey et al. ............... 709/220 |
| 7,633,942 | B2 * | 12/2009 | Bearden et al. ............. 370/392 |
| 7,667,572 | B2 * | 2/2010 | Husak et al. ................ 340/10.1 |
| 2003/0091165 | A1 * | 5/2003 | Bearden et al. .......... 379/88.08 |
| 2008/0168135 | A1 * | 7/2008 | Redlich et al. ............. 709/204 |
| 2008/0186965 | A1 * | 8/2008 | Zheng et al. ............... 370/389 |
| 2009/0010204 | A1 * | 1/2009 | Pratt et al. .................. 370/328 |

FOREIGN PATENT DOCUMENTS

JP 2004-266796 9/2004

OTHER PUBLICATIONS http://p2p.cs.ucsb.edu/chimera, p. 1 of 1, (Dec. 19, 2008).
http://research.microsoft.com/~antr/PAST/default.htm, p. 1 of 1, (Dec. 19, 2008).
http://pdos.csail.mit.edu/chord, 2 pages, (Dec. 19, 2008).
Zhao, et al., "Tapestry: A Resilient Global-Scale Overlay for Service Deployment", IEEE Journal on Selected Areas in Communications, vol. 22, No. 1, pp. 1-15, (Jan. 2004).

(Continued)

*Primary Examiner*—Thong H Vu
(74) *Attorney, Agent, or Firm*—Finnegan, Henderson, Farabow, Garrett & Dunner, L.L.P.

(57) ABSTRACT

An overlay network system comprises an overlay network composed of a plurality of nodes and a plurality of sub-overlay networks each of which is composed of a subset of the plurality of nodes and which are hierarchized. The overlay network is managed as a 0th-level sub-overlay network at the highest hierarchical level. Each of the plurality of sub-overlay networks is allocated a sub-overlay network ID whose number of bits corresponds to the hierarchical level of the network. The high-order one or more bits in the sub-overlay network ID also indicate the sub-overlay network ID of a sub-overlay network at the high hierarchical level corresponding to the number of the one or more bits.

19 Claims, 23 Drawing Sheets

OTHER PUBLICATIONS

Rowstron, et al., "Storage Management and Caching in Past, A Large-Scale, Persistent Peer-To-Peer Storage Utility", 18$^{th}$ ACM SOSP'01, pp. 1-13, (Nov. 2001).

Stoica, et al., "Chord: A Scalable Peer-To-Peer Lookup Service for Internet Applications", ACM SIGCOMM'01, pp. 1-12, (Aug. 27-31, 2001).

* cited by examiner

| Symbol | |
|---|---|
| M | 3 |
| id | 111(Binary number representation) |
| mask | 2 |
| addr | 192.168.0.1(IPv4 address representation) |

| Symbol | | | |
|---|---|---|---|
| table | [0] | .id | 000(Binary number representation) |
| | | .addr | 10.0.1.1(IPv4 address representation) |
| | [1] | .id | 100 |
| | | .addr | 192.168.1.5 |
| | ... | | |
| | [mask] | .id | 110 |
| | | .addr | 192.168.100.3 |

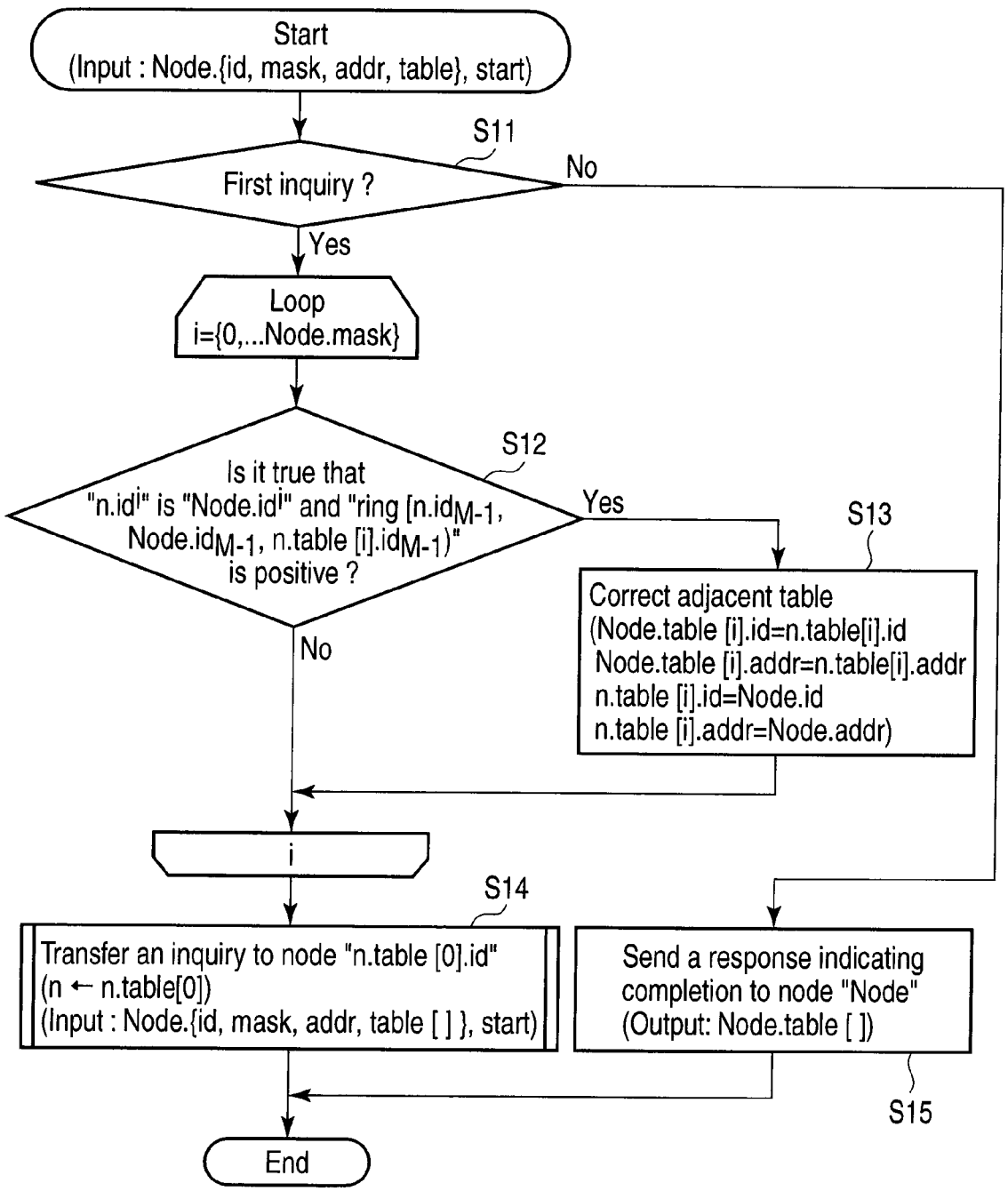
F I G. 8

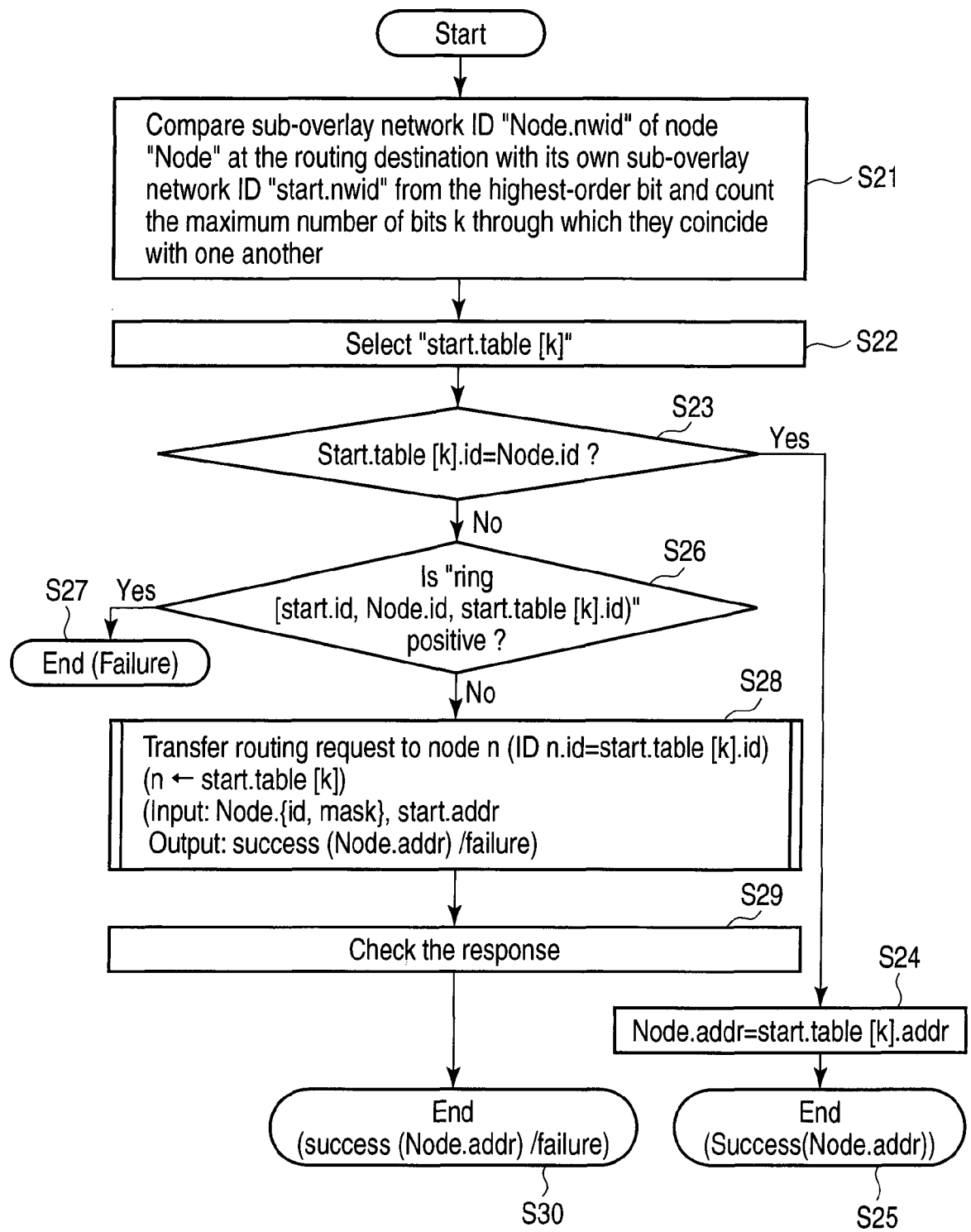
F I G. 9

| Symbol | |
|---|---|
| M | 3 |
| id | 111(Binary number representation) |
| mask | 2 |
| addr | 192.168.0.1(IPv4 address representation) |

| Symbol | | | |
|---|---|---|---|
| successor | [0] | .id | 000(Binary number representation) |
| | | .addr | 10.0.1.1(IPv4 address representation) |
| | [1] | .id | 100 |
| | | .addr | 192.168.1.5 |
| | ... | | |
| | [mask] | .id | 110 |
| | | .addr | 192.168.100.3 |

| Symbol | | | |
|---|---|---|---|
| predecessor | [0] | .id | 110(Binary number representation) |
| | | .addr | 192.168.100.3 |
| | [1] | .id | 110 |
| | | .addr | 192.168.100.3 |
| | ... | | |
| | [mask] | .id | 110 |
| | | .addr | 192.168.100.3 |

| Skip table |
|---|

FIG. 11

| Symbol | | | | |
|---|---|---|---|---|
| skip | [0] | [0] | .start | 000(Binary number representation) |
| | | | .interval_s | 000(Binary number representation) |
| | | | .interval_e | 001(Binary number representation) |
| | | | .successor .id | 000(Binary number representation) |
| | | | .successor .addr | 10.0.1.1(IPv4 address representation) |
| | | ... | | |
| | | [mask] | .start | 011 |
| | | | .interval_s | 011 |
| | | | .interval_e | 111 |
| | | | .successor .id | 011 |
| | | | .successor .addr | 10.0.1.1 |
| | [1] | [0] | .start | 100 |
| | | | .interval_s | 100 |
| | | | .interval_e | 101 |
| | | | .successor .id | 100 |
| | | | .successor .addr | 192.168.1.5 |
| | | ... | | |
| | | [mask] | .start | 101 |
| | | | .interval_s | 101 |
| | | | .interval_e | 111 |
| | | | .successor .id | 110 |
| | | | .successor .addr | 192.168.100.3 |
| | [mask] | [0] | .start | 110 |
| | | | .interval_s | 110 |
| | | | .interval_e | 111 |
| | | | .successor .id | 110 |
| | | | .successor .addr | 192.168.100.3 |

FIG. 12

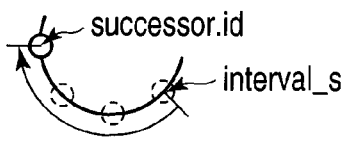

FIG. 13

| Symbol | |
|---|---|
| M | 3 |
| K | 5 |
| id | 110(Binary number representation) |
| subid | 10011(Binary number representation) |
| mask | 2 |
| data | (Data stored in object) |

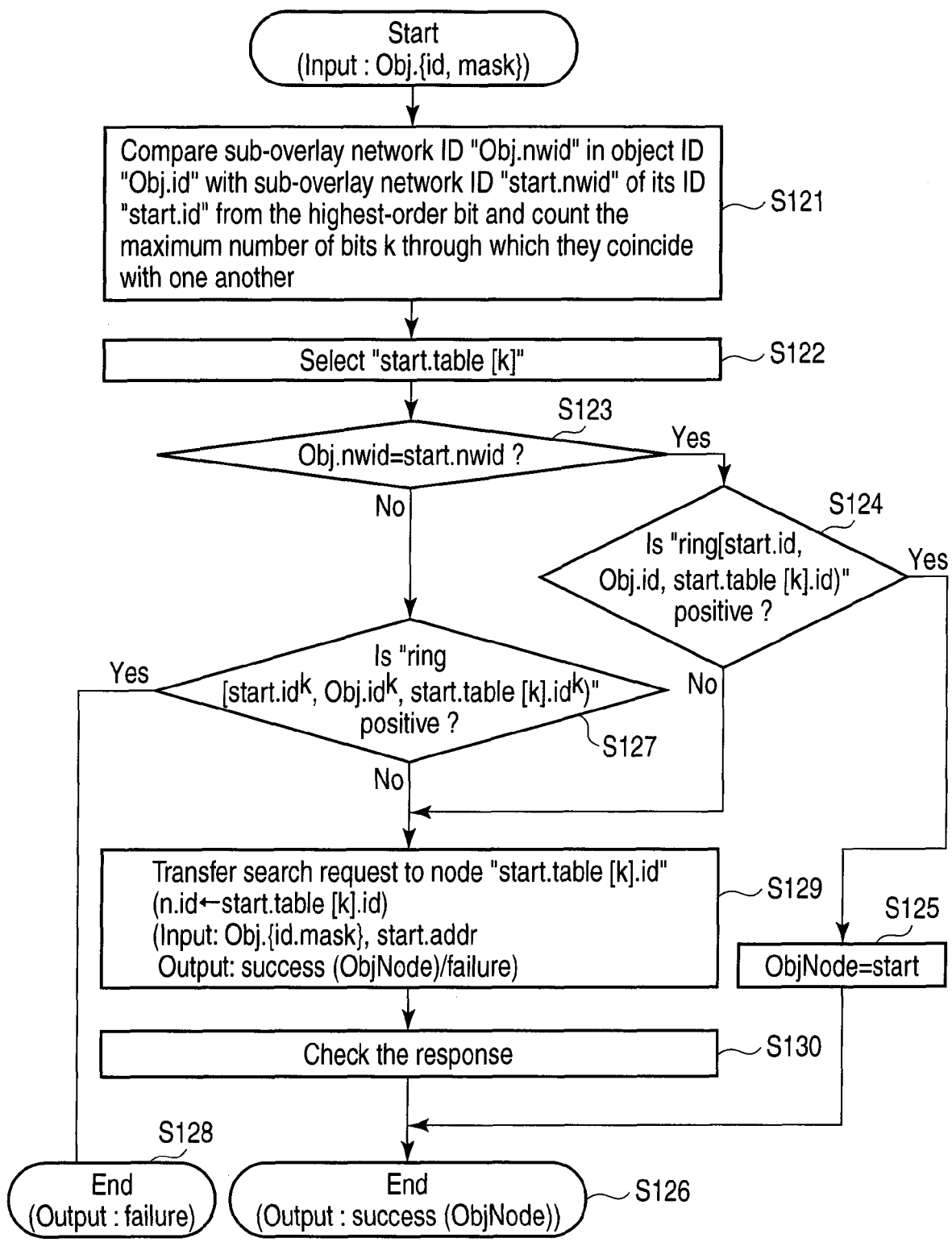
F I G 2 4

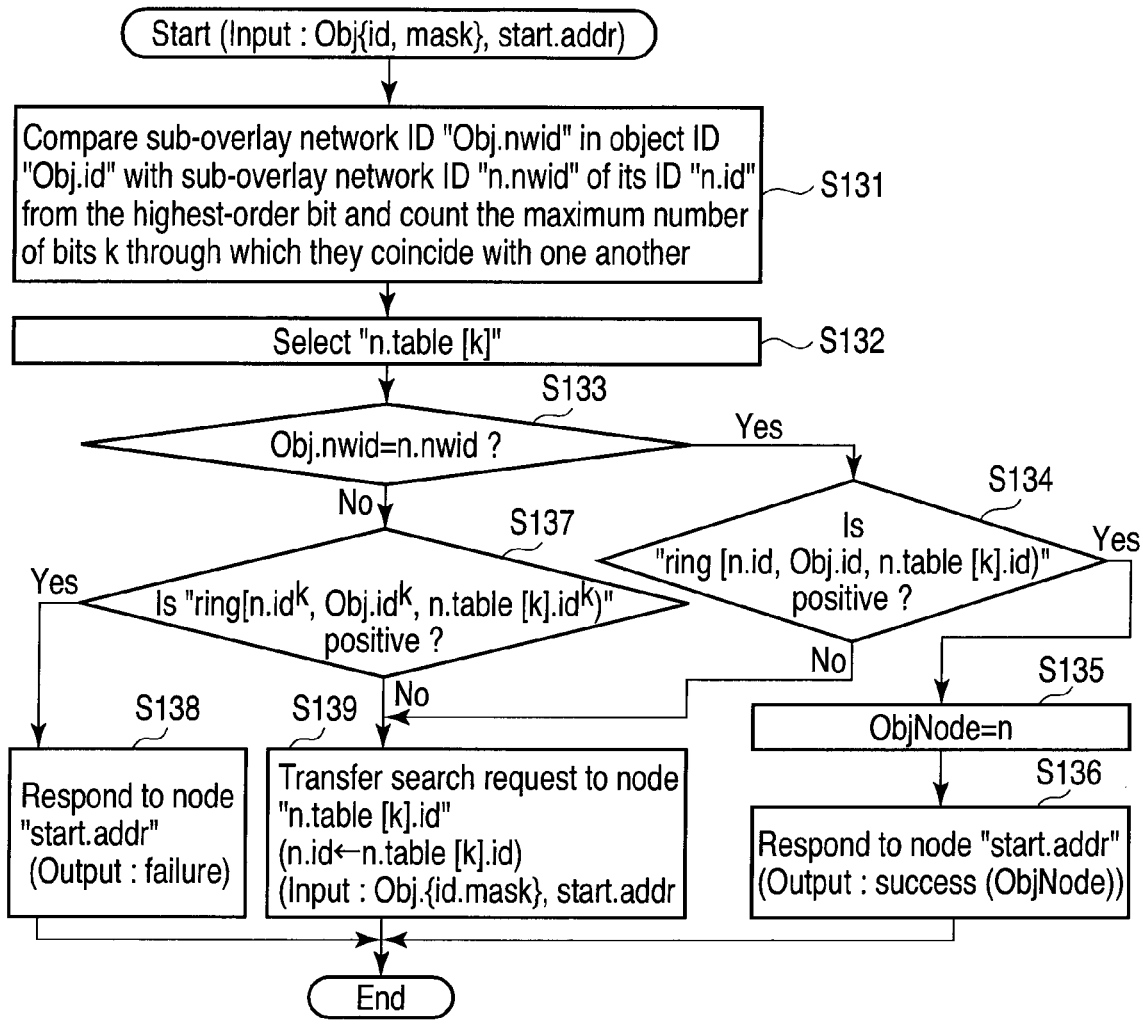
F I G. 2 5
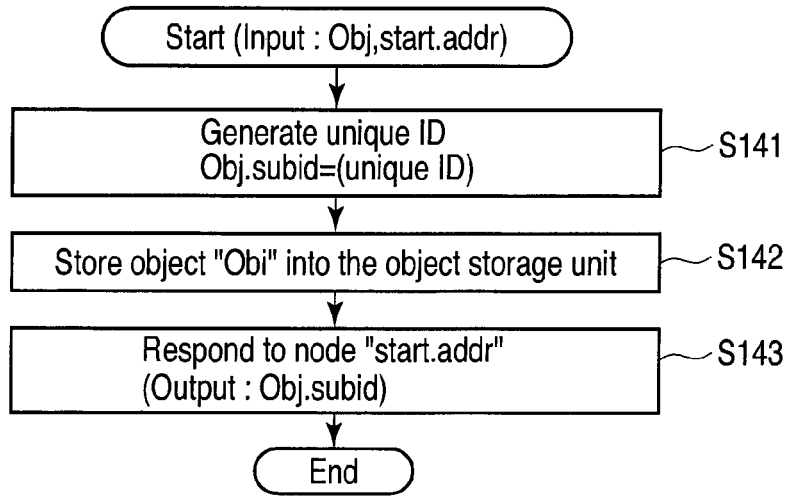
F I G. 2 6

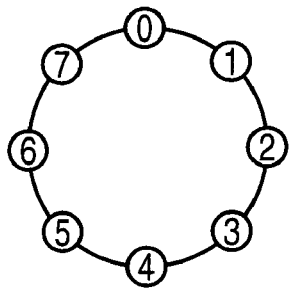
F I G. 2 8 ( PRIOR ART )
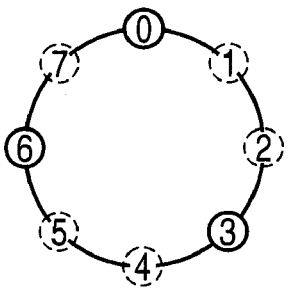
F I G. 2 9 ( PRIOR ART )
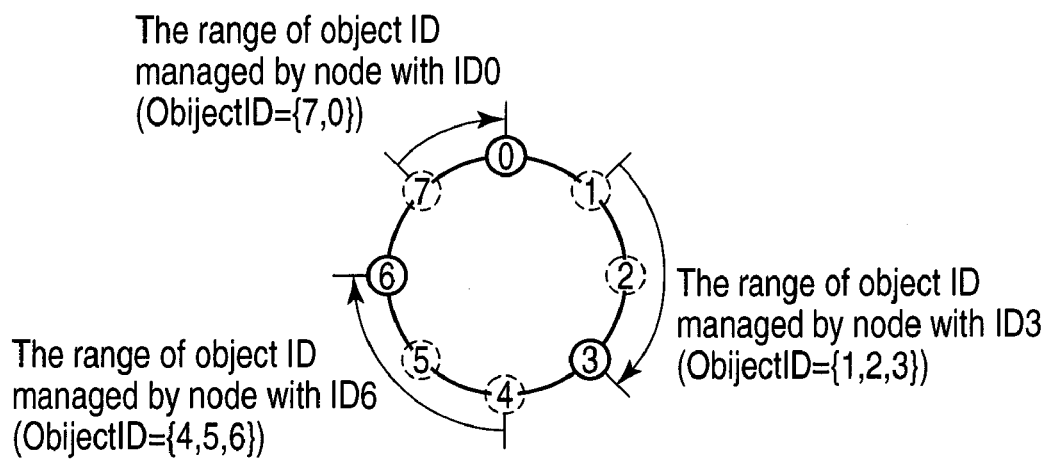
F I G. 3 0 ( PRIOR ART )

OVERLAY NETWORK SYSTEM WHICH CONSTRUCTS AND MAINTAINS AN OVERLAY NETWORK

CROSS-REFERENCE TO RELATED APPLICATIONS

This application is based upon and claims the benefit of priority from prior Japanese Patent Application No. 2007-322468, filed Dec. 13, 2007, the entire contents of which are incorporated herein by reference.

BACKGROUND OF THE INVENTION

1. Field of the Invention

One embodiment of the invention relates to an overlay network system which constructs and maintains an overlay network.

2. Description of the Related Art

Recently, increasing research and development efforts have been directed toward a method of constructing and maintaining an overlay network of peer-to-peer systems (P2P systems) or toward a system using the method. As such a method, for example, Tapestry, Pastry, and Chord have particularly attracted attention.

Tapestry has been developed mainly by the University of California at Berkeley (UCB). Tapestry has been disclosed in, for example, http://p2p.cs.ucsb.edu/chimera/ (hereinafter, referred to as document 1) and Ben Y. Zhao, Ling Huang, Jeremy Stribling, Sean C. Rhea, Anthony D. Joseph, and John D. Kubiatowics, "Tapestry: A Resilient Global-Scale Overlay for Service Deployment," IEEE Journal on Selected Areas in Communications, Vol 22, No. 1, 2004 (hereinafter, referred to as document 2).

Pastry has been developed mainly by Microsoft Corporation. Pastry has been disclosed in, for example, http://research.microsoft.com/~antr/PAST/default.htm (hereinafter, referred to as document 3) and A. Rowstron and P. Druschel, "Storage management and caching in PAST, a large-scale, persistent peer-to-peer storage utility," 18th ACM SOSP' 01, Lake Louise, Alberta, Canada, 2001 (hereinafter, referred to as document 4).

Chord has been developed mainly by the Massachusetts Institute of Technology (MIT). Chord has been disclosed in, for example, http://pdos.csail.mit.edu/chord/ (hereinafter, referred to as document 5) and Ion Stoica, Robert Morris, David Karger, M. Frans Kaashoek, and Hari Balakrishnan, "Chord: A Scalable Peer-to-peer Lookup Service for Internet Applications," ACM SIGCOMM 2001, 2001 (hereinafter, referred to as document 6).

These methods have common features in that they construct an overlay network using the ConsistentHashing technique. The ConsistentHashing technique is characterized by managing the proximity of identifiers (IDs) using a ring. The ConstituentHashing technique is composed of a first process and a second process described below.

1) First Process

In a first process, the hash values of the unique identifiers all the nodes and objects have are calculated using a hash function. A node is, for example, a computer. An object is, for example, a file. In the case of a node identifier, the identifier is, for example, a host name or an Internet Protocol address (IP address). In the case of an object identifier, the identifier is the name of the object or data itself. The hash value of a node identifier is referred to as a node ID. The hash value of an object identifier is referred to as an object ID.

2) Second Process

In a second process, an object is stored into a node whose node ID is closest to the object ID of the object.

In the ConsistentHashing technique, to search for a target object, an inquire may be made to search for a node whose node ID is closest to the object ID of the target object. The individual nodes constitute a distribution hash table (DHT).

There are various known methods of defining the proximity of IDs. For example, in the methods disclosed in document 5 and document 6, the hash value of the IP address of a node is defined as a node ID and the hash value of object data itself is defined as an object ID. In such methods, individual IDs are allocated to a ring which can accommodate all the IDs allowed to be used ($2^M$ IDs ranging from 0 to $N=2^M-1$). On the ring, the proximity of two IDs is measured, depending on how far the two IDs are separated in a clockwise direction. A ring which can accommodate $2^M$ IDs is referred to as an M-bit ring.

Hereinafter, the operation of ConsistentHashing described in document 5 and document 6 will be explained using an example. FIG. 28 shows a 3-bit ring. The circles on the ring indicate IDs. The numbers 0 to 7 written in the circles show that the corresponding IDs are ID0 to ID7 (IDs whose values range from 0 to 7). In the example of FIG. 28, an ID closest to ID0 is ID0 itself. An ID next closest to ID0 is ID1. On the other hand, an ID closest to ID7 is ID7 itself. An ID next closest to ID7 is ID0. It should be noted that the ID next closest to ID7 is not ID6.

FIG. 29 shows a state where nodes whose node IDs are {0, 3, 6} are applied to (or participate in) the 3-bit ring of FIG. 28. For the way the individual nodes constitute and maintain the ring, refer to document 5 or 6.

Here, an object whose object ID is "i" (i=1, 2, . . . , 7) is referred to as object i. A node whose node ID is "i" is referred to as node i. As shown in FIG. 29, in a state where the nodes whose node IDs are {0, 3, 6} (i.e., nodes 0, 3, and 6) have participated in the 3-bit ring, for example, object 0 is stored in node 0 to which its ID (ID=0) is closest. Similarly, object 4 is stored in node 6. In a state where nodes participate in the ring, the nodes are virtually connected to the ring.

FIG. 30 shows the range of objects each of the nodes with ID0, ID3, and ID6 (i.e., node 0, node 3, and node 6) stores in the example of FIG. 29. Here, a node whose ID is closest to a certain node ID or object ID (node/object ID) is referred to as a successor. A node whose ID is furthest from (or whose ID is closest counterclockwise to) a certain node ID or object ID is referred to as a predecessor. In the example of FIG. 30, node 6 is the successor of node 3 and the predecessor of node 0. Node 6 is also the successor of object 4 to object 6. As described above, in the method of storing objects in an overlay network using ConsistentHashing, an object is stored into a successor for the object ID of the object.

In the P2P system, an address (or the address of a storage location node) indicating the storage location of an object stored in the overlay network is not stored. For this reason, in order for an object to be taken out of the overlay network, a search on the overlay network has to be made by a multiple hop, using an object ID (or a value or a character string for generating an object ID) as an input. Therefore, in the P2P technique, a balance between the maintenance cost required for the search paths the individual nodes maintain and the search cost of how fast a target node is reached in searching is very important. The known methods of searching for an object include a broadcast method (a first method) and a full flooding method (a second method).

Let the maximum number of nodes the network can accommodate be N. In the first method, the communication cost, storage area, and time depend on value N, value $N^2$, and value 1, as shown by O(N), O($N^2$), and O(1), respectively. It is known that it is necessary to monitor the participating state (participation, separation, abnormal stop) of all the nodes participating in the network.

In the second method, the communication cost, storage area, and time depend on N as shown by O(N), O(N), and O(N), respectively. It is known that the second method has a lower reliability since the full flooding does not function if a failure occurs on the path. Both the first and second method do not function if the size of the overlay network becomes large.

To overcome this problem, for example, document 5 and document 6 have proposed an algorithm for causing each node to prepare an M number of shortcut paths for searching (M=log(N)), thereby completing the reference by an M number of hops of search requests at most. Such a shortcut path is referred to as a skip table (finger table). When an object is referred to, a search request is transferred on the basis of the skip table. For the method of configuring a skip table, refer to document 5 and document 6.

In the ConsistentHashing technique as described in document 5 and document 6, the storage location of an object and the search path are determined by the "proximity" of ID. Therefore, the conventional ConsistentHashing technique has problems with "proximity" and "nonhomogeneity".

<Proximity>

A problem with proximity is how to deal with the difference between the proximity of a P2P overlay network (logical network) and the proximity of, for example, an IP (Internet Protocol) underlay network (physical network). Another problem with proximity is what to do to take a physical network into account in determining a node for storing an object and a path for searching for an object.

<Nonhomogeneity>

A problem with nonhomogeneity is how to determine a storage location for an object, taking into account the characteristics of nodes participating in the overlay network. The characteristics of a node are variations in the capacity and performance of a disk the node has or in the capabilities, including network speed and delay.

As described above, when an overlay network is constructed, it is important to take proximity and nonhomogeneity into account. Active research and development efforts have been directed toward an overlay network. For example, Jpn. Pat. Appln. KOKAI Publication No. 2004-266796 (hereinafter, referred to as document 7) has disclosed a method of constructing an overlay network, taking proximity and non-homogeneity into account. In the method described in document 7, a method of allocating two IDs, "name ID" and "value ID," to a node is combined with a Plaxton algorithm.

However, in the method described in document 7, a node participating in the overlay network has to manage two IDs, its unique name ID and value ID. Moreover, in the method written in document 7, the search cost necessary for an inquiry based on the value ID varies, depending on whether a lexicographic arrangement of name IDs or an arrangement of value IDs is used.

BRIEF SUMMARY OF THE INVENTION

According to one embodiment of the invention, there is provided an overly network system. The overlay network system comprises an overlay network composed of a plurality of nodes and a plurality of sub-overlay networks each of which is composed of a subset of the plurality of nodes. The plurality of sub-overlay networks are hierarchized and included in a hierarchical structure where the overlay network is a 0th-level sub-overlay network at the highest hierarchical level. Each of the plurality of sub-overlay networks is allocated a sub-overlay network ID for identifying said each of the plurality of sub-overlay networks. The number of bits in the sub-overlay network ID corresponds to the hierarchical level of a sub-overlay network to which the sub-overlay network ID is allocated. The high-order one or more bits in the sub-overlay network ID also indicate the sub-overlay network ID of a sub-overlay network whose hierarchical level not only is higher than that of the sub-overlay network allocated the sub-overlay network ID but also corresponds to the number of the one or more bits. Each of the plurality of nodes includes a configuration storage unit, a management module, and a routing module. The configuration storage unit is configured to store an adjacent table. The adjacent table holds IDs and addresses of one or more nodes for each of the hierarchical levels of the sub-overlay networks ranging from a mask-level sub-overlay network to the 0th-level sub-overlay network in the hierarchical structure. The one or more nodes adjoins said each of the plurality of nodes when the IDs of all the nodes included in a sub-overlay network at a corresponding hierarchical level are arranged in a ring in order of magnitude of the IDs. The mask-level sub-overlay network is the deepest-hierarchical-level one of the plurality of sub-overlay networks which includes said each of the plurality of nodes. The management module is configured to manage the ID of said each of the plurality of nodes using the adjacent table. The management module is further configured to manage not only the ID of said each of the plurality of nodes as an ID composed of the sub-overlay network ID of the mask-level sub-overlay network and the node ID of said each of the plurality of nodes but also the sub-overlay network ID of the mask-level sub-overlay network as the sub-overlay network ID of a sub-overlay network in which said each of the plurality of nodes participates. The node ID of said each of the plurality of nodes is distinguishable from node IDs of other nodes included in the mask-level sub-overlay network. The routing module is configured to perform routing for a first node to obtain an address of a second node. The first node is said each of the plurality of nodes and the second node is an arbitrary one of the plurality of nodes. The routing module is further configured to obtain the address of the second node on the basis of information in the adjacent table corresponding to the hierarchical level of a sub-overlay network in which the second node participates or a sub-overlay network including the sub-overlay network in which the second node participates by referring to the adjacent table possessed by the first node, using the ID of the second node as an input.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 8 is a flowchart to help explain an exemplary procedure for updating an adjacent table each of a new participating node and an existing node has in the first embodiment;

FIG. 9 is a flowchart to help explain an exemplary procedure for a node routing an arbitrary node in the first embodiment;

FIG. 11 shows an exemplary data structure of configuration information applied in a second embodiment of the invention;

FIG. 12 shows an exemplary data structure of a skip table included in the configuration information shown in FIG. 11;

FIG. 13 shows the relationship between "skip[j] [i].interval_s" and "skip[j] [i].successor.id" held in the skip table shown in FIG. 12;

FIG. 24 is a flowchart to help explain an exemplary procedure for a node searching process for a node to search for a node in which an object is to be stored in the third embodiment;

FIG. 25 is a flowchart to help explain an exemplary procedure for a node searching process to be executed at a node that has received a search request in the third embodiment;

FIG. 26 is a flowchart to help explain an exemplary procedure for an object storing process to be executed at a node searched for in the third embodiment;

FIG. 28 shows a 3-bit ring used to explain the prior art;

FIG. 29 shows a state where three nodes participate in the ring shown in FIG. 28; and FIG. 30 shows the range of objects each of the three nodes of FIG. 29 stores.

DETAILED DESCRIPTION OF THE INVENTION

Hereinafter, referring to the accompanying drawings, embodiments of the invention will be explained.

First Embodiment

Figure 1:
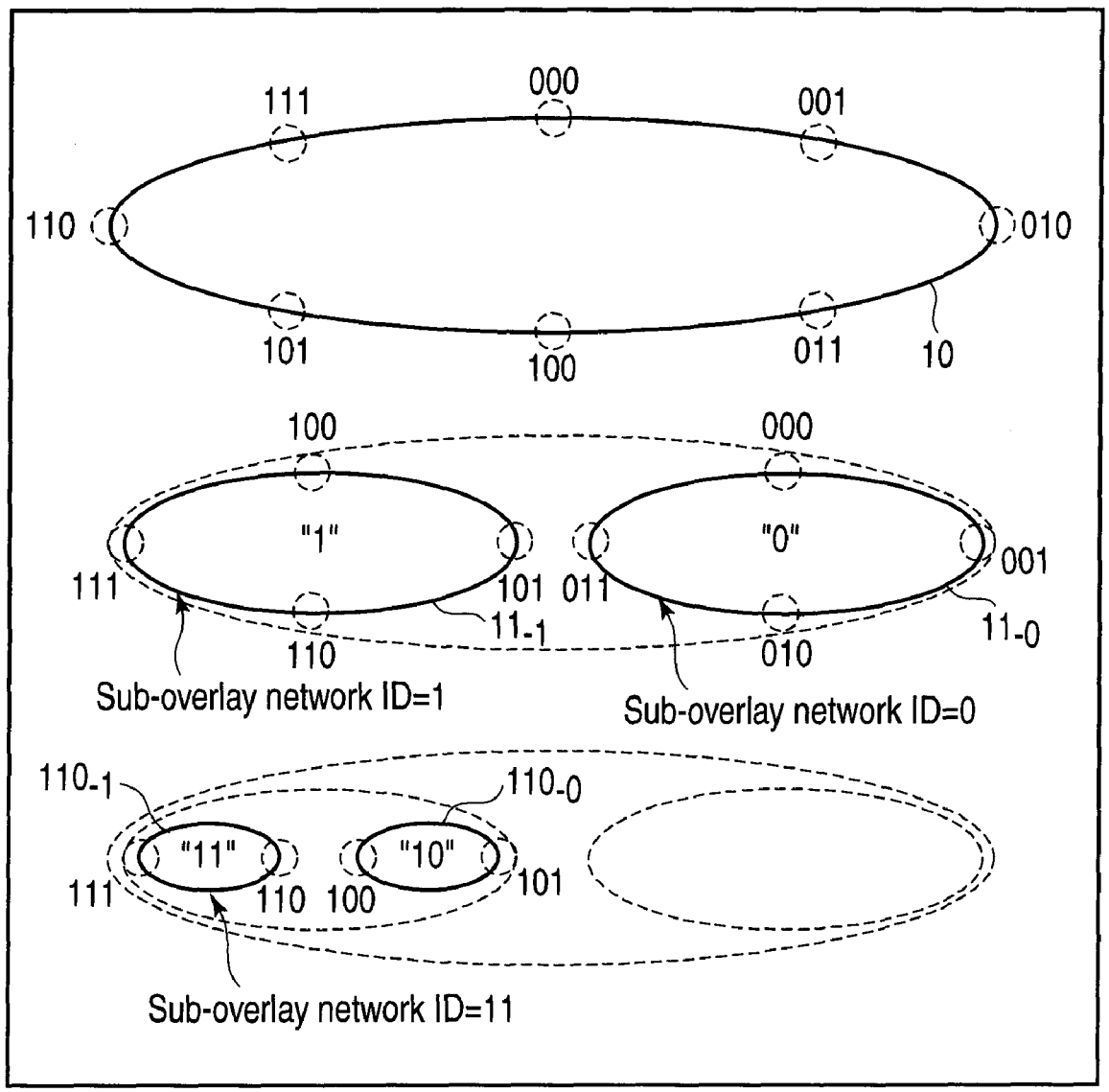
FIG. 1 shows an exemplary hierarchical structure of an overlay network in an overlay network system according to a first embodiment of the invention.

FIG. 1 shows a hierarchical structure of an overlay network in an overlay network system according to a first embodiment of the invention. The overlay network system of FIG. 1 includes an overlay network 10. Suppose the overlay network 10 can accommodate up to 8 nodes. The nodes accommodated by the overlay network 10 may be referred to as nodes participating in the overlay network 10. It is assumed that the IDs of 8 nodes which can be accommodated by (or participate in) the overlay network 10 are 000, 001, 010, 011, 100, 101, 110, and 111 in binary number representation (0, 1, 2, 3, 4, 5, 6, and 7 in decimal number representation). A group of these IDs is represented as ID={000, 001, 010, 011, 100, 101, 110, 111}. These IDs correspond to node IDs in the prior art. As described later, they differ from a node ID applied in the first embodiment. The term ID may be represented as ID "id" (or "ID id") and a node ID may be represented as ID "nid" (or "ID nid").

In the overlay network system of FIG. 1, the overlay network 10 is divided into two sub-overlay networks 11-0 and 11-1, which are then managed. Of the sub-overlay networks 11-0 and 11-1, the sub-overlay network 11-1 is divided into two sub-overlay networks 110-0 and 110-1, which are then managed. Therefore, the overlay network system of FIG. 1 has a hierarchical structure overlay network. In FIG. 1, the broken-line circles on the overlay network 10 and the sub-overlay networks 11-0, 11-1, 110-0, and 110-1 indicate nodes which can be accommodated. A three-digit number written near each circle represents the ID of its node (ID id).

Here, the overlay network 10 is referred to as a 0th-level (the highest-hierarchical-level) sub-overlay network. The sub-overlay networks 11-0 and 11-1 are referred to as first-level sub-overlay networks. The sub-overlay networks 110-0 and 110-1 are referred to as second-level sub-overlay networks.

In the overlay network system of FIG. 1, the nodes (i.e., the nodes constituting the overlay network 10) accommodated by (or participating in) the overlay network 10 are identified using the IDs on the overlay network 10 as described above. The individual nodes carry out various operations in cooperation with one another using the IDs. Actual communication between the individual nodes requires addresses in an underlay network. Therefore, it is necessary to efficiently find the addresses in the underlay network from the IDs on the overlay network. The process of obtaining addresses from the IDs is referred to as routing.

In the first embodiment, the underlay network indicates a network constructed using IP (Internet Protocol). The overlay network 10 indicates a network constructed at a level higher than that of the underlay network. The addresses in the underlay network indicate IP addresses (addr).

Each node accommodated by the overlay network 10 can be accommodated by a plurality of sub-overlay networks differing in hierarchical level. A node accommodated by the deepest-hierarchical-level one of a plurality of sub-overlay networks differing in hierarchical level may be represented as a node participating in the deepest-hierarchical-level sub-overlay network. A node simply accommodated by a sub-overlay network may be represented as a node belonging to or included in a sub-overlay network.

Each node accommodated by the overlay network 10 holds the ID (id) and address (addr) of an adjacent node for the sub-overlay network in which it participates and for the sub-overlay networks of up to the highest hierarchical level (the 0th level) including the sub-overlay network in the hierarchical structure. This enables routing to be performed without going through sub-overlay networks to which the node does not belong as much as possible. When a node belongs to (or participates in) a sub-overlay network, this means that the node belongs to the sub-overlay networks of up to the highest hierarchical level (the 0th level) including the sub-overlay network in the hierarchical structure.

Figure 2:
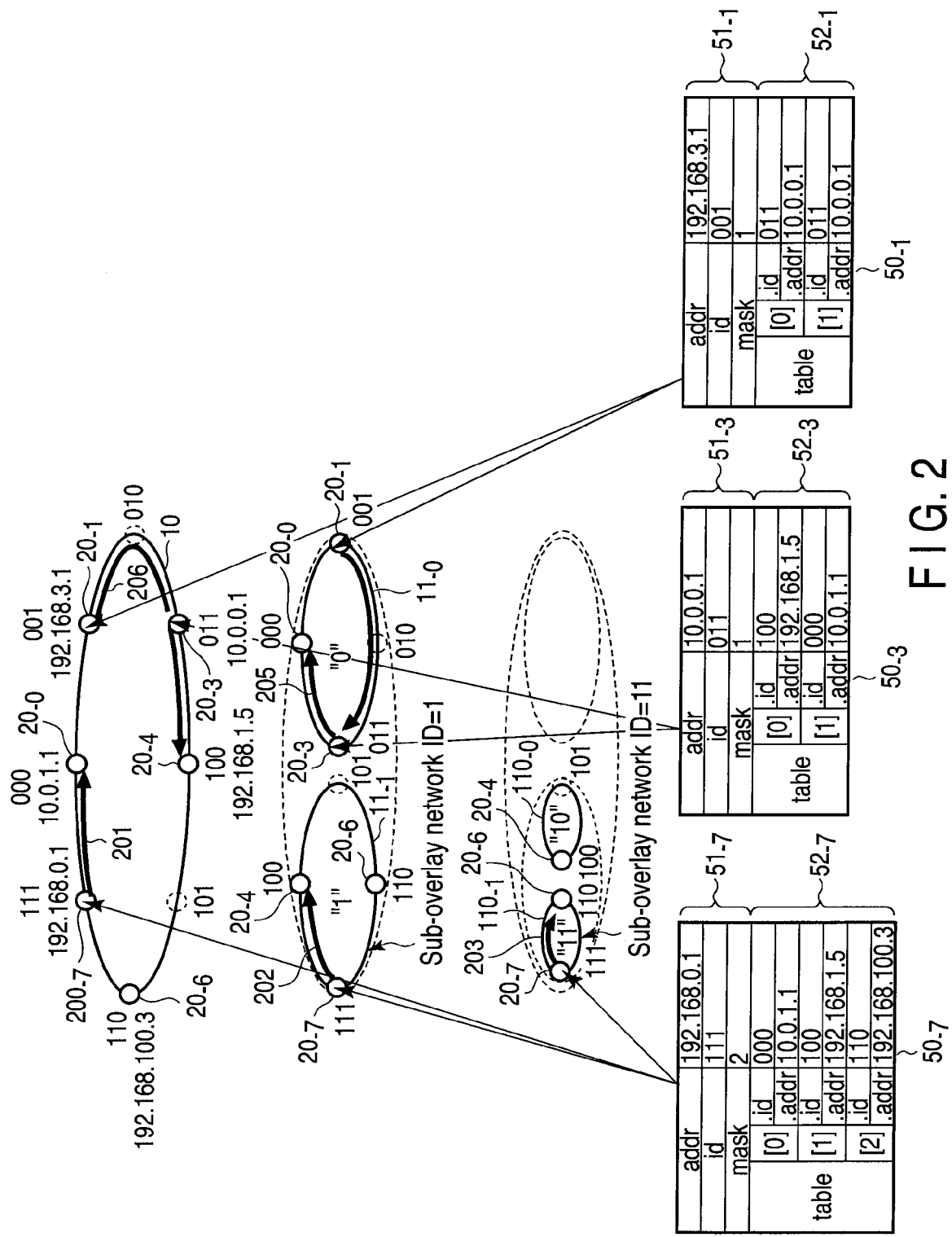
FIG. 2 shows a state where six nodes participate in the overlay network shown in FIG. 1.

FIG. 2 shows a state where six nodes 20-0, 20-1, 20-3, 20-4, 20-6, and 20-7 having IDs represented by ID={000, 001, 011, 100, 110, 111} respectively (that is, nodes 20-0, 20-1, 20-3, 20-4, 20-6, and 20-7 having ID={000, 001, 011, 100, 110, 111} respectively) participate in (or belong to) the overlay network 10 (the 0th-level sub-overlay network 10) of FIG. 1. These nodes 20-0, 20-1, 20-3, 20-4, 20-6, and 20-7 are shown by solid-line circles. Near these circles, the IDs of the corresponding nodes are written together with their addresses (IP addresses). Nodes 20-0, 20-1, and 20-3 belong to sub-overlay network 11-0 and nodes 20-4, 20-6, and 20-7 belong to sub-overlay network 11-1. Of nodes 20-4, 20-6, and 20-7, node 20-4 also belongs to overlay network 110-0 and the remaining nodes 20-6 and 20-7 also belong to sub-overlay network 110-1. In the explanation below, of the sub-overlay networks to which a node belongs, only the deepest-level sub-overlay network may be referred to as the sub-overlay network in which the node participates. As regards the entire overlay network 10, each node (here, each of nodes 20-0, 20-1, 20-3, 20-4, 20-6, and 20-7) is represented as participating in the overlay network 10.

FIG. 2 also shows configuration information 50-t managed by node 20-t (t=7, 3, 1). Specifically, FIG. 2 also shows configuration information 50-7 (t=7) managed by node 20-7 whose ID is "111," configuration information 50-3 (t=3) managed by node 20-3 whose ID is "011," and configuration information 50-1 (t=1) managed by node 20-1 whose ID is "001". Configuration information 50-t will be described later with reference to FIG. 5. As seen from FIG. 5, a part of information (a part of node information 51-t) is omitted from configuration information 50-t (t=7, 3, 1) shown in FIG. 2.

Figure 3:
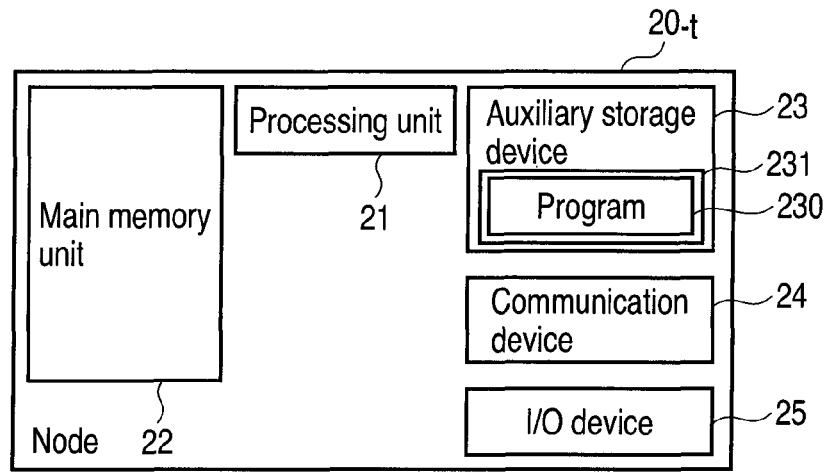
FIG. 3 is a block diagram showing an exemplary hardware configuration of a node shown in FIG. 2.

FIG. 3 shows a hardware configuration of node 20-t. Suppose node 20-5 indicates not only nodes 20-0, 20-1, 20-3, 20-4, 20-6, and 20-7 of FIG. 2 but also nodes (nodes 20-2 and 20-5) capable of participating in the overlay network 10 other than nodes 20-0, 20-1, 20-3, 20-4, 20-6, and 20-7.

In the first embodiment, node 20-t (t=0, 1, . . . , 7) is a computer. Node 20-t includes a processing unit 21, a main memory unit 22, an auxiliary storage device 23, a communication device 24, and an input and output device (I/O device) 25. The auxiliary storage device 23 is composed of, for example, a hard disk drive. In the auxiliary storage device 23, a computer-readable storage medium 231 in which a program 230 has been stored is installed. The program 230 is used for the individual nodes 20-t to construct and maintain the overlay network 10 in cooperation with one another. The communication device 24 communicates, using IP address (an address in the underlay network), with the node specified for, for example, a node search by a controller 26 described later.

Figure 4:
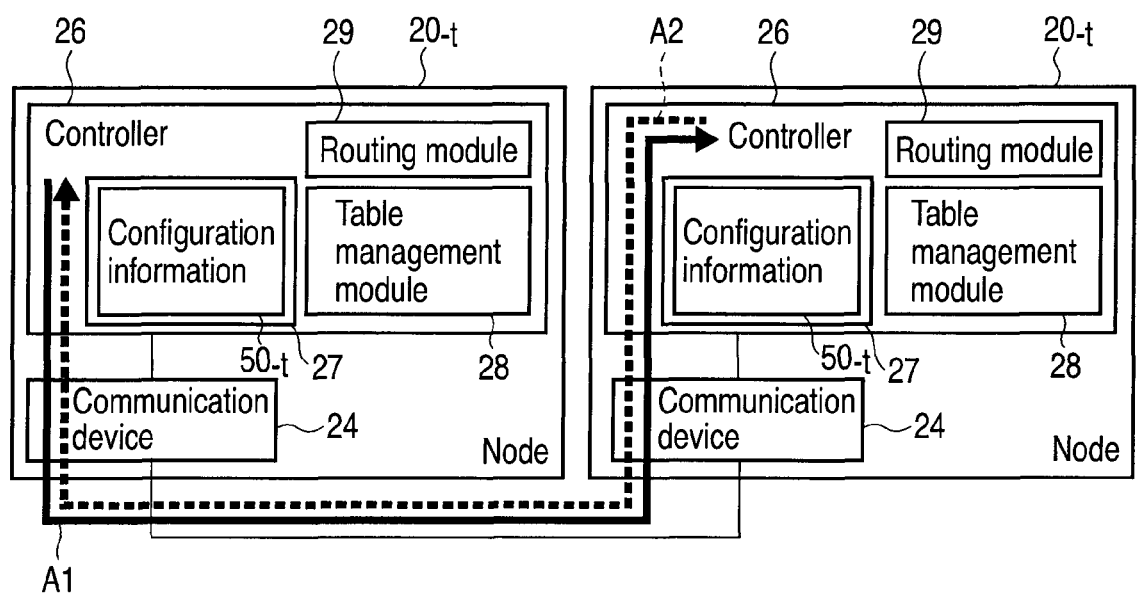
FIG. 4 is a block diagram showing an exemplary functional configuration of a node shown in FIG. 2.

FIG. 4 mainly shows the functional configuration of node 20-t. Node 20-t includes the communication device 24 and controller 26. The controller 26 includes a configuration storage unit 27, a table management module 28, and a routing module 29. The configuration storage unit 27, which is composed of a predetermined storage area of the main storage unit 22 of FIG. 3, is used to store configuration information 50-t described later.

The table management module 28 manages configuration information 50-t (adjacent table 52-t (described later) included in configuration information 50-t) stored in the configuration storage unit 27. The table management module 28, particularly when a new node 20-t participates in the overlay network 10 of FIG. 2, updates adjacent table 52-t included in configuration information 50-t held by each of node 20-t, which includes the table management module 28, and the new node 20-t according to a request (or an inquiry) from the new node 20-t or a request from another node 20-t.

The routing module 29 receives a node search request (a routing request) from another node (the communication device 24 of another node) or a client (not shown) and performs node searching (routing) specified by the request. Node searching (routing) means the process of obtaining the IP address of the node on the basis of the ID of the node specified by the node search request. The node searching is performed using configuration information 50-t.

Node searching is performed by the routing module 29 in the controller 26 by transferring a search request by way of several nodes as shown by arrow A1 in FIG. 4. As shown by arrow A2 in FIG. 4, the controller 26 (the routing module 29 in the controller 26) receives the result of the node searching in response to the node search request. The response of the result of the node searching includes information indicating the success or failure of the node searching. If the node searching has succeeded, the result of the node searching includes the acquired IP address.

In the first embodiment, suppose various modules, including the table management module 28 and routing module 29, included in each node 20-t are realized as a result of the processing unit 21 in the node 20-t of FIG. 2 reading the program 230 stored in the storage medium 231 into the main storage unit 22 in node 20-t and executing the program 230. Alternatively, the various modules may be realized in the form of hardware and/or software modules.

<Configuration Information Held by a Node>

Figures 5, 6:
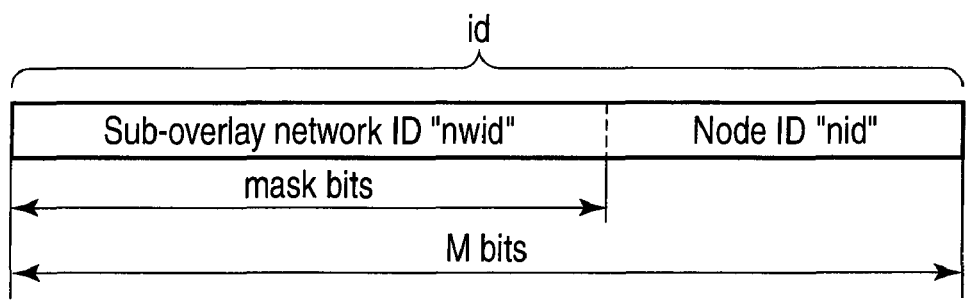
FIG. 5 shows an exemplary data structure of configuration information stored in a configuration storage unit of a node shown in FIG. 4.
FIG. 6 shows an exemplary relationship between "id" and "nid" and "nwid" constituting the "id" and an exemplary number of bits in each of "id," "nid," and "nwid"

FIG. 5 shows an example of the data structure of configuration information 50-t stored in the configuration storage unit 27 of node 20-t shown in FIG. 4. Configuration information 50-t is composed of node information 51-t and an adjacent table 52-t. Node information 51-t is composed of the number of "ID id" bits M, ID "id," the number of mask bits "mask," and IP address "addr".

The number of "ID id" bits M indicates the number of bits in ID "id". The value of M is common to all of the nodes. In the example of FIG. 5, M is 3 (M=3). ID "id" indicates the ID of node 20-t and is unique in the overlay network 10 in which node 20-t participates.

ID "id" is composed of the node ID "id" of node 20-t and a sub-overlay network ID "nwid" for identifying the sub-overlay network in which node 20-t participates. That is, node 20-t has its own node ID "nid" and the sub-overlay network ID "nwid" of the overlay network in which node 20-t participates. Node ID "nid" is a unique ID in the sub-overlay network in which node 20-t participates.

In the first embodiment, the high-order x bits in an M-bit ID "id" (x is one or more) represent the sub-overlay network ID "nwid" of the sub-overlay network in which node 20-t itself participates. The low-order "M−x" bits represent node ID "nid". The x is represented by the number of mask bits "mask" described below. That is, the sub-overlay network ID "nwid" is the high-order "mask" bits in ID "id" and node ID "nid" is the low-order "M-mask" bits in ID "id".

The number of mask bits "mask" indicates the number of mask bits for cutting node ID "nid" and sub-overlay network ID "nwid" out of ID "id". The number of mask bits "mask" may differ from node to node. Moreover, the number of mask bits "mask" also indicates the level (hierarchal level) of the sub-overlay network in which node 20-t participates, that is, the lowest one (the mask level) of the levels of the sub-overlay networks to which node 20-t belongs. In the example of FIG. 5, the number of mask bits "mask" is "mask=x=2". FIG. 6 shows the relationship between "id" (ID "id") and "nid" (node ID "nid") and "nwid" (sub-overlay network ID "nwid") constituting the "id," and the number of bits in each of "id," "nid," and "nwid".

In FIG. 5, the adjacent table 52-5 includes entries (adjacent node information entries) "table[mask]" to "table[0]". Entries "table[mask]" to "table[0]" hold information (adjacent node information) on nodes (adjacent nodes) adjacent to node 20-t on the mask-level sub-overlay network in which node 20-t participates and all of the sub-overlay networks (or all of the sub-overlay networks including the mask-level sub-overlay network) to which node 20-t belongs in a level higher than the mask-level sub-overlay network. That is, adjacent table 52-t has entries "table[mask]" to "table[0]" which hold adjacent node information on nodes adjacent to node 20-t on the sub-overlay networks of the individual levels ranging from the mask-level sub-overlay network to which node 20-t belongs to the 0th-level (the highest-hierarchical-level) sub-overlay network. An adjacent node indicates a node which has an "id" adjacent to the "id" of node 20-t itself in a clockwise direction when the "ids" (ID ids) of all the nodes included in the sub-overlay network of each level are arranged in a ring in ascending order. In the explanation below, the ring may be represented as a ring of sub-overlay networks.

Adjacent node information held in entries "table[mask]" to "table[0]" of adjacent table 52-t includes ID "id" of an adjacent node and its IP address "addr". In the explanation below, "id" and "addr" held in entry "table[i]" (i=0, ... , mask) may be represented as "table[i].id" and "table[i].addr".

In the first embodiment, sub-overlay network ID "nwid" is included in ID "id" of node 20-t, which makes it possible to obtain the IDs of all the sub-overlay networks ranging from the mask level to the 0th level to which node 20-t belongs. The high-order L bits in the sub-overlay network ID "nwid" (0≦L≦mask) indicates a Lth-level sub-overlay network. The 0th-level sub-overlay network represents all of the overlay networks.

For example, suppose node 20-t participates in the sub-overlay network whose sub-overlay network ID "nwid" is "101" (mask=3). This sub-overlay network is a third-level sub-overlay network. The sub-overlay network whose sub-overlay network ID "nwid" is "101" is included in a second-level sub-overlay network whose sub-overlay network ID is "10". The second-level sub-overlay network whose sub-overlay network ID is "10" is included in the 0th-level sub-overlay network whose sub-overlay network ID is "1".

In the first embodiment, since a sub-overlay network is identified using a 1-bit value, the number of lower-level sub-overlay networks an arbitrary-level sub-overlay network can include is two. Sub-overlay networks may be identified using two or more bits. For example, if a sub-overlay network is identified using a 2-bit value, the number of lower-level sub-overlay networks an arbitrary-level sub-overlay network can include is four.

Here, as sub-overlay network IDs, the following values may be used for grouping, taking, for example, the topology of an underlay network into account:

(1) A part or all of a domain name, or a unique value generated on the basis of a part or all of a domain name (2) A value representing a physical point or a part or all of a character string, or a unique value generated on the basis of a value representing a physical point or a part or all of a character string (3) A part or all of an organization name, or a unique value generated on the basis of a part or all of an organization name FIG. 2 shows examples of pieces of configuration information 50-1, 50-3, and 50-7 on nodes 20-1, 20-3, and 20-7 (i.e., nodes 20-1, 20-3, and 20-7 with ID={001, 011, 111}) among the nodes 20-0, 20-1, 20-3, 20-4, 20-6, and 20-7 participating in the overlay network 10. In the explanation below, nodes 20-1, 20-3, and 20-7 may be called nodes "001," "011," and "111," respectively, using ID={001, 011, 111} of nodes 20-1, 20-3, and 20-7.

In the example of FIG. 2, configuration information 50-7 on node "111" is composed of node information 51-7 and an adjacent table 52-7. Node information 51-7 includes the following pieces of information: ID "id" (ID id=111), the number of mask bits "mask" (mask=2), and IP address "addr" (addr=192.168.0.1). In this case, ID "id" (ID id=111) indicates sub-overlay network ID "nwid" (ID nwid=11) and node ID "nid" (ID nid=1). That is, ID "id" (ID id=111) is composed of sub-overlay network ID "nwid" (ID nwid=11) and node ID "nid" (ID nid=1). The number of "ID id" bits M (M=3) is omitted.

The adjacent table 52-7 includes an adjacent node information entry "table[0]" corresponding to the 0th-level sub-overlay network 10 (the entire overlay network 10). The entry "table[0]" holds ID "table[0].id=000" of node (adjacent node) "000" adjacent to node "111" on the 0th-level sub-overlay network 10 shown by the arrow 201 in FIG. 2 and its IP address "table[0].addr=10.0.1.1".

The adjacent table 52-7 also includes adjacent node information entry "table[1]" corresponding to the first-level sub-overlay network 11-1. The entry "table[1]" holds ID "table[1].id=100" of node (adjacent node) "100" adjacent to node "111" on the first-level sub-overlay network 11-1 shown by the arrow 202 in FIG. 2 and its IP address "table[1].addr=192.168.1.5". The adjacent table 52-7 further includes adjacent node information entry "table[2]" corresponding to the second-level sub-overlay network 110-1. The entry "table[2]" holds ID "table[2].id=110" of node (adjacent node) "110" adjacent to node "111" on the second-level sub-overlay network 110-1 shown by the arrow 203 in FIG. 2 and its IP address "table[2].addr=192.168.100.3".

Configuration information 50-3 on node "011" is composed of node information 51-3 and an adjacent table 52-3. Node information 51-3 includes the following pieces of information: "ID id=011," "the number of mask bits mask=1," and "IP address addr=10.0.0.1". In this case, "ID id=011" indicates "sub-overlay network ID nwid=0" and "node ID nid=11".

The adjacent table 52-3 includes an adjacent node information entry "table[0]" corresponding to the 0th-level sub-overlay network 10 (the entire overlay network 10). The entry "table[0]" holds ID "table[0].id=100" of node (adjacent node) "100" adjacent to node "011" on the 0th-level sub-overlay network 10 shown by the arrow 204 in FIG. 2 and its IP address "table[0].addr=192.168.1.5".

The adjacent table 52-3 also includes adjacent node information entry "table[1]" corresponding to the first-level sub-overlay network 11-0. The entry "table[1]" holds ID "table[1].id=000" of node (adjacent node) "000" adjacent to node "Oil" on the first-level sub-overlay network 11-0 shown by the arrow 205 in FIG. 2 and its IP address "table[1].addr=10.0.1".

Configuration information 50-1 on node "001" is composed of node information 51-1 and an adjacent table 52-1. Node information 51-1 includes the following pieces of information: "ID id=001," "the number of mask bits mask=1," and "IP address addr=192.168.3.1". In this case, "ID id=001" indicates "sub-overlay network ID nwid=0" and "node ID nid=01".

The adjacent table 52-1 includes an adjacent node information entry "table[0]" corresponding to the 0th-level sub-overlay network 10 (the entire overlay network 10). The entry "table[0]" holds ID "table[0].id=011" of node (adjacent node) "011" adjacent to node "001" on the 0th-level sub-overlay network 10 shown by the arrow 206 in FIG. 2 and its IP address "table[0].addr=10.0.0.1".

The adjacent table 52-1 also includes adjacent node information entry "table[1]" corresponding to the first-level sub-overlay network 11-0. The entry "table[1]" holds ID "table[1].id=011" of node (adjacent node) "011" adjacent to node "001" on the first-level sub-overlay network 11-0 shown by the arrow 207 in FIG. 2 and its IP address "table[l].addr=10.0.0.1".

<Configuration of Sub-Overlay Network>

When a new node participates in the overlay network 10 of FIG. 2, that is, when the overlay network 10 is restructured, the new participating node has to construct an adjacent table. In this case, the new participating node and all the existing nodes adjacent to the new participating node have to update the adjacent tables.

Figure 7:
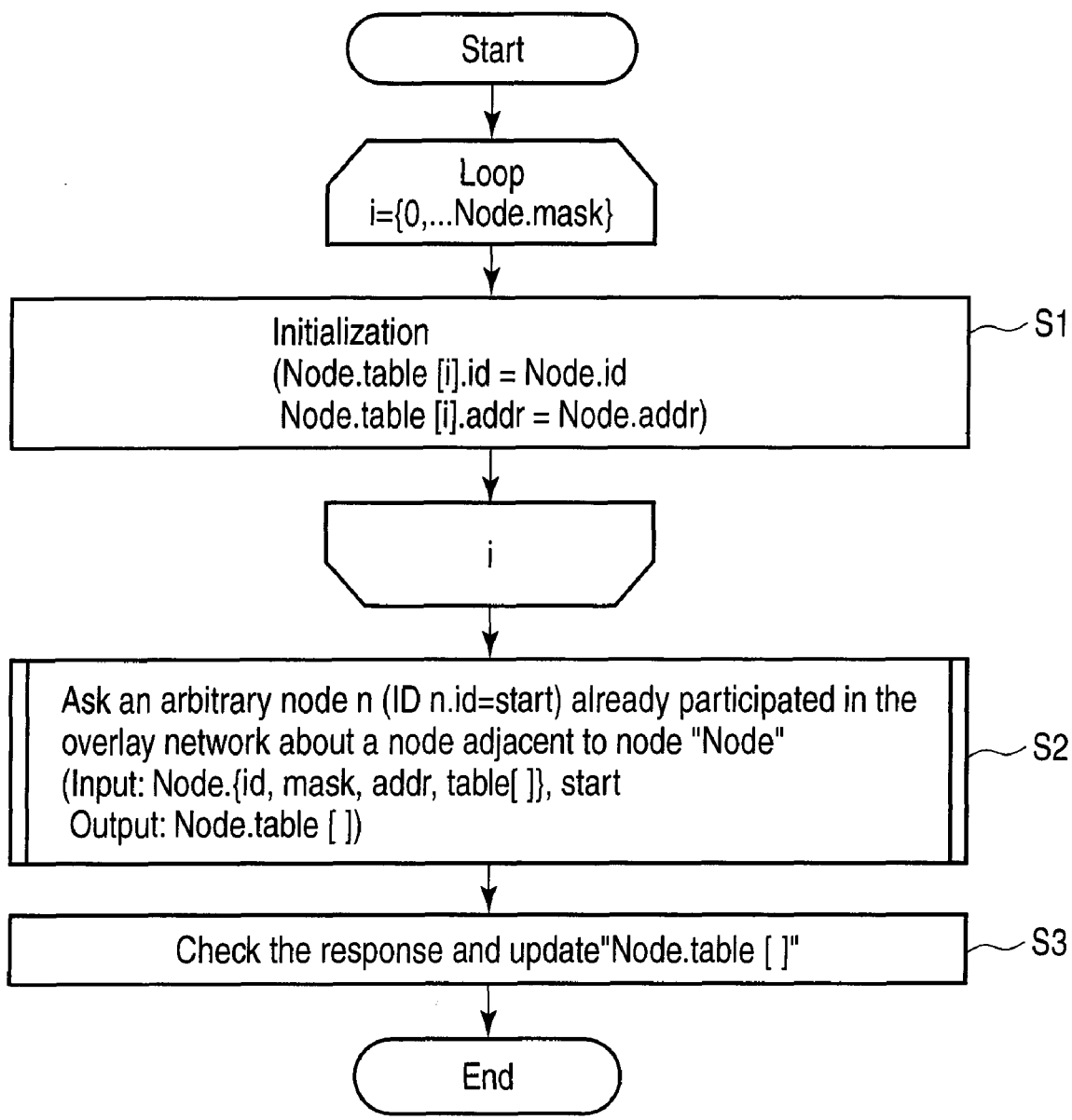
FIG. 7 is a flowchart to help explain an exemplary procedure for constructing an adjacent table a new participating node has in the first embodiment.

Hereinafter, the procedure for constructing an adjacent table for a new participating node and the procedure for updating the adjacent tables of the new participating node and existing nodes will be explained with reference to the flowcharts of FIGS. 7 and 8. Suppose a new participating node is node "Node" and an arbitrary node already participated in the overlay network 10 is node n. Node n is any one of nodes 20-0, 20-1, 20-3, 20-4, 20-6, and 20-7 in the example of FIG. 2. Suppose the ID of node n is expressed by "n.id" (ID n.id) and the "n.id" is "start" (ID n.id=start).

Furthermore, node "Node" and node n have the same hardware configuration and functional configuration as the hardware configuration of node 20-$t$ of FIG. 3 and the functional configuration of node 20-$t$ of FIG. 4. Therefore, the hardware configuration of FIG. 3 and the functional configuration of FIG. 4 are used as the hardware configuration and functional configuration of each of node "Node" and node n. Here, configuration information 50-$t$ stored in the configuration storage unit 27 of node "Node" is represented as configuration information 50-$t$(N). Node information 51-$t$ and the adjacent table 52-$t$ included in configuration information 50-$t$ are represented as node information 51-$t$(N) and adjacent table 52-$t$(N), respectively. Similarly, configuration information 50-$t$ stored in the configuration storage unit 27 of node n is represented as configuration information 50-$t$($n$). Node information 51-$t$ and the adjacent table 52-$t$ included in configuration information 50-$t$ are represented as node information 51-$t$($n$) and adjacent table 52-$t$($n$), respectively.

For node "Node" to participate in the overlay network 10, the node "Node" has to obtain the IP address of an arbitrary node n already participated in the overlay network 10 in a suitable way. Here, it is assumed that, for example, the user operates the input and output device 25 of node "Node" to input the IP address of node n, thereby causing the controller 26 of node "Node" to obtain the IP address of the node n.

In this state, the routing module 29 included in the controller 26 of node "Node" initializes its own adjacent table 52-$t$(N) (step S1). Here, "id" (table[i].id) and "addr" (table[i].addr) held in adjacent table 52-$t$(N) of node "Node" are represented as "Node.table[i].id" and "Node.table[i].addr," respectively. "id" (table[i].id) and "addr" (table[i].addr) held in adjacent table 52-$t$(N) are "id" and "addr" of a node adjacent to node "Node" on an ith-level sub-overlay network. Similarly, "id" (table[i].id) and "addr" (table[i].addr) held in adjacent table 52-$t$($n$) are represented as "n.table[i].id" and "n.table[i].addr," respectively. "id" (table[i].id) and "addr" (table[i].addr) held in adjacent table 52-$t$($n$) are "id" and "addr" of a node adjacent to node n on an ith-level sub-overlay network.

Suppose the number of mask bits "mask" included in node information 51-$t$(N) in configuration information 50-$t$(N) of node "Node" is "Node.mask". In this case, adjacent table 52-$t$(N) is initialized (step S1) by initializing "id" (i.e., "Node.table[i].id") and "addr" (i.e., "Node.table[i].addr") of a node adjacent to node "Node" on the sub-overlay network of each level (the ith level) ranging from "i=0" to "i=Node.mask" to "id" (i.e., "Node.id") and "addr" (i.e., "Node.addr") of the node "Node", respectively.

When having initialized its own adjacent table 52-$t$(N), the table management module 28 of node "Node" requests the participation of the node "Node" from node n (step S2). That is, the table management module 28 of node "Node" inquires a node adjacent to the node "Node" (an adjacent node of node "Node") from node n (ID n.id=start) via the communication device 24.

The inquiry (participation request) includes configuration information 50-$t$(N) of node "Node" and ID (ID n.id=start) of node n as arguments. Node information 51-$t$(N) included in configuration information 50-$t$(N) is represented as "Node.{id,mask,addr}". "Node.{id,mask,addr}" indicates the following pieces of information: "Node.id", "Node.mask", and "Node.addr". The entire adjacent table 52-$t$(N) included in configuration information 50-$t$(N) is expressed by "Node.table[ ]". In this case, configuration information 50-$t$(N) is expressed by "Node.{id.mask,addr,table[ ]}". The inquiry indicates that "Node.table[ ]" is required as a return value for the inquiry. In the flowchart of FIG. 7, these arguments and return value are represented as the input and output (the input and output of an inquiry receiving node). The representation is the same in making inquiries (requests) in other flowcharts described later.

Receiving the inquiry from node "Node", the table management module 28 of node n executes the following process according to the procedure shown in FIG. 8. First, if the received inquiry is an inquiry about an adjacent node of node "Node," the table management module 28 of node n determines whether the inquiry is a first inquiry (step S11).

If it is a first inquiry about an adjacent node of node "Node" (Yes in step S11), the table management module 28 of node n executes step S12. In step S12, the table management module 28 of node n determines whether the node "Node" is an adjacent node of node n on a sub-overlay network of each (the ith level) of the levels ranging from "i=0" to "i=Node.mask" on the basis of "Node.{id.mask,addr,table[ ]}" and "start" included in the inquiry.

The determination in step S12 is made by checking whether "n.id$^i$" is "Node.id$^i$" and "ring[n.id$_{M-t}$, Node.id$_{M-t}$, n.table[i].id$_{M-t}$)" is positive. Here, x$^k$ indicates the high-order k bits in x and x$_k$ indicates the low-order k bits in x. Accordingly, the "n.id$^i$" and "Node.id$^i$" represent the high-order i bits of each of "n.id" and "Node.id," respectively. If "n.id$^i$" is "Node.id$^i$," this means that node n and node "Node" both participate in the ith-level sub-overlay network.

On the other hand, "ring[x,y,z)" (x=n.id$_{M-t}$, y=Node.id$_{M-t}$, z=n.table[i].id$_{M-t}$) is a function that returns positive if "ID=y" is an arrangement which satisfies the condition that it fits into a range of "[x,z)" on a ring. "[" in "[x" indicates the range "[x,z)" includes x. ")" in "z)" indicates that the range "[x,z)" does not include z. For example, if x=2 and z=5, the value of y fitting into a range of "[x,z)" (i.e., a range of "[2,5)") is {2, 3, 4}. "n.id$_{M-t}$," "Node.id$_{M-t}$," and "n.table[i].id$_{M-t}$," indicate the ID of node n, the ID of node "Node," and the ID of adjacent node (n.table[i]) of node n at the present moment, respectively. In this case, if the ID of node "Node" lies between the ID of node n and the ID of the adjacent node of node n, positive is returned. For example, if the participation of node "Node" makes the node "Node" be an adjacent node of node n and a node (n.table[i]) situated next to node n until the participation of the node "Node" becomes an adjacent node of the node "Node", positive is returned.

The function that returns positive if "ID=y" is an arrangement which satisfies the condition that it fits into a range of "(x,z]" on a ring is expressed as "ring(x, y, z]". Here, "(" in "(x" indicates the range "(x,z]" does not include x. "]" in "z]" indicates that the range "(x,z]" includes z.

If "n.id$^i$" is "Node.id$^i$" and "ring[n.id$_{M-t}$, Node.id$_{M-t}$, n.table[i].id$_{M-t}$)" is positive, the table management module 28 of node n determines that node "Node" becomes a new adjacent node of the node n on the ith-level sub-overlay network (Yes in step S12). In this case, the table management module 28 of node n corrects the contents (Node.table[ ]) of adjacent table 52-t(N) of the node "Node" included in the inquiry from node "Node" and the contents (n.table[ ]) of adjacent table 52-t(n) of the node n itself (step S13). Specifically, the table management module 28 of node n corrects (updates) "Node.table[i].id" and "Node.table[i].addr" in adjacent table 52-t(N) of node "Node" to "n.table[i].id" and "n.table[i].addr" in adjacent table 52-t(n) of the node n, respectively. Moreover, the table management module 28 of node n corrects (updates) "n.table[i].id" and "n.table[i].addr" in adjacent table 52-t(n) of node n to "id" (Node.id) and "addr" (Node.addr) of node "Node," respectively. If the condition that "n.id$^i$" is "Node.id$^i$" and "ring[n.id$_{M-t}$, Node.id$_{M-t}$, n.table[i].id$_{M-t}$)" is positive is not satisfied (No in step S12), the table management module 28 of node n skips step S13.

The table management module 28 of node n (hereinafter, referred to as old node n) executes the aforementioned process for all of the levels ranging from "i=0" to "i=Node.mask". Then, the table management module 28 of old node n transfers the inquiry from node "Node" to the adjacent node on the basis of "id" (i.e., "n.table[0].id") of a node adjacent to the old node n on, for example, the 0th-level sub-overlay network held in adjacent table 52-t(n) (i.e., "n.table[ ]") of the old node n (step S14). The adjacent node becomes a new node n referred to by node "Node".

The new node n is represented by "n.table[0].id". The inquiry transferred to the new node includes configuration information 50-t(N) of node "Node", that is, "Node.{id, mask, addr, table[ ]}" and "start" (ID n.id=start). When step S13 is executed, "Node.table[ ]" included in the inquiry transferred to the new node n becomes a corrected "Node.table[ ]". When receiving the inquiry from the old n, the new node n executes the processes shown in the flowchart of FIG. 8 in the same way as the old node n does.

In this way, each time an inquiry including "Node.{id, mask, addr, table[ ]}" and "start" (ID n.id=start) are exchanged between adjacent nodes on the 0th-level sub-overlay network 10, "Node.table[ ]" included in the inquiry is updated. Then, suppose the delivery and receipt of the inquiry has taken a round on the 0th-level sub-overlay network 10 and node n having received a participation request (an inquiry) directly from node "Node" receives an inquiry again from the adjacent node.

Then, the table management module 28 of node n determines that the received inquiry about an adjacent node of node "Node" is a first inquiry (step S11). If the inquiry is a second inquiry as in this example (No in step S11), the table management module 28 of node n determines that "Node.table[ ]" included in the inquiry has been completed and the adjacent tables 52-t of all the nodes participated in the sub-overlay network 10 have been updated so as to reflect the participation of node "Node". Then, the table management module 28 of node n returns a response to the inquiry from node "Node" to the node "Node" (step S15). The response includes the corrected "Node.table[ ]" included in the second inquiry.

When having acknowledged a response to the inquiry from any node n, the table management module 28 of node "Node" copies "Node.table[ ]" included in the response into adjacent table 52-t(N) in configuration information 50-t(N) stored in the configuration storage unit 27 of the node "Node" (step S3). That is, the table management module 28 of node "Node" updates adjacent table 52-t(N) stored in the configuration storage unit 27 on the basis of "Node.table[ ]" included in the response. As a result, node "Node" constructs its own adjacent table 52-t(N).

As described above, in the first embodiment, node n which has received a participation request (inquiry) from node "Node," if node n itself is an adjacent node of node "Node," not only corrects adjacent table 52-t(N) (Node.table[ ]) of node "Node" but also transfers an inquiry to an adjacent node (new node n) of the node n. In this way, adjacent nodes on the overlay network 10 construct adjacent table 52-t(N) (Node.table[ ]) of node "Node" sequentially, beginning with node n. When the construction of adjacent table 52-t(N) (Node.table[ ]) has been completed, node n which received the inquiry from node "Node" for the first time sends the constructed adjacent table 52-t(N) (Node.table[ ]) as a response to the node "Node". Receiving the response, node "Node" can update adjacent table 52-t(N) stored in the configuration storage unit 27 to the correct state.

<Searching for a Node>

Figure 10:
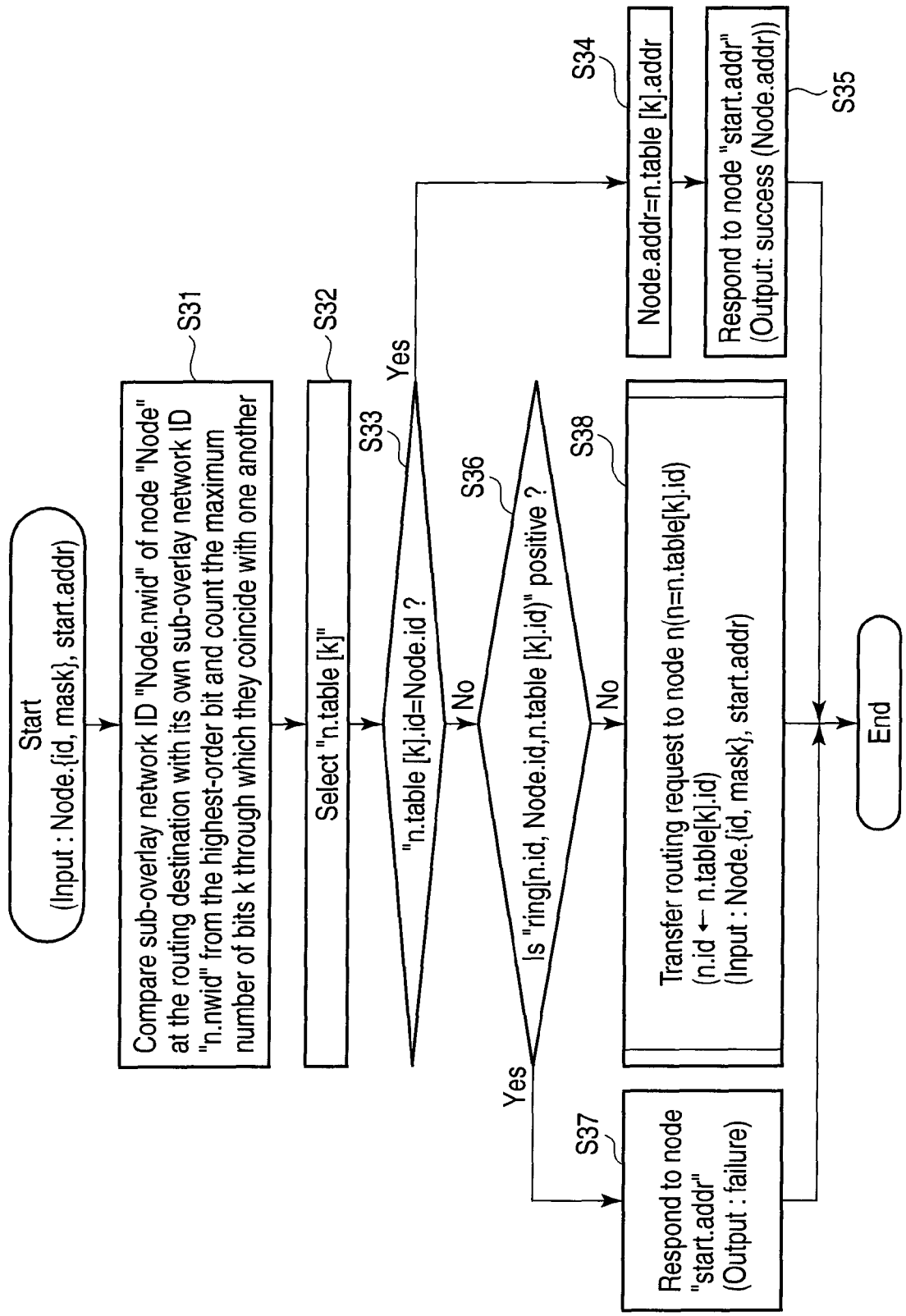
FIG. 10 is a flowchart to help explain an exemplary procedure for a node searching process to be executed at a node which has received a routing request in the first embodiment.
Figure 14:
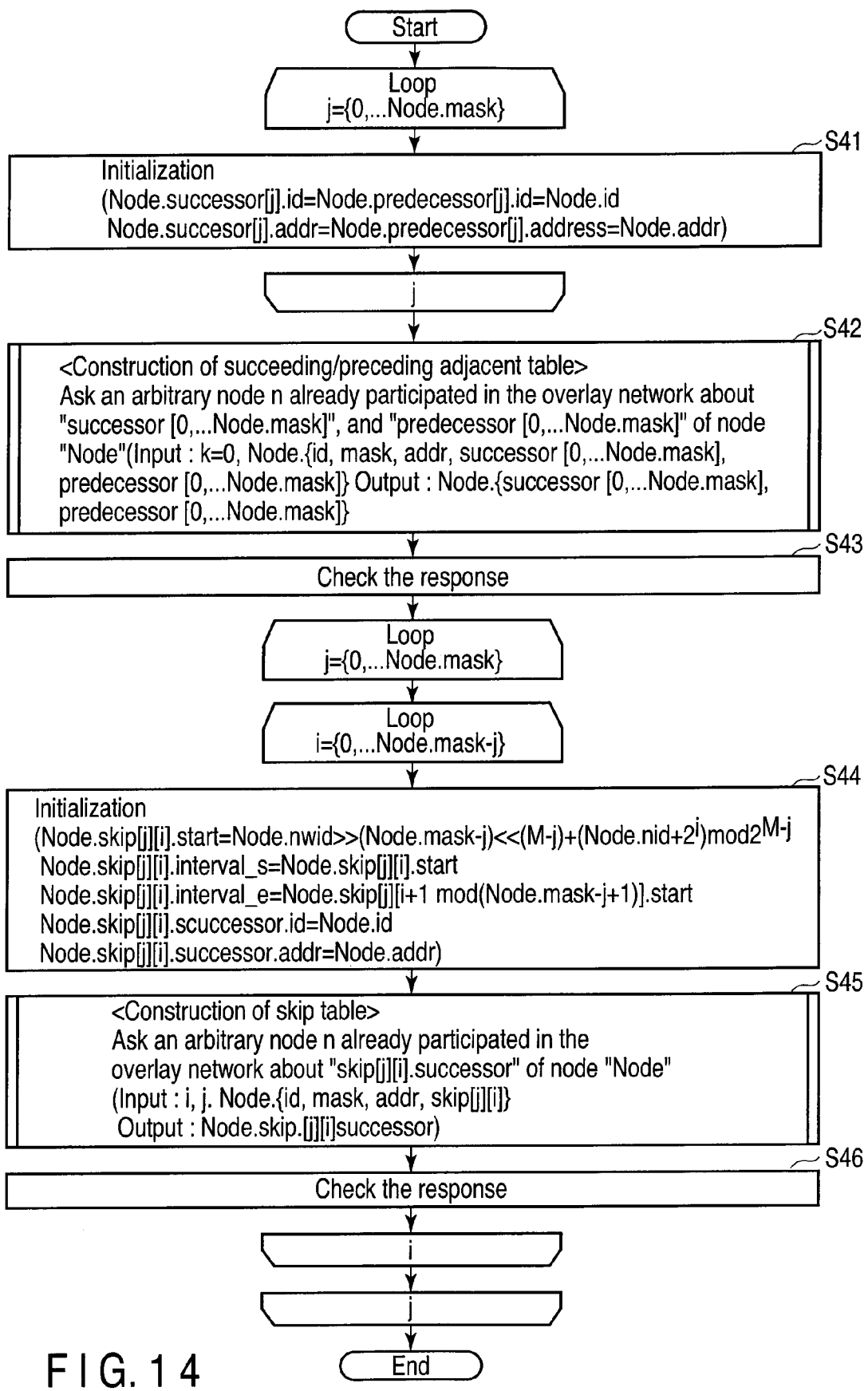
FIG. 14 is a flowchart to help explain an exemplary procedure for constructing an adjacent table and a skip table which a new participating node has in the second embodiment.

Next, the procedure for a certain node routing an arbitrary node in the overlay network of FIG. 2 will be explained with reference to the flowcharts of FIGS. 9 and 10. Suppose, according to a request from, for example, a client, a node whose ID "id" is "start" (start.id) (hereinafter, referred to as node "start") performs the routing of node "Node" requested by the client. That is, suppose node "start" inputs ID "id"

(Node.id) of node "Node" to carry out a node searching process of outputting (or obtaining) the IP address of the node "Node".

Moreover, it is assumed that node "start" has the same hardware configuration and functional configuration as the hardware configuration of node 20-t of FIG. 3 and the functional configuration of node 20-t of FIG. 4. Therefore, like node "Node," the hardware configuration of FIG. 3 and the functional configuration of FIG. 4 are used as the hardware configuration and functional configuration of node "start". Here, adjacent table 52-t stored in the configuration storage unit 27 of node "start" is represented as adjacent table 52-t(S). Moreover, an entry (table[i]) of adjacent table 52-t(S) corresponding to the ith-level sub-overlay network is expressed as "start.table[i]". "id(table[i].id)" and "addr(table[i].addr)" of an adjacent node on the ith-level sub-overlay network held in entry "start.table[i]" are represented as "start.table[k].id" and "start.table[k].addr," respectively.

The routing module 29 included in the controller 26 of node "start" executes a node searching process (the routing of node "Node") described below according to the flowchart of FIG. 9. The high-order "mask" bits in ID "Node.id" of node "Node" at the routing destination indicates a sub-overlay network ID "nwid" (hereinafter, referred to as "Node.nwid"). The routing module 29 of node "start" compares the sub-overlay network ID "Node.nwid" included in ID "Node.id" of node "Node" at the routing destination with the sub-overlay network ID "start.nwid" included in "start.id", the ID of the node "start" itself from the highest-order bit sequentially (step S21). In step S21, the routing module 29 of node "start" counts the maximum number of bits k through which "Node.nwid" and "start.nwid" coincide with one another consecutively in the comparison, beginning with the highest-order bit. The sub-overlay network of the level expressed by the maximum number of bits k (i.e., the kth-level sub-overlay network) is the deepest-level one of the sub-overlay networks to which both of node "start" and node "Node" belong (i.e., the sub-overlay networks including node "start" and node "Node").

Then, the routing module 29 of node "start" selects information on a node adjacent to the node "start" on the kth-level sub-overlay network from entry "start.table[k]" of adjacent table 52-t(S) (step S22). The adjacent table 52-t(S) is included in configuration information 50-t(S) stored in the configuration storage unit 27 of node "start". That is, node "start" selects information in an adjacent table corresponding to the deepest-level (the kth level) one of the sub-overlay networks to which both of the node "start" and routing destination node "Node" belong as information on an adjacent table (information on an adjacent node) enabling routing at the shortest distance from configuration information 50-t managed by the node "start".

Next, the routing module 29 of node "start" determines whether "id" included in the selected information on the adjacent node (i.e., "start.table[k].id") on the kth-level sub-overlay network coincides with "id" of node "Node" (i.e., "Node.id") at the routing destination (step S23). If they coincide with each other (Yes in step S23), the routing module 29 of node "start" determines that node "Node" is a node adjacent to the node "start" on the kth-level sub-overlay network.

Then, the routing module 29 of node "start" obtains "addr" (i.e., "start.table[k].addr") included in the selected information on the adjacent node on the kth-level sub-overlay network as IP address "addr" (Node.addr) of node "Node" (step S24). As a result, the routing module 29 of node "start" determines that it has succeeded in the node searching process (routing) and terminates the process (step S25).

On the other hand, if "start.table[k].id" does not coincide with "Node.id" (No in step S23), the routing module 29 of node "start" determines that node "Node" is not a node adjacent to the node "start" on the kth-level sub-overlay network. Then, the routing module 29 of node "start" determines whether "ring[start.id, Node.id, start.table[k].id)" is positive, that is, whether "Node.id" is an arrangement which satisfies the condition that it fits into the range "[start.id, start.table[k].id)" on the ring (step S26).

If the result of the determination in step S26 is "Yes," this means that node "Node" is a node adjacent to node "start", which conflicts with the result of the determination in step S23. In this case, the routing module 29 of node "start" determines that node "Node" at the routing destination does not exist and therefore it has failed in the node searching process and terminates the process (step S27).

In contrast, if the result of the determination in step S25 is "No" and therefore does not conflict with the result of the determination in step S23, the routing module 29 of node "start" proceeds to step S28. In step S28, the routing module 29 of node "start" determines that a node adjacent to the node "start" on the kth-level sub-overlay network is node n at the routing request destination. In step S28, the routing module 29 of node "start" further transfers to the determined node n a routing request for obtaining IP address (Node.addr) of node "Node". ID "id" (n.id) of the node n is "start.table[k].id" and address (IP address) "addr" is "start.table[k].addr". The routing request includes a pair of Id "id" (Node.id) of node "Node" and the number of mask bits "mask" (Node.mask), that is, "Node.{id, mask}" and the address (IP address) "addr" (start.addr) of node "start".

Receiving the routing request (here, the routing request from node "start"), the routing module 29 of node n executes a node searching process according to the flowchart of FIG. 10 as described below. First, the routing module 29 of node n executes step S31 like step S21 at the preceding node "start". That is, the routing module 29 of node n compares the sub-overlay network ID "Node.nwid" included in ID "Node.id" of node "Node" at the routing destination with "n.id", the ID of the node n itself from the highest-order bit sequentially. In the comparison, the routing module 29 of node n counts the maximum number of bits k through which "Node.nwid" and "n.id" coincide with one another consecutively, beginning with the highest-order bit.

Next, the routing module 29 of node n selects information on an adjacent node on the kth-level sub-overlay network held in entry "n.table[k]" of adjacent table 52-t(n) (step S32). The adjacent table 52-t(n) is included in configuration information 50-t(n) stored in the configuration storage unit 27 of node n. Then, the routing module 29 of node n determines whether "id" (i.e., "n.table[k].id") included in the selected information on the adjacent node on the kth-level sub-overlay network coincides with "id" (i.e., "Node.id") of node "Node" at the routing destination (step S33).

If they coincide with each other (Yes in step S33), the routing module 29 of node n obtains "addr" (i.e., "n.table[k].addr") included in the selected information on the adjacent node on the kth-level sub-overlay network as IP address "addr" (Node.addr) of node "Node" (step S34) as in step 24 at the preceding node "start". As a result, the routing module 29 of node n determines that it has succeeded in the node searching process and returns a response including IP address "addr" (Node.addr) of node "Node" obtained by itself to node "start" specified by IP address "start.addr" included in the search request (step S35).

On the other hand, if "n.table[k].id" does not coincide with "Node.id" (No in step S33), the routing module 29 of node n determines whether "ring[n.id, Node.id, n.table[k].id]" is positive, that is, whether node "Node.id" is an arrangement which satisfies the condition that it fits into the range "[n.id, n.table[k].id]" on the ring (step S36).

If the result of the determination in step S36 is "Yes," this means that node "Node" is a node adjacent to node n, which conflicts with the result of the determination in step S33. In this case, the routing module 29 of node n determines that node "Node" at the routing destination does not exist and therefore it has failed in the node searching process. Then, the routing module 29 of node n returns a response for notifying the failure of the node searching process to node "start" specified by "start.addr" included in the search request (step S37).

In contrast, if the result of the determination in step S35 is "No," the routing module 29 of node (old node) n proceeds to step S38. In step S38, the routing module 29 of old node n determines that a node adjacent to the old node n on the kth-level sub-overlay network is new node n at the routing request destination. In step S38, the routing module 29 of old node n further transfers to the determined new node n a routing request for obtaining the IP address (Node.addr) of node "Node". The routing request includes "Node.{id, mask}" and "start.addr" included in the routing request received by old node n. When a routing request is transferred from old node n to new node n, new node n carries out a node searching process according to the flowchart of FIG. 10 as old node n does.

When a response is returned from node n to node "start" as a result of node n having executed step S35 or step S37, the routing module 29 of node "start" receives the response and checks the contents of the response (or the success or failure of the node searching process) (step S29). Then, the routing module 29 of node "start" terminates the node searching process (step S30).

As described above, in the first embodiment, to perform the routing of node "Node," node "start" (or node n) selects an entry in adjacent table 52-t enabling routing at the shortest distance by counting the maximum number of bits k. Specifically, to perform routing at the shortest distance, node "start" (or node n) selects an entry corresponding to the deepest level one of the sub-overlay networks to which both the node "start" (or node n) itself and node "Node" at the routing destination belong from adjacent table 52-t managed by the node "start" (or node n) itself. If the routing of node "Node" cannot be performed on the basis of the selected entry information because node "Node" is not a node adjacent to node "start" (or node n), the routing request is transferred to an adjacent node. The receiver of the routing request selects an entry in an adjacent table which enables rooting at the shortest distance and carries out the same process as the sender of the routing request does. In this way, the operation of transferring the routing request to an adjacent node is repeated, thereby performing the routing of Node "Node". By such a routing (node searching) method, routing can be performed, while the number of sub-overlay networks for the request to go through is being decreased, taking proximity into account.

<Concrete Example of Searching a Node>

Next, a concrete example of searching for a node according to the procedure shown in the flowcharts of FIGS. 9 and 10 will be explained. Suppose, in the overlay network system of FIG. 2, node "111" (node 20-7) whose ID (ID id) is "111" (the number of mask bits "mask=2") and whose address (addr) is "192.168.0.1" performs the routing of nodes "110," "101," and "001" whose IDs are "{110, 101, 001}". It should be noted that the sub-overlay network ID (ID nwid) of node "111" (node 20-7) whose ID (ID id) is "111" (mask=2) is "11".

First, the routing of node "110" (node 20-6) whose ID (ID id) is "110" will be explained. Node "111" (node 20-7) whose ID (ID id) is "111" compares "ID=110" with "ID nwid=11" from the highest-order bit sequentially, thereby counting the number of bits k (here, k=2) through which they coincide with one another consecutively, beginning with the highest-order bit (step S21). As a result, node "111" selects information on a second entry (table[2]) corresponding to the second-level sub-overlay network 110-1 from adjacent table 52-7 (t=7) managed by itself (step S22). Information on the entry (table [2]) is information on a node adjacent to node "111" on the second-level sub-overlay network 110-1.

As seen from FIG. 2, the selected node information is information on node "110" (node 20-6) whose ID is "110", that is, information on node "110" at the routing destination serving as a target (step S23). In this case, node "111" obtains address "addr" (here, 192.168.100.3) of node "110" from the selected node information (step S24) and terminates the node searching process (step S25). That is, node "111" can perform the routing of node "110" whose ID is "110" without going through the first-level sub-overlay network 11-1 including the second-level sub-overlay network 110-1 and through the 0th-level sub-overlay network.

Next, the routing of node "101" whose ID is "101" will be explained. Node "111" compares "ID=101" with "ID nwid=11" from the highest-order bit sequentially, thereby counting the number of bits k (here, k=1) through which they coincide with one another consecutively, beginning with the highest-order bit (step S21). As a result, node "111" (node 20-7) selects information on a first entry (table[1]) corresponding to the first-level sub-overlay network 11-1, that is, information on a node (here, information on node "100" whose ID is "100") adjacent to node "111" on the first-level sub-overlay network 11-1 from adjacent table 52-7 (t=7) managed by itself (step S22).

The selected entry information (information on node "100") is not information on node "101" at the routing destination targeted by node "111" (step S23). That is, node "101" is not a node adjacent to node "111" on the first-level sub-overlay network 11-1. In this case, node "111" transfers a routing request to a node (adjacent node) indicated by the selected entry information (step S28).

In this example, as seen from FIG. 2, the node indicated by the selected entry information is node "100" (node 20-4) whose ID is "100" adjacent to node "111" on the first-level sub-overlay network 11-1. In this case, in step S28, node "111" transfers a routing request to node "100". Of the sub-overlay networks to which node "100" belongs, the deepest-level one is the second-level sub-overlay network 110-0. That is, the sub-overlay network ID (ID nwid) of node "100" is the high-order two bits "10" in "ID=100".

Having received the routing request from node "111", node "100" compares "ID=101" with "ID nwid=10" from the highest-order bit sequentially, thereby counting the number of bits k (here, k=2) through which they coincide with one another consecutively, beginning with the highest-order bit (step S31). As a result, node "100" selects information on a second entry (table[2]) corresponding to the second-level sub-overlay network 110-0, that is, information on a node adjacent to the node "100" on the second-level sub-overlay network 110-0 from adjacent table 52-4 (t=4) managed by itself (step S32).

As seen from FIG. 2, the selected node information is information on node "100" itself and is not information on node "101" at the routing destination targeted by node "100" (step S33). Moreover, ID "101" of node "101" stands in a row between ID "100" of node "100" and ID "100" indicated by the selected node information (i.e., ID "100" of the node "100" itself adjacent to node "100" on the second-level sub-overlay network 110-0) on the ring (step S36). In this case, node "100" (node 20-4) returns to node "111" (node 20-7) a response (a response indicating a node search failure) to the effect that there is no node (routing destination node) "101" whose ID "101" has been specified by the routing request (step S37).

When having acknowledged the node search failure returned from the node "100" (step S29) in response to the routing request for node "100" (step S28), node "111" determines that it has failed in the node searching process and terminates the process (step S30).

Next, the routing of node "001" with "ID=001" (node 20-1) will be explained. Node "111" compares "ID=001" with "ID nwid=11" from the highest-order bit sequentially, thereby counting the number of bits through which they coincide with one another consecutively, beginning with the highest-order bit (step S21). Since they do not coincide at the highest-order bit, the number of bits is zero. In this case, node "111" selects information on a 0th entry (table[0]) corresponding to the 0th-level sub-overlay network 11-1, that is, information on a node (here, information on node "000" whose ID is "000") adjacent to node "111" on the 0th-level sub-overlay network 10 from adjacent table 52-7 (t=7) managed by itself (step S22).

The selected entry information is not information on node "001" at the routing destination serving as a target (step S23). That is, node "001" is not a node adjacent to node "111" on the 0th-level sub-overlay network 10. In this case, node "111" transfers a routing request to a node (adjacent node) indicated by the selected entry information (step S28).

In this example, as seen from FIG. 2, the node indicated by the selected entry information is node "000" (node 20-0) which is adjacent to node "111" on the 0th-level sub-overlay network 10 and whose ID is "000". In this case, in step S28, node "111" transfers a routing request to node "000". Of the sub-overlay networks to which node "000" whose ID is "000" belongs, the deepest level one is the first-level sub-overlay network 11-0. That is, the sub-overlay network ID (ID nwid) of node "000" whose ID is "000" is "0".

Having received the routing request from node "111," node "000" whose ID is "000" compares "ID=001" with "ID nwid=0" from the highest-order bit sequentially, thereby counting the number of bits k (here, k=1) through which they coincide with one another consecutively, beginning with the highest-order bit (step S31). As a result, node "000" selects information on a first entry (table[1]) corresponding to the first-level sub-overlay network 11-0, that is, information on a node adjacent to the node "000" on the first-level sub-overlay network 11-0 from adjacent table 52-0 (t=0) managed by itself (step S32).

As seen from FIG. 2, the selected node information is information on node "001" whose ID is "001", that is, information on node "001" at the routing destination serving as a target (step S33). In this case, node "000" obtains the address "addr" of node "001" whose ID is "001" from the selected node information (step S34) and returns a response to node "111" (step S35). As a result, node "111" obtains the address "addr" of node "001" (node 20-1) whose ID is "001" (step S29) and terminates the node searching process (step S30).

As seen from the above concrete examples, according to the first embodiment, the following effects can be obtained. A sub-overlay network in which a node (hereinafter, referred to as a first node) to carry out a node searching process (a routing process) participates is referred to as a first sub-overlay network. A state where a node at the routing destination (hereinafter, referred to as a second node) also participates in the first sub-overlay network is referred to as a first state. In contrast, a state where the second node (the node at the routing destination) does not participate in the first sub-overlay network is referred to as a second state. In the second state, another sub-overlay network included in a higher-level sub-overlay network in which both the first and second nodes participate (i.e., a sub-overlay network higher in level than the first sub-overlay network) is referred to as a second sub-overlay network.

In the first state, adjacent nodes are traced back on the first sub-overlay network with the first node as a starting point, which enables routing without going through other sub-overlay networks. In this case, the deeper the level of the first sub-overlay network, the smaller the number of nodes on the first sub-overlay network. This enables high-speed routing. Moreover, in the second state, too, if the second node has participated in the second sub-overlay network, routing can be performed without going through another sub-overlay network included in a sub-overlay network higher in level than the second sub-overlay network.

Second Embodiment

Next, a second embodiment of the invention will be explained. The second embodiment is characterized by having a mechanism that enables routing with a smaller number of hops than in the first embodiment. In the second embodiment, suppose a node which can participate in an overlay network and the basic configuration of the node are the same as those in the first embodiment. Therefore, an explanation of the second embodiment will be given with reference to FIGS. 1, 3, and 4.

<Configuration Information Held by a Node>

FIG. 11 shows an exemplary data structure of configuration information 500-*t* applied in the second embodiment. FIG. 12 shows an exemplary data structure of a skip table 523-*t* included in configuration information 500-*t* of FIG. 11. Suppose configuration information 500-*t* is stored in the configuration storage unit 27 of node 20-*t* of FIG. 4. Configuration information 500-*t* is composed of node information 510-*t*, adjacent tables 521-*t* and 522-*t*, and a skip table 523-*t*. Node information 510-*t* has the same configuration as that of node information 51-*t* applied in the first embodiment.

Adjacent table 521-*t* corresponds to adjacent table 52-*t* of FIG. 5. Adjacent table 521-*t* has entries (successor node information entries) "successor[mask]" to "successor[0]". Entries "successor[mask]" to "successor[0]" hold information (successor node information) on a node (successor node) succeeding and adjoining the node 20-*t* on the mask-level sub-overlay network in which node 20-*t* participates and on the sub-overlay network of each level of all the sub-overlay networks including the mask-level sub-overlay network. Thus, adjacent table 521-*t* may be referred to as succeeding adjacent table (successor table) 521-*t*.

Adjacent table 522-*t* has entries (predecessor node information entries) "predecessor[mask]" to "predecessor[0]". Entries "predecessor[mask]" to "predecessor[0]" hold information (predecessor node information) on a node (predecessor node) preceding and adjoining node 20-*t* on the mask-level sub-overlay network in which node 20-*t* participates and on the sub-overlay network of each level of all the sub-overlay networks including the mask-level sub-overlay network.

Thus, adjacent table 522-*t* may be referred to as preceding adjacent table (predecessor table) 522-*t*.

A successor node and a predecessor node indicate a node with an "id" adjacent to the "id" of node 20-*t* itself in a clockwise direction and a node with an "id" adjacent to the "id" of node 20-*t* in a counterclockwise direction, respectively, when the "id" (ID id) of each of all the nodes belonging to the sub-overlay network of each level is arranged in ascending order in a ring.

Adjacent node information held in entries "successor[mask]" to "successor[0]" in succeeding adjacent table (successor table) 521-*t* includes the ID "id" of a successor node and its IP address "addr". Adjacent node information held in entries "predecessor[mask]" to "predecessor[0]" in preceding adjacent table (predecessor table) 522-*t* includes the ID "id" of a predecessor node and its IP address "addr".

In the explanation below, "id" and "addr" held in entry "successor[i]" may be written as "successor[i].id" and "successor[i].addr" respectively, and "id" and "addr" held in entry "predecessor[i]" may be written as "predecessor[i].id" and "predecessor[i].addr" respectively. Moreover, information itself held in entry "successor[i]" may be written as "successor[i]" and all pieces of information held in entries "successor[mask]" to "successor[0]," that is, all pieces of information held in succeeding adjacent table 521-*t*, may be written as "successor". Similarly, information itself held in entry "predecessor[i]" may be written as "predecessor[i]" and all pieces of information held in entries "predecessor[mask]" to "predecessor[0]," that is, all pieces of information held in preceding adjacent table 522-*t*, may be written as "predecessor".

As described above, configuration information 500-*t* applied in the second embodiment is such that preceding adjacent table 522-*t* and skip table 523-*t* are added to configuration information 50-*t* applied in the first embodiment.

Skip table 523-*t* is a table which lists shortcut paths for enabling routing through inquiry transfer with a smaller number of hops than in the first embodiment. Skip table 523-*t* corresponds to the finger table written in the documents 5 and 6.

Skip table 523-*t* holds the following information for j={0, . . . , mask}, i={0, . . . , mask−j}:

a) skip[j][i].start
skip[j][i].start
={nwid>>(mask−j)<<(M−j)}+(nid+$2^i$)mod $2^{M-j}$
b) skip[j][i].interval_s
skip[j][i].interval_s
=skip[j][i].start (ID serving as a starting point of an ID space which is a space of "id" all the nodes included in a jth-level sub-overlay network have)
c) skip[j][i].interval_e
skip[j][i].interval_e
=skip[j][i+1 mod(mask−j+1)].start
d) skip[j][i].successor.id
skip[j][i].successor.id
=the ID of a node (a skip node for node 20-*t*) closest to ID "skip[j][i].interval_s" in a clockwise direction when "id" of each of all the nodes included in the jth-level sub-overlay network is arranged in ascending order in a ring
e) skip[j][i].successor.addr
skip[j][i].successor.addr
=address of a node indicated by "skip[j][i].successor.id"

Here, the representation "{nwid>>(mask−j)<<(M−j)}" in item a) indicates that "nwid" is shifted right "mask−j" bits and the right-shifted "nwid" is shifted left "M−j" bits.

Skip nodes whose IDs are "skip[j][i].successor.id" corresponding to all the combinations [j][i] of j={0, . . . , mask} and i={0, . . . , mask−j} are arbitrary nodes which include a node that does not adjoin node 20-*t* when "id" of each of all the nodes (all the nodes including node 20-*t*) included in the overlay networks is arranged in ascending order in a ring. Moreover, the skip nodes include other nodes participating in the mask-level sub-overlay network in which node 20-*t* participates. The skip nodes further include other nodes participating in a sub-overlay network including the mask-level sub-overlay network in which node 20-*t* participates. In the explanation below, an entry in skip table 523-*t* corresponding to each combination [j][i] of j={0, . . . , mask} and i={0, . . . , mask−j} is referred to as "skip[j][i]".

FIG. 13 shows the relationship between "skip[j][i].interval_s" and "skip[j][i].successor.id".

<Configuration of Overlay Network>

Next, the procedure for constructing an adjacent table and a skip table for a new participating node needed in reconfiguring the overlay network in the second embodiment will be explained with reference to the flowcharts of FIGS. 14, 15A, 15B, 16, and 17. As in the first embodiment, suppose a new participating node is node "Node" and an arbitrary node already participated in the overlay network is node n.

In the explanation below, configuration information 500-*t* stored in the configuration storage unit 27 of node "Node" is referred to as configuration information 500-*t*(N). Moreover, node information 510-*t*, succeeding adjacent table 521-*t*, preceding adjacent table 522-*t*, and skip table 523-*t* included in configuration information 500-*t* are referred to as node information 510-*t*(N), succeeding adjacent table 521-*t*(N), preceding adjacent table 522-*t*(N), and skip table 523-*t*(N), respectively. Similarly, configuration information 500-*t* stored in the configuration storage unit 27 of node n is referred to as configuration information 500-*t*(n). Moreover, node information 510-*t*, succeeding adjacent table 521-*t*, preceding adjacent table 522-*t*, and skip table 523-*t* included in configuration information 500-*t* are referred to as node information 510-*t*(n), succeeding adjacent table 521-*t*(n), preceding adjacent table 522-*t*(n), and skip table 523-*t*(n), respectively.

Furthermore, "id" (successor[j].id) and "addr" (successor[j].addr) held in succeeding adjacent table 521-*t*(N) are expressed as "Node.successor[j].id" and "Node.successor[j].addr," respectively. "id" (successor[j].id) and "addr" (successor[j].addr) held in succeeding adjacent table 521-*t*(N) are "id" and "addr" of a node (successor node) succeeding and adjoining node "Node" on the jth-level sub-overlay network, respectively. Similarly, "id" (predecessor[j].id) and "addr" (predecessor[j].addr) held in preceding adjacent table 522-*t*(N) are expressed as "Node.predecessor[j].id" and "Node.predecessor[j].addr," respectively. "id" (predecessor[j].id) and "addr" (predecessor[j].addr) held in preceding adjacent table 522-*t*(N) are "id" and "addr" of a node (predecessor node) preceding and adjoining node "Node" on the jth-level sub-overlay network, respectively.

First, the table management module 28 of node "Node" initializes its own succeeding adjacent table (successor table) 521-*t*(N) and preceding adjacent table (predecessor table) 522-*t*(N) (step S41). Here, suppose the number of mask bits "mask" included in node information 510-*t*(N) in configuration information 500-*t*(N) of node "Node" is "Node.mask". In this case, succeeding adjacent table 521-*t*(N) is initialized by initially setting "id" and "addr" (i.e., "successor[j].id" and "successor[j].addr") of a node (successor node) succeeding and adjoining the node "Node" on a sub-overlay network of each level (the jth level) in the range of "j=0" to "j=Node.mask" to "id" and "addr" of the node "Node" (i.e., "Node.id" and "Node.addr"), respectively. Similarly, preceding adjacent table 522-*t*(N) is initialized by initially setting "id" and "addr" (i.e., "predecessor[j].id" and "predecessor[j].addr") of a node (predecessor node) preceding and adjoining the node "Node" on a sub-overlay network of each level (the jth level) in the range of "j=0" to "j=Node.mask" to "Node.id" and "Node.addr," respectively.

Having initialized its own adjacent tables 521-t(N) and 522-t(N), the table management module 28 of node "Node" requests the node n for the participation of node "Node" to construct the adjacent tables 521-t(N) and 522-t(N) via node n (step S42). That is, the table management module 28 of node "Node" inquires successor node "successor[0, . . . , Node.mask]" and predecessor node "predecessor [0, . . . , Node.mask]" of the node "Node" from node n via the communication device 24. The inquiry (participation request) includes the number of bits k (k=0) whose initial value is zero and "Node.{id, mask, addr, successor [0, . . . , Node.mask], predecessor [0, . . . , Node.mask]}" in configuration information 500-t(N) of node "Node". Here, "successor [0, . . . , Node.mask]" includes "successor [0, . . . , Node.mask].id" and "successor [0, . . . , Node.mask].addr". "successor [0, Node.mask]" and "predecessor [0, . . . , Node.mask]" may be expressed as "successor" and "predecessor", respectively.

Figure 15A:
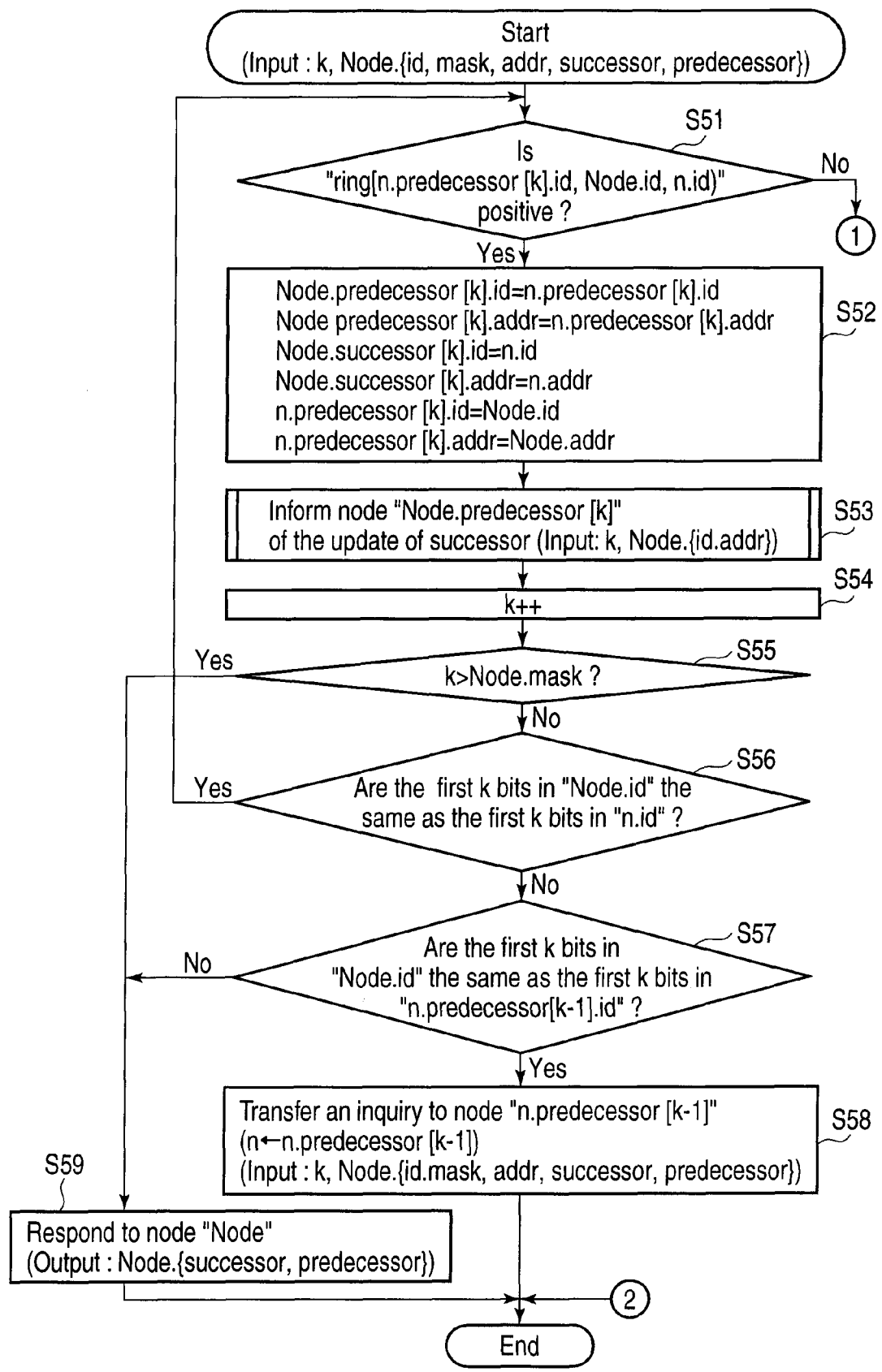
FIG. 15A is a flowchart to help explain an exemplary procedure for constructing an adjacent table at a node already participated in the overlay network in the second embodiment.
Figure 15B:
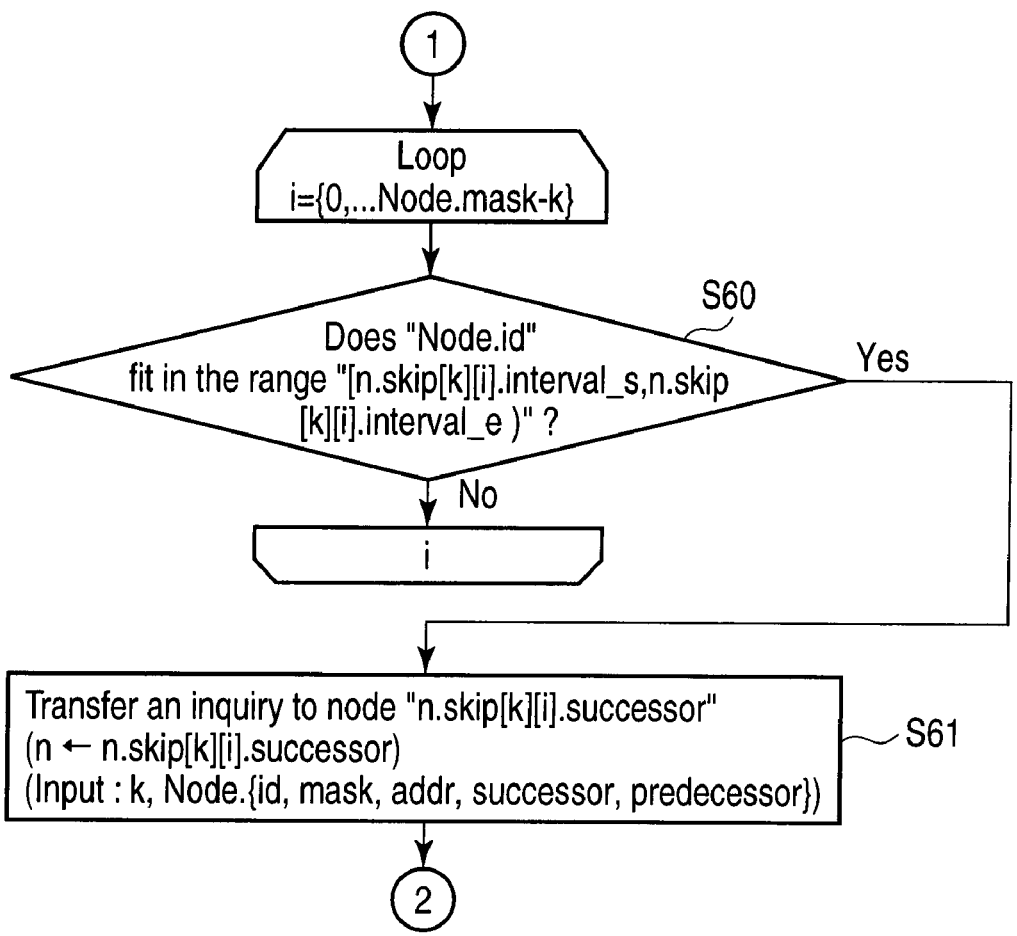
FIG. 15B is a flowchart to help explain an exemplary procedure for constructing an adjacent table at a node already participated in the overlay network in the second embodiment.
Figure 16:
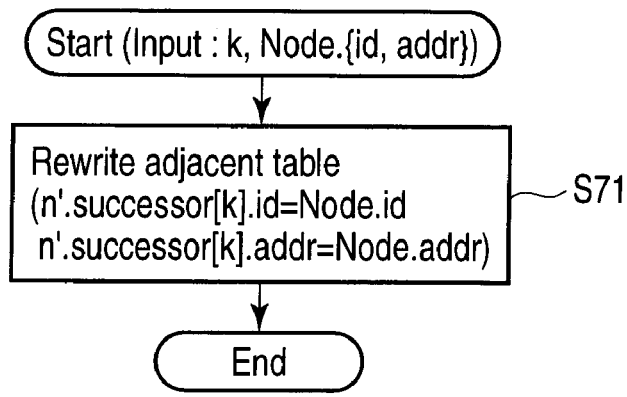
FIG. 16 is a flowchart to help explain an exemplary procedure for constructing an adjacent table at an adjacent node preceding a new participating node in the second embodiment.

Having received the inquiry from node "Node," the table management module 28 of node n executes the following processes according to the flowcharts of FIGS. 15A and 15B. First, the table management module 28 of node n determines whether "ring[n.predecessor[k].id, Node.id, n.id)" is positive, on the basis of "k" ("k" included in the received inquiry) and "Node.{id, mask, addr, successor [0, . . . , Node.mask], predecessor [0, . . . , Node.mask]}" and its ID(n.id) (step S51). Here, "n.predecessor[k]. id" indicates the ID of the predecessor node of node n on the kth-level overlay network. Moreover, "Node.id" and "n.id" indicate the ID of node "Node" and the ID of node n, respectively.

For example, if the ID of node "Node" lies between the ID of the predecessor node of node n and the ID of node n on the ring, the result of the determination in step S51 is positive. Specifically, as a result of the participation of node "Node," if the node "Node" becomes a new predecessor node of node n and therefore the node (n.predecessor[k]) acted as the predecessor node of node n until the participation of the node "Node" becomes a new predecessor node of the node "Node", the result of the determination in step S51 is positive.

If the result of the determination in step S51 is positive, the table management module 28 of node n corrects the contents of configuration information 500-t of the node "Node" included in the inquiry from node "Node" (step S52). Specifically, the table management module 28 of node n corrects (updates) "Node.predecessor[k].id" and "Node.predecessor[k].addr" in configuration information 500-t(N) of node "Node" to "n.predecessor[k].id" and "n.predecessor[k].addr," respectively. Moreover, the table management module 28 of node n corrects (updates) "Node.successor[k].id" and "Node.successor[k].addr" in configuration information 500-t(N) of node "Node" to "n.id" and "n.addr," respectively. In addition, the table management module 28 of node n corrects (updates) "n.predecessor[k].id" and "n.predecessor[k].addr" in configuration information 500-t(n) of node n itself to "id" and "addr" of node "Node", that is, "Node.id" and "Node.addr," respectively.

Next, the table management module 28 of node n notifies the update of the successor node to a node (predecessor node) preceding and adjoining the node "Node" on the kth-level sub-overlay network on the basis of "id" (Node.predecessor[k].id) of the predecessor node (Node.predecessor[k]) (step S53). The notice (update notice) includes "k" and "Node.{id, addr}".

Having received the update notice from node n, node "Node.predecessor[k]" (hereinafter, referred to as node n') corrects (updates) "id" and "addr" of a node (successor node) succeeding and adjoining the node n' on the kth-level sub-overlay network included in succeeding adjacent table 521-t of its configuration information 500-t, that is, "n'.successor[k].id" and "n'.successor[k].addr," to "Node.id" and "Node.addr," respectively, on the basis of the notified "k" and "Node.{id, addr}" (step S71).

After having executed step S53, the table management module 28 of node n increments k by one (step S54) and determines whether the incremented k has exceeded "Node.mask" (step S55). If the incremented k has not exceeded "Node.mask" (No in step S55), the table management module 28 of node n determines whether the first k bits of "Node.id" coincide with the first k bits of "n.id" (step S56). If they coincide with one another (Yes in step S56), the table management module 28 of node n again executes the processes starting in step S51, using the incremented k.

In contrast, if the first k bits of "Node.id" do not coincide with the first k bits of "n.id" (No in step S56), the table management module 28 of node n then determines whether the first k bits of "Node.id" coincide with the first k bits of "n.predecessor[k−1].id" (step S57). If they coincide with one another (Yes in step S57), the table management module 28 of node n transfers the inquiry from node "Node" to a node (predecessor node) preceding and adjoining the node n on the (k−1)th-level sub-overlay network (step S58) and terminates the process. The predecessor node is a node whose ID is "n.predecessor[k−1].id," that is, node "n.predecessor[k−1]". Node "n.predecessor[k−1]" functions as a new node n asked by node "Node". The inquiry transferred to the new node n includes the present k and "Node.{id, mask, addr, successor, predecessor}," configuration information 500-t(N) of node "Node".

In contrast, if the first k bits of "Node.id" do not coincide with the first k bits of "n.predecessor[k−1].id" (No in step S57), the table management module 28 of node n proceeds to step S59. If the incremented k has exceeded "Node.mask" (Yes in step S55), the table management module 28 of node n also proceeds to step S59. In step S59, the table management module 28 of node n returns a response to the inquiry from node "Node" to the node "Node" and terminates the process. The response includes information "Node.{successor, predecessor}" about a node (successor node) succeeding and adjoining node "Node" and about a node (predecessor node) preceding and adjoining the node "Node".

Furthermore, if the result of the determination in step S51 is "No," that is, if ID of node "Node" does not lie between the ID of the predecessor node of node n and the ID of node n on the ring, the table management module 28 of node n proceeds to step S60. In step S60, the table management module 28 of node n refers to entry "skip[k][i]" (i={0, . . . , Node.mask−k}) in its own skip table 523-t(n), thereby determining whether "id" (Node.id) of the inquiry node "Node" fits into a range of "[n.skip[k][i].interval_s, n.skip[k][i].interval_e)". The table management module 28 of node n repeats step S60, while changing "i" (i={0, . . . , Node.mask−k}) until "Node.id" goes into the above range.

If "Node.id" fits into the range when "i" takes a certain value, the table management module 28 of node n transfers the inquiry from node "Node" to node "n.skip[k][i].successor" (step S61) and terminates the process. The node "n.skip[k][i].successor" functions as a new node n asked by node "Node". The inquiry transferred to the new node n includes the present k and "Node.{id, mask, addr, successor, predecessor}," configuration information 500-*t*(N) of node "Node".

Then, having received a response from the inquiry node n to the inquiry in step S42 (step S43), the table management module 28 of node n initializes "Node.skip[j][i].start," "Node.skip[j][i].interval_s," "Node.skip[j][i].interval_e," "Node.skip[j][i].successor.id," and "Node.skip[j][i].successor.addr" held in skip table 523-*t*(N) of the node "Node" for one combination of "j" and "i" in the range of "j=0" to "j=Node.mask" and "i=0" to "i=Node.mask−j" (step S44). Here, "Node.skip[j][i].start" is initially set to "{Node.nwid>>(Node.mask−j)<<(M−j)}+(Node.nid+$2^i$)mod $2^{M-j}$". "Node.skip[j][i].interval_s" is initially set to "Node.skip[j][i].start". "Node.skip[j][i].interval_e" is initially set to "Node.skip[j][i+1 mod(Node.mask−j+1)].start". Moreover, "Node.skip[j][i].successor.id" is initially set to "Node.id". "Node.skip[j][i].successor.addr" is initially set to "Node.addr".

After initializing its skip table 523-*t*(N), the table management module 28 of node "Node" inquires "skip[j][i].successor" of node "Node" from an arbitrary node n already participated in the overlay network to construct the skip table 523-*t*(N) via the node n (step S45). The inquiry includes "i," "j," and "Node.{id, mask, addr, skip[j][i]}" in configuration information 500-*t*(N) of node "Node".

Step S44 and step S45 are repeated for all the combinations of "j" and "i" in the range of "j=0" to "j=Node.mask" and "i=0" to "i=Node.mask−j". That is, each time a response to the inquiry in step S45 is returned (step S46), the operation of changing "j" or "i" and executing step S44 and step S45 is repeated.

Figure 17:
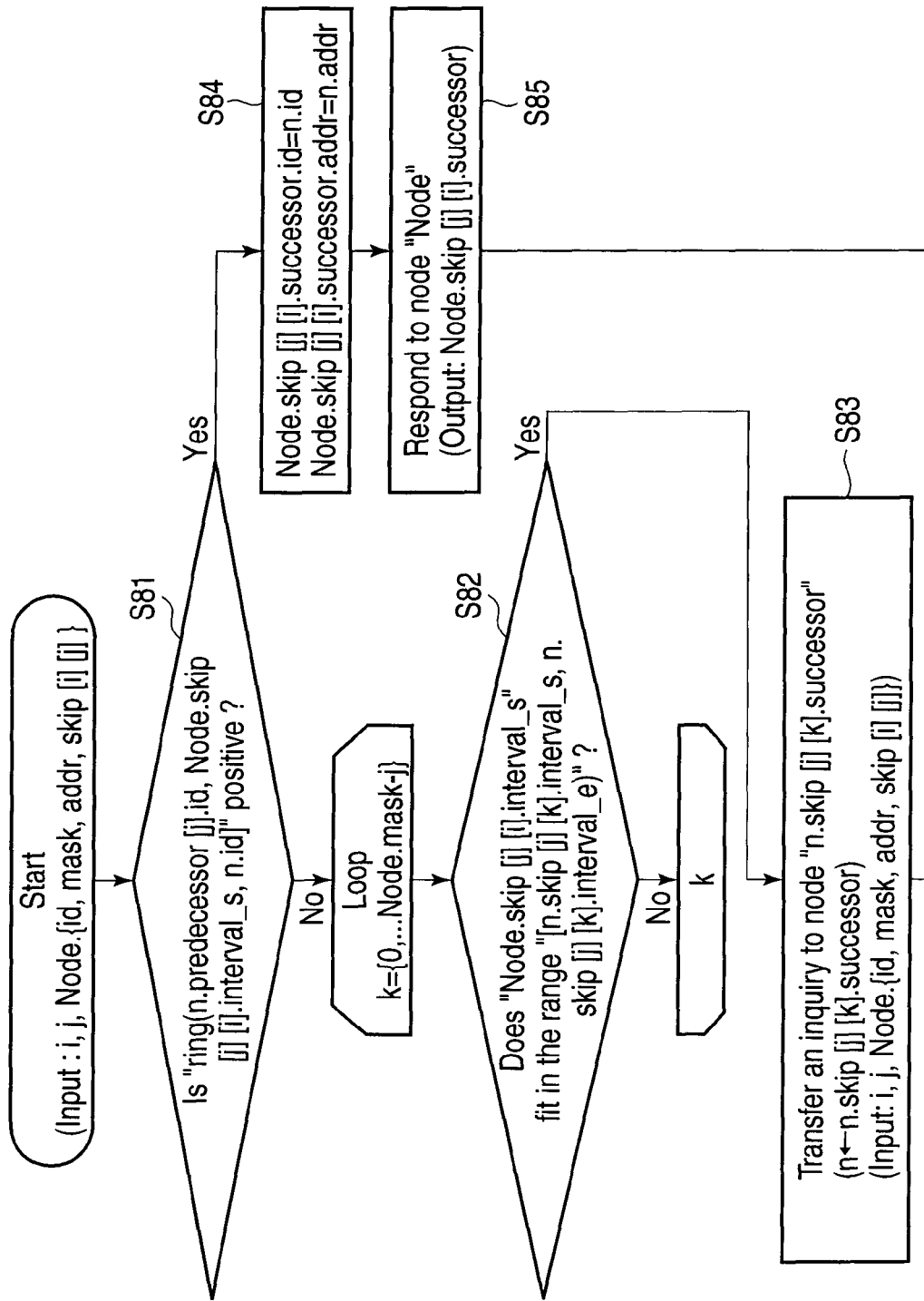
FIG. 17 is a flowchart to help explain an exemplary procedure for constructing a skip table at a node already participated in the overlay network in the second embodiment.

Having received the inquiry from node "Node" in step S45, the table management module 28 of node n executes the following processes according to the flowchart of FIG. 17. First, the table management module 28 of node n determines whether "ring(n.predecessor[j].id, Node.skip[j][i].interval_s, n.id]" is positive, on the basis of "i," "j," "Node.{id, mask, addr, skip[i][j]}," and its ID(n.id) (step S81). For example, if "Node.skip[i][j].interval_s" lies between ID (n.predecessor [j].id) of a node (predecessor node of node n) "n.predecessor [j]" preceding and adjoining node n on a ring in the jth-level sub-overlay network, and its ID(n.id), the result of the determination in step S81 is positive.

If the result of the determination in step S81 is not positive, the table management module 28 of node n determines whether "Node.skip[j][i].interval_s" fits into a range of "[n.skip[j][k].interval_s, n.skip[j][k].interval_e)" in a sub-overlay network of the kth level (the initial value of k is zero) (step S32). The table management module 28 of node n repeats step S82, while changing k (k={0, . . . , Node.mask−j}) until "Node.skip[j][i].interval_s" has fitted in the above range.

If "Node.skip[j][i].interval_s" fits into the above range when k takes a certain value (Yes in step S82), the table management module 28 of node n transfers the inquiry from node "Node" to node "n.skip[i][k].successor" (skip node for node n) (step S83) and terminates the process. The node "n.skip[j][k].successor" becomes a new node n asked by node "Node" and executes the processes starting in step S81. The inquiry transferred to the new node n includes "i," "j," and "Node.{id, mask, addr, skip[j][i]}".

On the other hand, if the result of the determination in step S81 is positive, that is, if "Node.skip[j][i].interval_s" lies between the ID (n.predecessor[j].id) of the predecessor node of node n in the jth-level sub-overlay network and the ID (n.id) of the node n, the table management module 28 of node n proceeds to step S84. In step S84, the table management module 28 of node n corrects (updates) "Node.skip[j][i].successor.id" and "Node.skip[j][i].successor.addr" to be held in skip table 523-*t*(N) of node "Node" to the ID (n.id) and address (n.addr) of the node n, respectively. The table management module 28 of node n notifies the corrected information "Node.skip[j][i].successor" to node "Node" (step S85) and terminates the process.

As described above, in the second embodiment, a new node "Node" participating in the overlay network initializes succeeding adjacent table 521-*t*(N) and preceding adjacent table 522-*t*(N) and then obtains the address of an arbitrary node n already participated in the overlay network by the same method as that of the first embodiment. Then, node "Node" constructs succeeding adjacent table 521-*t*(N) and preceding adjacent table 522-*t*(N) via the node n according to the flowcharts of FIGS. 15A and 15B. Next, node "Node" goes through node n (an arbitrary node n or a skip node), thereby constructing skip table 523-*t*(N) according to the flowchart of FIG. 17. A node already participated in the overlay network has to update the skip table. A method of updating the skip table has been disclosed in document 5 and document 6.

<Searching for a Node>

Figure 18:
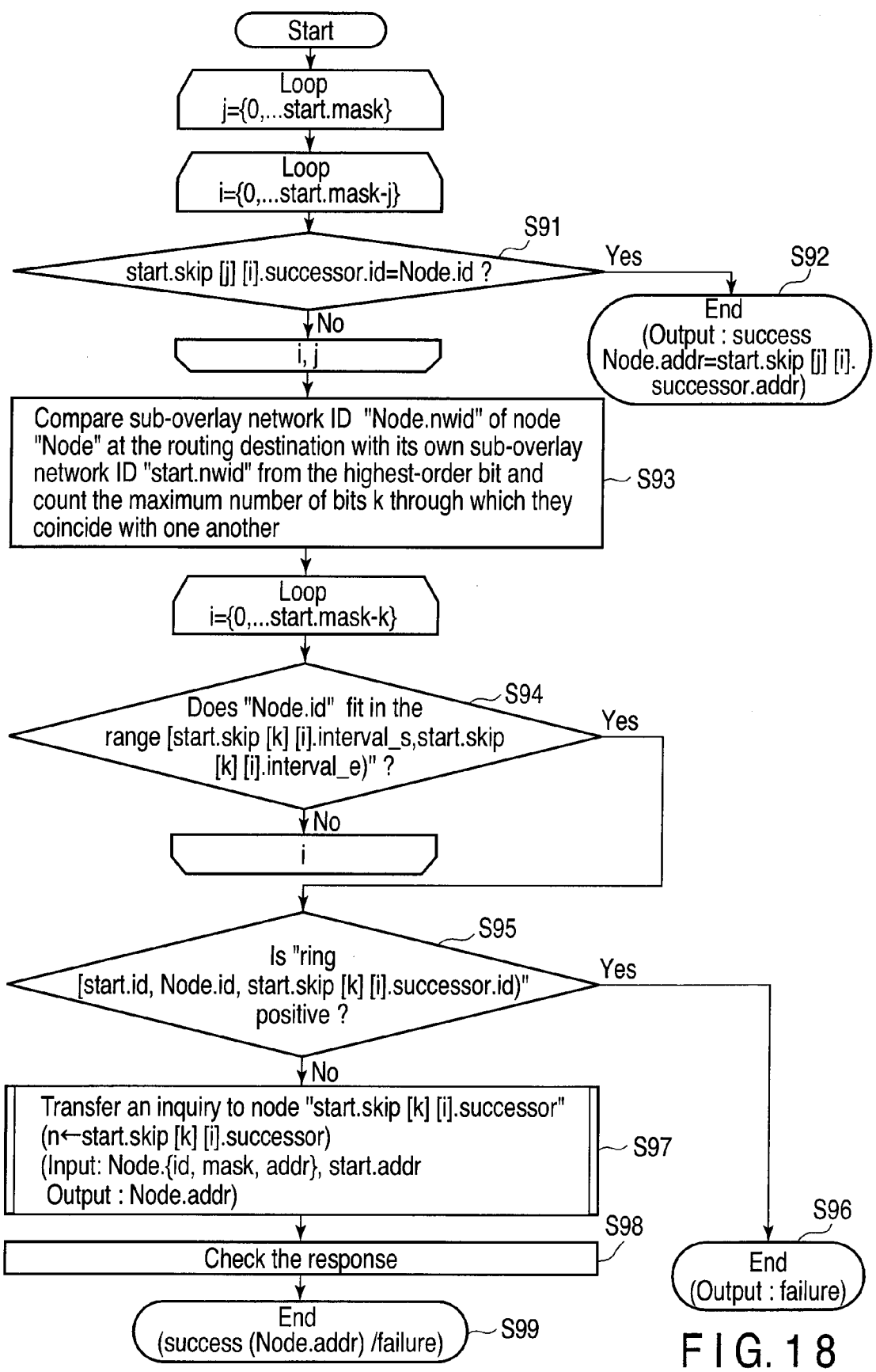
FIG. 18 is a flowchart to help explain an exemplary procedure for a node routing an arbitrary node using the skip table in the second embodiment.

Next, as in the first embodiment, the procedure for node "start" performing the routing of node "Node" will be explained with reference to the flowcharts of FIGS. 18 and 19. First, the routing module 29 of node "start" refers to skip table 523-*t* managed by itself, thereby determining whether "start.skip[j][i].successor.id" (j={0, . . . , Node.mask}, i= {0, . . . , Node.mask−j}) coincides with ID (Node. id) of node "Node" at the routing destination (step S91). The routing module 29 of node "start" repeats step S91 for combinations of j={0, . . . , start.mask} and i={0, . . . , start.mask−j} until the result of the determination in step S91 has shown "Yes".

If the result of the determination in step S91 has shown "Yes," the routing module 29 of node "start" determines that the node searching has succeeded. In this case, on the basis of skip table 523-*t*, the routing module 29 of node "start" obtains "start.skip[j][i].successor.addr" corresponding to "j" and "i" when the result of the determination in step S91 has shown "Yes" as the IP address of node "Node" at the routing destination and terminates the node searching process (step S92).

On the other hand, if the result of the determination in step S91 is "No" even when step S91 has been repeated for all of the combinations of j={0, . . . , start.mask} and i={0, . . . , start.mask−j}, the routing module 29 of node "start" proceeds to step S93. As in step S21 of the first embodiment, in step S93, the routing module 29 of node "start" compares the sub-overlay network ID "Node.nwid" included in "ID Node. id" of node "Node" at the routing destination with the sub-overlay network ID "start.nwid" included in ID "start.id" of the node "start" itself from the highest-order bit sequentially. In step S93, the routing module 29 of node "start" counts the maximum number of bits k through which "Node.nwid" coincides with "start.nwid" consecutively in the comparison, beginning with the highest-order bit.

Next, the routing module 29 of node "start" refers to the contents (a pair of "start.skip[k][i].interval_s" and "start.skip [k] [i].interval_e") of entry "skip[k][i]" in its skip table 523-*t*, thereby determining whether "id" (Node.id) of node "Node" at the routing destination fits into a range of "[start.skip[k][i] .interval_s, start.skip[k][i].interval_e)" indicated by the contents (step S94). That is, the routing module 29 of node "start" determines whether "id" of node "Node" at the routing destination is "successor.id" (start.skip[k][i].successor.id) of "start.skip[k][i].interval_s". The routing module 29 of node "start" repeats step S94 for i={0, start.mask−k} until "Node.id" has fitted in the range.

If "Node.id" fits into the above range (Yes in step S94) when "i" takes a certain value, the routing module 29 of node "start" determines whether "ring[start.id, Node.id, start.skip [k] [i].successor.id)" is positive, that is, whether "Node.id" is an arrangement which satisfies the condition that it fits into a range of "[start.id, start.skip[k][i].successor.id)" on the ring in the ith-level sub-overlay network (step S95). "start.skip[k] [i].successor.id" has been stored in entry "skip[k][i]" in skip table 523-t used when it was determined in step S94 that "Node.id" fitted in the range "[start.id, start.skip[k][i].successor.id)".

If the result of the determination in step S95 is "Yes," this means that "Node.id" is not "start.skip[k][i].successor.id," which conflicts with the result of the determination in step S94. In this case, the routing module 29 of node "start" determines that node "Node" at the routing destination does not exist and therefore it has failed in the node searching process, and terminates the process (step S96).

In contrast, if the result of the determination in step S95 is "No" and therefore does not conflict with the result of the determination in step S94, the routing module 29 of node "start" determines that node "start.skip[k][i].successor" on the ith-level sub-overlay network as node n at the routing request destination and transfers to the node n a routing request to obtain the IP address (Node.addr) of node "Node" (step S97). The routing request includes a pair of ID "id" (Node.id) of node "Node" and the number of mask bits "mask" (Node.mask), that is, "Node.{id, mask}" and address (IP address) "addr" (start.addr) of node "start".

Figure 19:
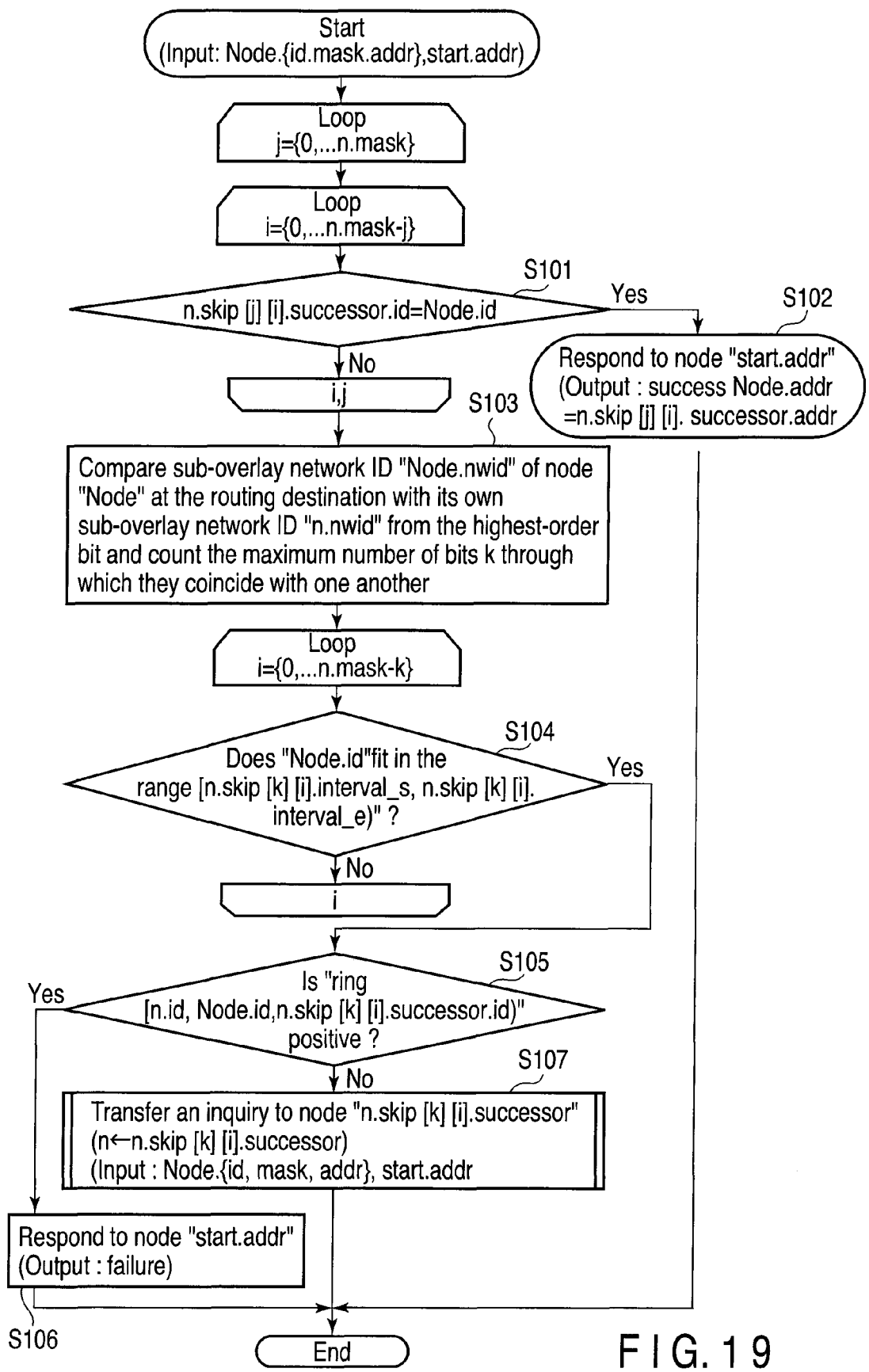
FIG. 19 is a flowchart to help explain an exemplary procedure in a case where a node that has received a routing request routes a requested node using the skip table in the second embodiment.

Having received the routing request (here, the routing request from node "start"), the routing module 29 of node n executes a node searching process according to the flowchart of FIG. 19. First, the routing module 29 of node n executes step S101 like step S91 at the preceding node "start". Specifically, the routing module 29 of node n refers to skip table 523-t managed by itself, thereby determining whether "n.skip [j][i].successor.id" (j={0, . . . , n.mask}, i={0, . . . , n.mask−j}) coincides with the ID (Node. id) of node "Node" at the routing destination (step S101). The routing module 29 of node n repeats step S101 for combinations of j={0, . . . , start.mask} and i={0, . . . , start.mask−j} until the result of the determination in step S101 has shown "Yes".

If the result of the determination in step S101 has shown "Yes," the routing module 29 of node n determines that the node searching has succeeded. In this case, on the basis of skip table 523-t, the routing module 29 of node n obtains "n.skip[j][i].successor.addr" corresponding to "j" and "i" when the result of the determination in step S101 became "Yes" as the IP address of node "Node" at the routing destination (step S102). In step S102, the routing module 29 of node n returns a response including IP address "n.skip[j][i].successor.addr" (Node.addr) obtained by itself to node "start" specified by IP address "start.addr" included in the routing request.

On the other hand, if the result of the determination in step S101 is "No" even when step S101 has been repeated for all of the combinations of j={0, . . . , start.mask} and i={0, . . . , start.mask−j}, the routing module 29 of node n proceeds to step S103. As in step S93, in step S103, the routing module 29 of node n compares sub-overlay network ID "Node.nwid" included in "ID Node.id" of node n at the routing destination with sub-overlay network ID "n.nwid" included in ID "n.id" of the node n itself from the highest-order bit sequentially. In step S103, the routing module 29 of node n counts the maximum number of bits k through which "Node.nwid" coincides with "n.nwid" consecutively in the comparison, beginning with the highest-order bit.

Next, the routing module 29 of node n refers to entry "skip[k][i]" (i={0, . . . , mask−k}) in its skip table 523-t, thereby determining whether "id" (Node.id) of node "Node" at the routing destination fits into a range of "[n.skip[k] [i].interval_s, n.skip[k][i].interval_e)" (step S104). That is, the routing module 29 of node n determines whether "id" of node "Node" at the routing destination is "successor.id" (n.skip[k][i].successor.id) of "n.skip[k][i].interval_s". The routing module 29 of node n repeats step S104 for i={0, . . . , n.mask−k} until "Node.id" has fitted in the range.

If "Node.id" fits into the above range (Yes in step S104) when "i" takes a certain value, the routing module 29 of node n proceeds step S105. In step S105, the routing module 29 of node n determines whether "ring[n.id, Node.id, n.skip[k] [i].successor.id)" is positive, that is, whether "Node.id" is an arrangement which satisfies the condition that it fits into a range of "[n.id, n.skip[k][i].successor.id)" on the ring in the ith-level sub-overlay network.

If the result of the determination in step S105 is "Yes," this means that "Node.id" is not "n.skip[k][i].successor.id," which conflicts with the result of the determination in step S104. In this case, the routing module 29 of node n determines that node "Node" at the routing destination does not exist and therefore it has failed in the node searching, and returns a response to notify the node searching failure to node "start" specified by IP address "start.addr" included in the routing request (step S106).

In contrast, if the result of the determination in step S119 is "No" and therefore does not conflict with the result of the determination in step S104, the routing module 29 of node (old node) n determines that node "n.skip[k][i].successor" (a skip node for node n) on the ith-level sub-overlay network as a new node n at the routing destination and transfers to the new node n a routing request to obtain the IP address (Node.addr) of node "Node" (step S107). Like the routing request transferred in step S97, the routing request includes "Node.{id, mask}" and "start.addr". When a routing request is transferred from the old node n to the new node n, the new node n carries out a node searching process according to the flowchart of FIG. 19 in the same way as the old node does.

When the node n has returned a response to node "start" as a result of node n having executed step S102 or S106, the routing module 29 of the node "start" receives the response and checks the contents of the response (the success or failure of the node searching process) (step S98). Then, the routing module 29 of node "start" terminates the node searching process (step S99).

As described above, in the second embodiment, to perform the routing of node "Node," node "start" (or node n) selects an entry in skip table 523-t, which enables routing at the shortest distance on the basis of the count of the maximum number of bits k. Specifically, to perform routing at the shortest distance, node "start" (or node n) selects an entry corresponding to the deepest level one (the kth-level one) of the sub-overlay networks in which the node "start" (or node n) itself and node "Node" at the routing destination participate from the skip table 523-t managed by node "start" (or node n) itself. If the routing of node "Node" cannot be performed because node "Node" is not a skip node for node "start" (or node n) on the kth sub-overlay network, the routing request is transferred to the skip node. At the receiver of the routing request, the same process as at the sender of the routing request is carried out. In this way, the routing request is transferred to the skip node repeatedly, thereby performing the routing of node "Node".

By such a routing (node searching) method, routing can be performed with a smaller number of hops than in the first embodiment, while the number of sub-overlay networks for the request to go through is being decreased, taking proximity into account.

<Concrete Example of Searching for a Node>

Figure 20:
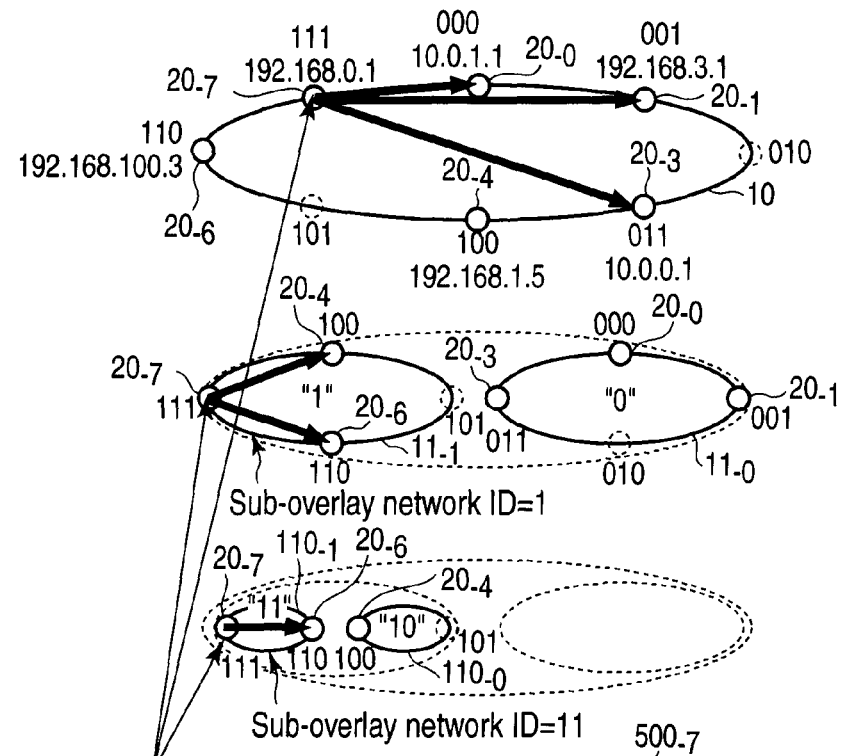
FIG. 20 shows an example of the hierarchical structure of the overlay network in the second embodiment together with an example of the data structure of configuration information managed by one of the nodes participating in the overlay network.

Next, a concrete example of node searching according to the procedure shown in the flowcharts of FIGS. 18 and 19 will be explained with reference to an example of the hierarchical structure of an overlay network in FIG. 20. FIG. 20 also shows an example of the data structure of configuration information 500-7 (t=7) managed by node (start node) "111" (node 20-7) whose ID (ID id) is "111" (the number of mask bits "mask=2)" and whose address (addr) is "192.168.0.1". As in the first embodiment, suppose node (start node) "111" whose ID is "111" (mask=2) performs the routing of each of nodes "110," "101," and "001" in "ID={110, 101, 001}". It should be noted that the sub-overlay network ID (ID nwid) of node "111" is "11".

First, the routing of node "110" (node 20-6) whose ID (Id id) is "110" will be explained. Node "111" (start) determines that ID (start.skip[2][0].successor.id) of a skip node stored in entry "skip[2][0]" (an entry corresponding to the second-level sub-overlay network 110-1) in skip table 523-7 (t=7) managed by itself coincides with "110," the ID (Node.id) of node "Node" at the routing destination (step 91). In this case, node "111" obtains "start.skip[2][0].successor.addr=192.168.100.3" stored in entry "skip[2][0]" in skip table 523-7 (t=7) as the IP address of node "Node" at the routing destination (step S92) and terminates the node searching process. That is, node "111" can perform the routing of node "110" whose ID is "110" without going through the first-level sub-overlay network 11-1 including the second-level sub-overlay network 110-1 and through the 0th-level sub-overlay network 10.

Next, the routing of node "101" whose ID is "101" will be explained. Skip table 523-7 (t=7) managed by node "111" doesn't have the ID of a skip node that coincides with "101," the ID (Node.id) of node "Node" at the routing destination (step S91). In this case, node "111" compares "ID=110" with "ID nwid=11" from the highest-order bit sequentially, thereby counting the number of bits k (here, k=1) through which they coincide with one another consecutively, beginning with the highest-order bit (step S93). Then, node "111" (start) refers to the contents (a pair of "start.skip[1][1].interval_s=101" and "start.skip[1][1].interval_e=111") in entry "skip[1][1]" (an entry corresponding to the first-level sub-overlay network 11-1) in skip table 523-7 (t=7) managed by itself. In this case, node "111" determines whether "id (Node.id)=101" of node "Node" at the routing destination fits into a range of "[start.skip[1][1].interval_s, start.skip[1][1].interval_e]=[101, 111)" (step S94).

Then, node "111" (start) determines whether "ring[start.id, Node.id, start.skip[1][1].successor.id)=ring[111, 101, 110)" is positive (step S95). "skip[1][1].successor.id=110" has been stored in entry "skip[1][1]" in skip table 523-t used when it was determined that "Node.id" fitted in the range "[101, 111)". "ring [111, 101, 110)" is positive, which conflicts with the result of the determination in step S94. In this case, node "111" determines that node "Node" (i.e., a node whose ID is "101") at the routing destination does not exist and therefore it has failed in the node searching process and terminates the process (step S96).

Next, the routing of node "001" whose ID is "001" will be explained. Node "111" (start) determines that ID (start.skip[0][1].successor.id) of a skip node stored in entry "skip[0][1]" (an entry corresponding to the 0th-level sub-overlay network 10) in skip table 523-7 (t=7) managed by itself coincides with "001," the ID (Node.id) of node "Node" at the routing destination (step S91). In this case, node "111" obtains "start.skip[0][1].successor.addr=192.168.3.1" stored in entry "skip[0][1]" in skip table 523-7 (t=7) as the IP address of node "Node" at the routing destination (step S92) and terminates the node searching process.

As seen from the above concrete example, according to the second embodiment, the following effects can be obtained. A sub-overlay network in which a node (hereinafter, referred to as a first node) to carry out a node searching process (a routing process) participates is referred to as a first sub-overlay network. A state where a node at the routing destination (hereinafter, referred to as a second node) also participates in the first sub-overlay network is referred to as a first state. In contrast, a state where the second node (a node at the routing destination) does not participate in the first sub-overlay network is referred to as a second state. In the second state, another sub-overlay network included in a higher-level sub-overlay network in which both the first and second nodes participate (i.e., a sub-overlay network higher in level than the first sub-overlay network) is referred to as a second sub-overlay network.

In the first state, the first node can perform routing without going through sub-overlay networks excluding the first sub-overlay network. Moreover, in the second state, too, if the second node has participated in the second sub-overlay network, routing can be performed without going through another sub-overlay network included in a sub-overlay network higher in level than the second sub-overlay network. In addition, the routing in the second embodiment can be realized with a smaller number of hops than in the first embodiment.

Third Embodiment

Next, a third embodiment of the invention will be explained. The technique for arranging objects at each node on an overlay network and storing and managing a large number of objects as a whole has been proposed. However, in the conventional technique, proximity and nonhomogeneity are not always taken into account. The third embodiment is characterized in that an object ID given to an object stored in a node is taken as the ID of a node at a storage location by the overlay network configuration method applied in the first embodiment, thereby solving the problems of proximity and nonhomogeneity.

Figures 21, 22:
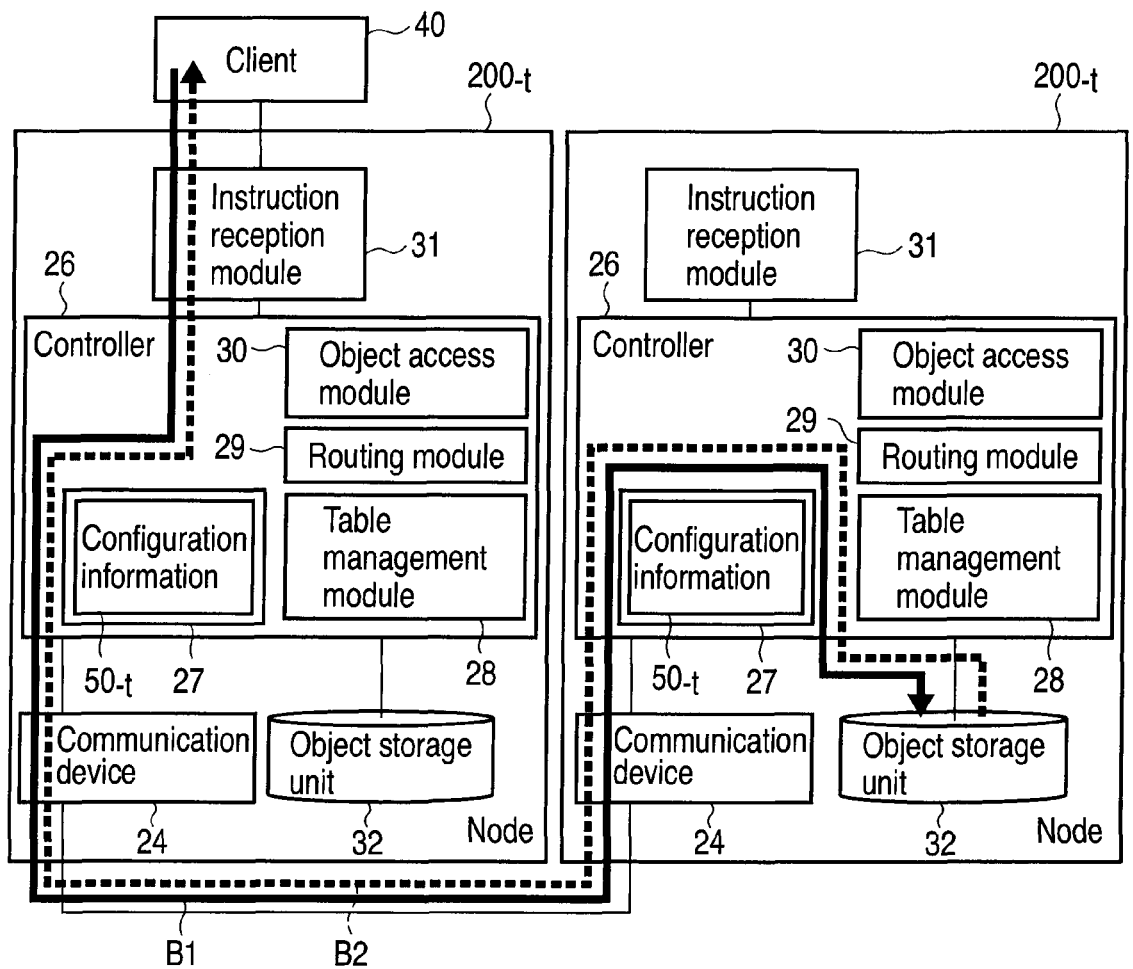
FIG. 21 is a block diagram showing an exemplary functional configuration of a node applied in a third embodiment of the invention.
FIG. 22 shows an exemplary data structure of an object stored in the object storage unit shown in FIG. 21.

FIG. 21 mainly shows a functional configuration of node 200-t applied in the third embodiment. In FIG. 21, the same elements as those in FIG. 4 are indicated by the same reference numerals. In the third embodiment, a plurality of nodes 200-t not only constitute such an overlay network in cooperation with one another as has been applied in the first embodiment, but also execute an instruction from a client (client terminal) 40 to, for example, store or take out an object. An object is a group of data to be stored in a computer.

The client 40 is connected to node 200-t with, for example, a communication line. The instructions from the client 40 include an instruction to, for example, store or take out an object. That is, the client 40 instructs node 200-t to store or take out an object. To store an object, the client 40 gives an object including an object ID, explained later, and data to an instruction reception module 31 (described later) of node 200-t and obtains the success/failure of the storing of an object from the instruction reception module 31. To take out an object, the client 40 gives an object ID and an object sub-ID, explained later, to the instruction reception module 31 of node 200-*t*. When node 200-*t* has succeeded in taking out the object, the client 40 obtains the object from the instruction reception module 31 of node 200-*t*. When node 200-*t* has failed to take out an object, the client 40 receives a notice of failure from the instruction reception module 31.

Node 200-*t* is a computer which has the same hardware configuration as that of node 20-*t* of the first embodiment. Like node 20-*t*, node 200-*t* includes a communication device 24 and a controller 26. The configuration of the controller 26 differs partly from that of the first embodiment. The controller 26 includes an object access module 30 in addition to the configuration storage unit 27, table management module 28, and routing module 29. As in the first embodiment, the configuration storage unit 27 stores configuration information 50-*t* which has a data structure shown in FIG. 5. Node 200-*t* further includes an instruction reception module 31 and an object storage unit 32.

The instruction reception module 31 receives an instruction from the client 40 and gives the received instruction to the controller 26. Moreover, the instruction reception module 31 receives a response to the instruction (request) given to the controller 26 from the controller 26 and returns it to the client 40.

The controller 26 executes the instruction given by the instruction reception module 31 in addition to the processes in the first embodiment. The routing module 29 of the controller 26 carries out a node searching process common to these processes on the basis of configuration information 50-*t* managed by node 200-*t*. For example, when having received an instruction to store or take out an object, the routing module 29 searches for a node in which an object is to be stored or has been stored. Specifically, the routing module 29 searches for a node in which an object is to be stored or has been stored via several nodes 20-*t*, as shown by arrow B1 in FIG. 21. The controller 26 (the routing module 29 of the controller 26) requests the node searched for to store or take out an object and receives a response from the node searched for, as shown by arrow B2 shown in FIG. 21.

The object storage unit 32, which stores objects, is realized by using a storage area of an auxiliary storage device corresponding to the auxiliary storage device 23 in node 20-*t* shown in FIG. 3. The object access module 30 of the controller 26 carries out the process of storing an object into the object storage unit 32 and the process of taking an object out of the object storage unit 32.

<Configuration of an Object>

FIG. 22 shows an example of the data structure of an object stored in the object storage unit 32. An object is composed of the number of ID "id" bits M, the number of ID "subid" bits K, ID "id," ID "subid," the number of mask bits "mask," and data "data".

The number of ID "id" bits M indicates the number of bits in object ID "id" described later. The value of M is common to all of the objects. In the example of FIG. 22, M is 3 (M=3). The number of ID "subid" bits K indicates the number of bits in object sub-ID "subid" described later. The value of K is common to all of the objects. In the example of FIG. 22, K is 5 (K=5).

In the third embodiment, all of the objects each have a unique ID. The ID is composed of M-bit object ID "id" and K-bit object sub-ID "subid". Object ID "id" is used to determine a node in which an object is to be stored (storage location node). Object sub-ID "subid" is used to identify an object at a storage location node.

Object ID "id" is composed of sub-overlay network ID "nwid" and node ID "nid". Sub-overlay network ID "nwid" is an ID to specify a sub-overlay network in which a node in which an object is to be stored has participated. Node Id "nid" is an ID to specify a node in which an object is to be stored. In the third embodiment, sub-overlay network ID "nwd" is represented by the high-order x bits in the M-bit ID "id" and node ID "nid" is represented by the low-order "M−x" bits. The x is expressed by the number of mask bits "mask" described below. That is, sub-overlay network ID "nwid" is the high-order "mask" bits in ID "id" and node ID "nid" is the low-order "M-mask" bits in ID "id". The number of mask bits "mask" indicates the number of mask bits to cut out node ID "nid" and sub-overlay network ID "nwid" from object ID "id".

<Determining a Node in which an Object is to be Stored>

Next, a method of determining a node in which an object is to be stored applied in the third embodiment will be explained. In the third embodiment, an object is stored in a node whose node ID is closest to node ID "nid" in object ID "id" of all the nodes belonging to a sub-overlay network specified by sub-overlay network ID "nwid" in object ID "id". Here, 'a node whose node ID is closest to node ID "nid"' means a node which has, for example, "a node ID closest counterclockwise to" node ID "nid" in the object ID "id" when arranging the node IDs of all the nodes belonging to a sub-overlay network specified by sub-overlay network ID "nwid" in object ID "id," in ascending order so as to form a ring. Here, suppose a node which has "a node ID closest counterclockwise to" includes a node which has a node ID coincides with node ID "nid".

For example, in an overlay network shown in FIG. 27, described later, objects whose object IDs are "110," "101," and "001" are stored in the following nodes:

Object whose object ID is "110" is stored in a node whose ID is "110".

Object whose object ID is "101" is stored in a node whose ID is "101".

Object whose object ID is "001" is stored in a node whose ID is "001".

In the third embodiment, by determining a node in which an object is to be stored as described above, a mechanism for solving a nonhomogeneity problem can be provided.

<Storing an Object>

Next, a method of storing an object applied in the third embodiment will be explained. The process of storing an object (an object storing process) is roughly divided into a first and a second step. In the first step, a node in which an object is to be stored (a storage location node) is searched for (that is, the routing of an object is performed) on the basis of an object ID. In the second step, an object is requested to be stored into a storage location node searched for. In the third embodiment, the node searching (routing) method applied in the first embodiment is used in searching for a storage location node in the first step, which enables routing, taking proximity into account.

Hereinafter, the details of an object storing process will be explained with reference to the flowcharts of FIGS. 23 to 26. Suppose the instruction reception module 31 receives from the client 40 an instruction to store object "0bj" (or an object storing instruction) and gives the object storing instruction to the controller 26. Node 200-*t* to which the client 40 has given the object storing instruction is expressed as node "start" (node 200-*t*(S)). Moreover, configuration information 50-*t* managed by node "start" is represented as configuration information 50-*t*(S) and adjacent table 52-*t* included in the configuration information 50-*t*(S) is expressed as adjacent table 52-*t*(S).

Having received the object storing instruction from the client 40, node "start" (the routing module 29 included in the controller 26 of node "start") carries out a node searching process (the routing of an object) to search for a node (a storage location node) "ObjNode" in which the object specified by the instruction is to be stored (step S111). With object ID "Obj.id" of object "Obj" and the number of mask bits "Obj.mask" (i.e., "Obj.{id, mask}") as inputs, node "start" executes the node searching process according to the procedure shown in a flowchart in FIG. 24 as follows.

First, on the basis of the number of mask bits "Obj.mask," node "start" cuts out sub-overlay network ID "Obj.nwid" from object ID "Obj.id" of object "Obj" (step S121). In step S121, node "start" compares sub-overlay network ID "Obj.nwid" with sub-overlay network ID "start.nwid" included in "start.id," the ID of node "start" from the highest-order bit sequentially (step S121). In step S121, node "start" counts the maximum number of bits k through which "Obj.nwid" and "start.nwid" coincide with one another consecutively in the comparison, beginning with the highest-order bit. A sub-overlay network of the level represented by the maximum number of bits k (i.e., the kth-level sub-overlay network) is the deepest-level one of the sub-overlay networks to which node "start" and node "ObjNode" belong.

Then, node "start" selects information on an adjacent node on the kth-level sub-overlay network held in entry "start.table[k]" in adjacent table 52-$t$(S) stored in the configuration storage unit 27 of the node "start" (step S122). That is, node "start" selects, from configuration information 50-$t$(S) managed by the node "start," information on adjacent table 52-$t$(S) corresponding to the deepest-level one of the sub-overlay networks to which the node "start" and storage location node "ObjNode" both belong as information on an adjacent table (or information on an adjacent node), which enables routing at the shortest distance.

Next, node "start" determines whether "Obj.nwid" and "start.nwid" coincide with each other. That is, node "start" determines whether the counted k bits coincide with the number of mask bits "mask" (step S123). If the determination in step S123 has shown "Yes," node "start" determines whether "ring[start.id, Obj.id, start.table[k].id]" is positive (step S124). Here, "start.table[k].id" is "id" included in the selected information on the adjacent node on the kth-level sub-overlay network.

If the determination in step S124 has shown "Yes," node "start" determines that storage location node "ObjNode" is the node "start" itself (step S125). As a result, node "start" determines that it has succeeded in the process of searching for storage location node "ObjNode" for object "Obj" and terminates the process (step S126).

On the other hand, if the determination in step S123 has shown "No," that is, if "Obj.nwid" does not coincide with "start.nwid," node "start" determines that storage location node "ObjNode" has to be searched for in a sub-overlay network whose level is deeper than that of the sub-overlay network to which the node "start" has participated. Then, node "start" determines whether "ring[start.id$^k$, Obj.id$^k$, start.table[k].id$^k$]" is positive (step S127). Here, "start.id$^k$," "Obj.id$^k$," and "start.table[k].id$^k$" represent the high-order k bits of "start.id," "Obj.id," and "start.table[k].id" respectively.

For the determination in step S127 to show "Yes," "start.id$^k$" has to coincide with "Obj.id$^k$". In this case, the result conflicts with the result of the determination in step S123. Thus, if the determination in step S127 has shown "Yes," node "start" determines that storage location node "ObjNode" does not exist and therefore it has failed in the node searching process and terminates the process (step S128).

In contrast, if the determination in step S127 has shown "No," node "start" proceeds to step S129. Node "start" also proceeds to step S129, if the determination in step S124 has shown "No". In step S129, node "start" takes adjacent node 200-$t$ of the node "start" on the kth-level sub-overlay network as node n (node 200-$t(n)$) at the routing destination and transfers a search request (routing request) for searching for storage location node "ObjNode" to the node n. ID "id" of the node n is "start.table[k].id" and its address (IP address) is "start.table[k].addr". The routing request includes ID "id" (Obj.id) of storage location node "ObjNode" and the number of mask bits "mask" (Obj.mask), that is, "Obj.{id, mask}" and address (IP address) "addr" (start.addr) of node "start".

Having received the search request (here, the search request from node "start"), node n (the routing module 29 included in the controller 26 of node n) executes a node searching process for searching for storage location node "ObjNode" of object "Obj" according to a flowchart in FIG. 25 as follows.

First, node n executes step S131 like step S121 in the preceding node "start". Specifically, node n compares sub-overlay network ID "Obj.nwid" included in object ID "Obj.id" of storage location node (routing destination node) "ObjNode" with sub-overlay network ID "n.nwid" included in "n.id," the ID of the node n itself from the highest-order bit sequentially (step S121). Then, node n counts the maximum number of bits k through which "Obj.nwid" and "n.nwid" coincide with one another consecutively, beginning with the highest-order bit. Configuration information 50-$t$ managed by node n is represented as configuration information 50-$t(n)$ and adjacent table 52-$t$ included in the configuration information 50-$t(n)$ is expressed as adjacent table 52-$t(n)$.

After having executed step S131, node n selects information on an adjacent node on the kth-level sub-overlay network held in entry "start.table[k]" in adjacent table 52-$t(n)$ stored in the configuration storage unit 27 of the node n (step S132). That is, node n selects, from configuration information 50-$t$ ($n$) managed by the node n, information on adjacent table 52-$t(n)$ corresponding to the deepest-level one of the sub-overlay networks to which the node n and storage location node "ObjNode" both belong as information on an adjacent table (or information on an adjacent node) which enables routing at the shortest distance.

Next, node n determines whether "Obj.nwid" and "n.nwid" coincide with each other. That is, node n determines whether the counted k bits coincide with the number of mask bits "mask" (step S133). If the determination in step S133 has shown "Yes," node n determines whether "ring[n.id, Obj.id, n.table[k].id]" is positive (step S134). Here, "n.table[k].id" is "id" included in the selected information on the adjacent node on the kth-level sub-overlay network.

If the determination in step S134 has shown "Yes," node n determines that storage location node "ObjNode" is the node n itself (step S135). Then, node n determines that it has succeeded in the process of searching for (or routing) storage location node "ObjNode" for object "Obj" and returns a response including its IP address (n.addr) as IP address "addr" (Obj.addr) of node "ObjNode" to node "start" specified by IP address "start.addr" included in the search request (step S136).

On the other hand, if the determination in step S133 has shown "No," that is, if "Obj.nwid" does not coincide with "n.nwid," node n determines whether "ring[n.id$^k$, Obj.id$^k$, n.table[k].id$^k$]" is positive (step S137). If the determination in step S137 has shown "Yes," node n determines that storage location node "ObjNode" does not exist and therefore it has failed in the node searching process. In this case, node n returns a response to notify the failure of the node searching to node "start" specified by IP address "start.addr" included in the routing request (step S138).

In contrast, if the determination in step S137 has shown "No," node n proceeds to step S139. Node n also proceeds to step S139, if the determination in step S134 has shown "No". In step S139, node n takes adjacent node 200-t of the node n (old node n) on the kth-level sub-overlay network as a new node n (node 200-t(n)) at the routing request destination and transfers to the new node n a search request (routing request) for searching for storage location node "ObjNode". ID "id" of the new node n is "n.table[k].id" and its address (IP address) is "n.table[k].addr". The routing request includes "Obj.{id, mask}" and address (IP address) "addr" (start.addr) of node "start". When a search request is transferred from the old node n to the new node, the new node n carries out a node searching processes according to a flowchart in FIG. 25 in the same way as the old node does.

As a result of node n having executed step S136 or S138, the node n returns a response to node "start". Then, having received the response, the controller 26 of the node "start" checks the contents of the response (the success or failure of the process of searching for storage location node "ObjNode" for object "Obj") (step 130). Then, the routing module 29 of node "start" terminates the node searching process (step S126).

Figure 23:
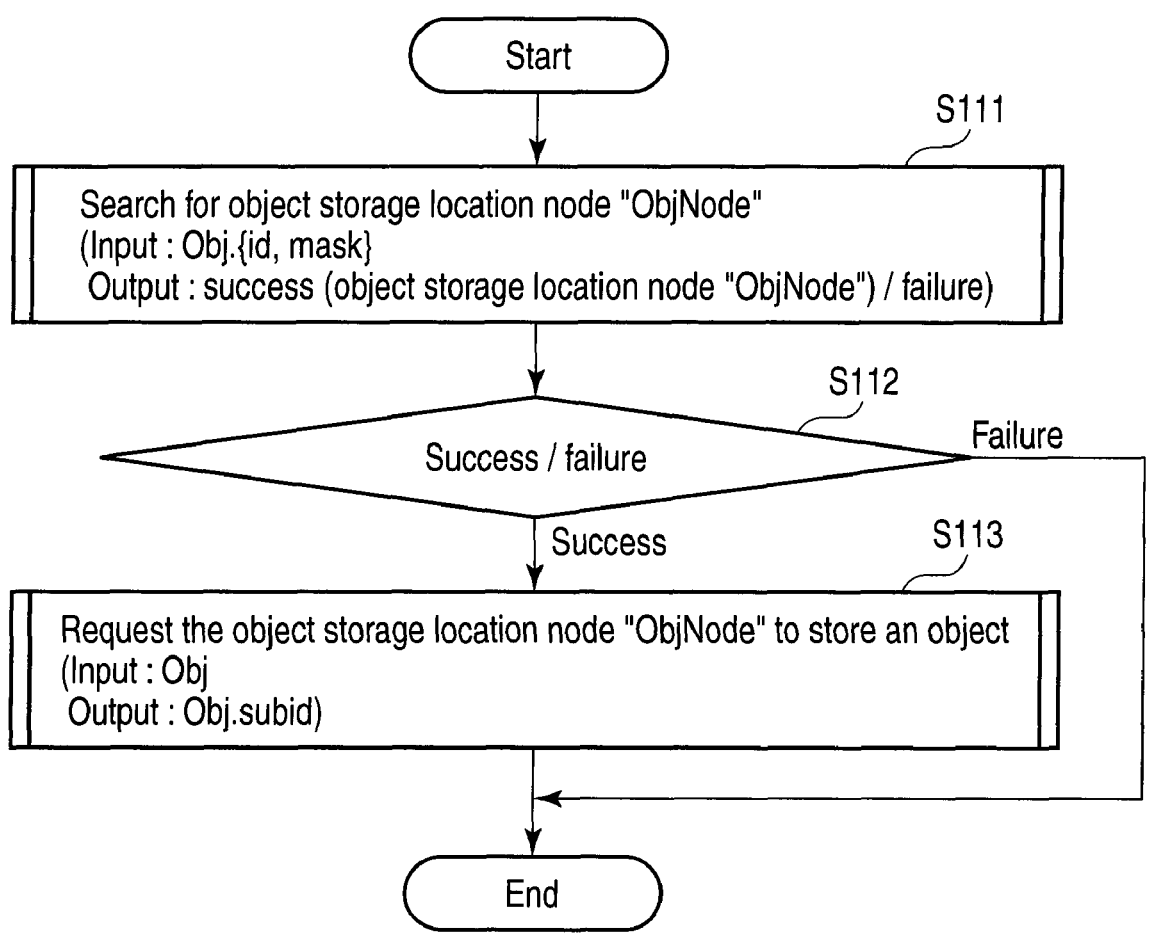
FIG. 23 is a flowchart to help explain an exemplary procedure for an object storing process in the third embodiment.

When node "start" (the routing module 29 of node "start") has completed the node searching process (the routing of an object) for searching for storage location node "ObjNode" shown by the flowchart of FIG. 24, that is, the node searching process in step S111 in the flowchart of FIG. 23, it determines whether the node searching process has succeeded or failed (step S112). If having failed in the node searching process, node "start" determines that storage location node "ObjNode" for object "Ojb" does not exist and terminates the object storing process.

In contrast, if having succeeded in the node searching process, that is, having succeeded in the routing of object "Obj," the object access module 30 included in the controller 26 of node "start" functions as an object storing module and requests a node (storage location node) "ObjNode" in which the object "Obj" is to be stored to store the object "Obj" (step S113). Having been requested to store object "Obj" by node "start", node "ObjNode" (the object access module 30 included in the controller 26 of node "ObjNode") executes an object storing process according to a flowchart shown in FIG. 26 as follows.

First, node "ObjNode" (the object access module 30 of node "ObjNode") generates a unique object sub-ID not allocated to an object already stored in the node "ObjNode" (step S141). In step S141, node "ObjNode" gives the generated ID as object sub-ID "Obj.subid" of the object "Obj" to the object "Obj" requested by node "start".

Next, node "ObjNode" stores object "Obj" to which "Obj.subid" has been given into the object storage unit 32 of the node "ObjNode" in the format of FIG. 22 (step S142). Then, node "ObjNode" returns a storage end response to node "start" which has required the storing of object "Obj" (step S143). The response includes object sub-ID given to object "Obj". That is, node "ObjNode" returns object sub-ID "Obj.subid" to node "start" which has requested the storing of object "Obj".

According to the third embodiment, the aforementioned series of processes enable the routing of an object (or the routing of a node in which an object is to be stored), while limiting a sub-overlay network at the storage location and decreasing the number of sub-overlay networks passed through.

<Taking Out an Object>

Next, a method of taking out an object applied in the third embodiment will be explained briefly using a case where the client 40 has given to node "start" (node 200-t(S)) an instruction to take out object "Obj". First, with object ID "Obj.id" of object "Obj" and the number of mask bits "Obj.mask" as inputs, node "start" (the routing module 29 of node "start") executes a node searching process for searching for the node "ObjNode" as in the case of the storing of object "Obj". As a result, IP address (ObjNode.addr) of node "ObjNode" is obtained.

Having searched for node "ObjNode", node "start" issues a taking-out request to the node "ObjNode". The taking-out request includes a pair of object ID "Obj.id" and the number of mask bits "Obj.mask" and object sub-ID "Obj.subid" of object "Obj". The object access module 30 of node "ObjNode" functions as an object taking-out module according to the taking-out request, takes out the requested object "Obj" from the object storage unit 32 of the node "ObjNode", and returns the object "Obj" to node "start". Node "start" returns object "Obj" given by node "ObjNode" to the client 40.

<Concrete Example of Searching for a Node in which an Object has been Stored>

Next, a concrete example of searching for a node (or searching for a node in which an object is to be stored) according to the flowcharts of FIGS. 24 and 25 will be explained with reference to FIG. 27. FIG. 27 shows an example of an overlay network system. In FIG. 27, six nodes 200-0, 200-1, 200-3, 200-4, 200-6, and 200-7 whose IDs are "{000, 001, 011, 100, 110, 111}" participate in (belong to) an overlay network 10 (the 0th overlay network 10). Nodes 200-0, 200-1, 200-3, 200-4, 200-6, and 200-7 correspond to nodes 20-0, 20-1, 20-3, 20-4, 20-6, and 20-7 shown in FIG. 2, respectively.

Nodes 200-0, 200-1, and 200-3 belong to sub-overlay network 11-0. Nodes 200-4, 200-6, and 200-7 belong to sub-overlay network 11-1. Of nodes 200-4, 200-6, and 200-7, node 2004 also belongs to sub-overlay network 110-0 and the remaining nodes 200-6 and 2007 also belong to sub-overlay network 111-1. That is, node 200-4 participates in sub-overlay network 110-0 and nodes 200-6 and 200-7 participate in sub-overlay network 11-1.

Suppose configuration information 50-t managed by nodes 200-0, 200-1, 200-3, 200-4, 200-6, and 200-7 is the same as configuration information 50-t managed by nodes 20-0, 20-1, 20-3, 20-4, 20-6, and 20-7 shown in FIG. 2. FIG. 27 also shows configuration information 50-7 (t=7) managed by node 200-7 whose ID is "111," configuration information 50-3 (t=3) managed by node 200-3 whose ID is "011," and configuration information 50-1 (t=1) managed by node 200-1 whose ID is "001".

Figure 27:
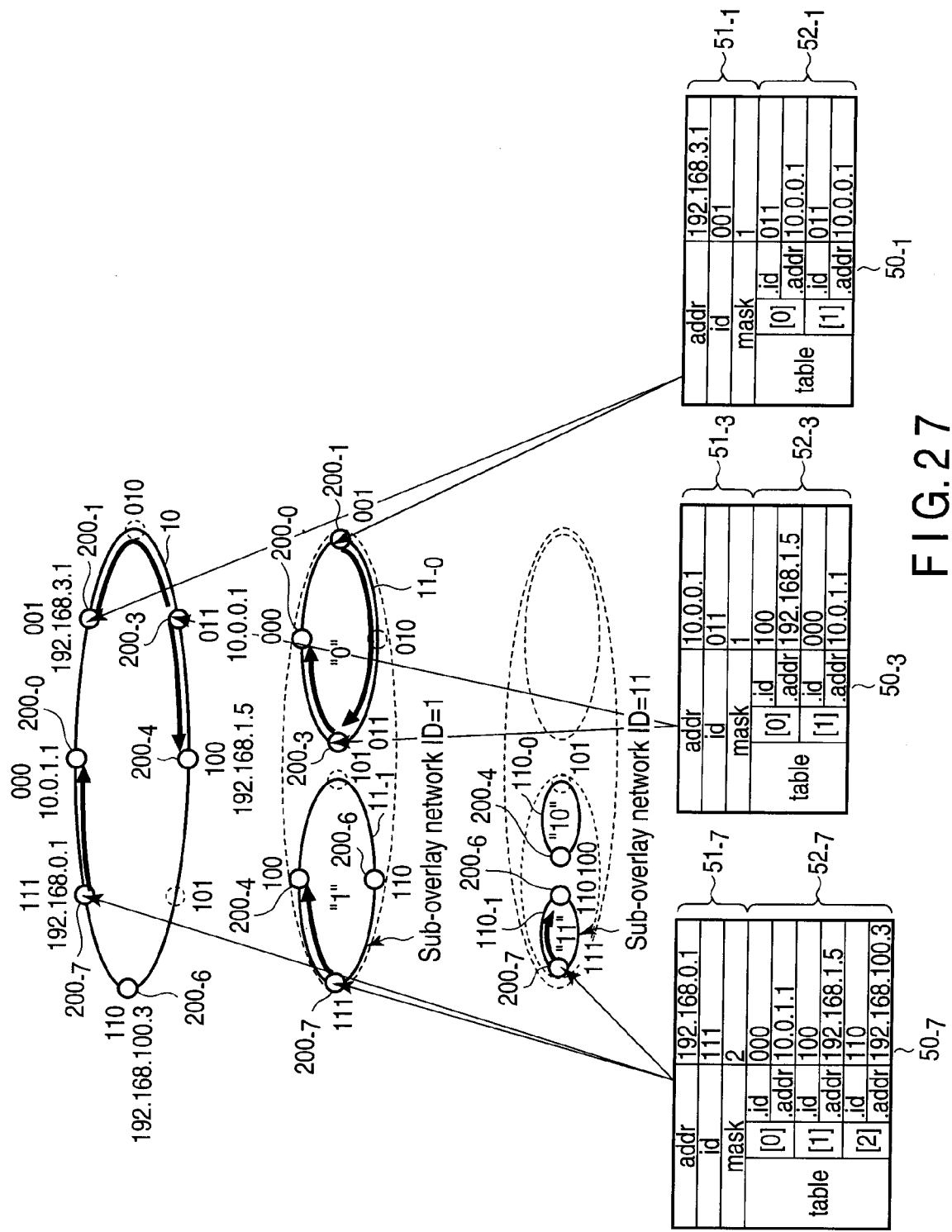
FIG. 27 shows an example of the hierarchical structure of the overlay network in the third embodiment together with an example of the data structure of configuration information managed by three of the nodes participating in the overlay network.

Suppose, in the overlay network system of FIG. 27, node "111" (node 200-7) whose ID (ID id) is "111" (the number of mask bits "mask=2)" and whose address (addr) is "192.168.0.1" performs the routing of objects whose object IDs are "{110, 101, 001}". It should be noted that the sub-overlay network ID (ID nwid) of node "111" (node 200-7) whose ID (ID id) is "111" (mask=2) is "11".

First, the routing of object "110" whose ID (ID id) is "110" will be explained. Node "111" (node 200-7) whose ID (ID id) is "111" compares ID (ID=110) of object "110" with ID "nwid" (ID nwid=11) of the node "111" itself from the highest-order bit sequentially, thereby counting the number of bits k (here, k=2) through which they coincide with one another consecutively, beginning with the highest-order bit (step S121). As a result, node "111" selects information on a second entry (table [2]) corresponding to the second-level sub-overlay network 110-1 from adjacent table 52-7 (t=7) managed by itself (step S122). Information on the entry (table[2]) is information (table[2].id=110, table.[2].addr= 192.168.100.3) on node "110" adjacent to node "111" on the second-level sub-overlay network 110-1.

Sub-overlay network ID "nwid" of object "110" is "11" and coincides with sub-overlay network ID "nwid" ("11") of node "111" (step S123). Moreover, "ring["id" of node "111," "id" of object "110," "id" of node "110" adjacent to node "111")," that is, "ring[111, 110, 110)" is not positive (step S124). In this case, node "111" transfers a request (search request) to search for a node (storage location node "ObjNode") in which object "110" is to be stored to node "110" (i.e., a node whose "table[2].id" is "110") adjacent to the node "111" (step S129).

Having received from node "111" the search request to search for a node in which object "110" is to be stored, node "110" (node 200-6) compares ID (ID=110) of the object "110" with ID "nwid" (ID nwid=11) of the node "110" itself from the highest-order bit sequentially, thereby counting the number of bits k (here, k=2) through which they coincide with one another consecutively, beginning with the highest-order bit (step S131). As a result, node "110" selects information on a second entry (table [2]) corresponding to the second-level sub-overlay network 110-1 from adjacent table 52-$t$ (t=6) managed by itself (step S132). That is, node "110" selects information on a node adjacent to node "110" on the second-level sub-overlay network 110-1.

In FIG. 27, adjacent table 52-$t$ (t=6) managed by node "110" is omitted. However, from the configuration of the overlay network in FIG. 27, it is clear that the selected node information is information (table[2].id=111, table[2].addr= 192.168.0.1) on node "111" adjacent to node "110" on the second-level sub-overlay network 110-1. Of the node IDs of node "111" and "110" participating in the second-level sub-overlay network 110-1, node ID (ID nid) closest to node ID "nid" (ID nid=0) included in ID (ID id=110) of object "110" is node ID (ID nid=0) of node "110".

Here, sub-overlay network ID "nwid" of object "110" is "11" and coincides with sub-overlay network ID "nwid" ("11") of node "110" (step S133). Moreover, "ring["id" of node "110," "id" of object "110," "id" of node "111" adjacent to node "110")", that is, "ring[110, 110, 111)" is positive (step S134).

In this case, node "110" determines that storage location node "ObjNode" is the node "110" itself (step S135). Then, node "110" determines that node "110" itself is a node (storage location node "ObjNode") in which object "110" is to be stored and returns a response including its IP address to node "111" (step S136).

In this way, object "110" is routed to node "110" whose node ID (ID nid=0) is closest to node ID "nid" (ID nid=0) of the object "110". Node "110" is one of node "111" and node "110" participating in the second level sub-overlay network 110-1 and has an ID (ID "id") of "110". Here, the routing can be performed without going through the first-level sub-overlay network 11-1 including the second-level sub-overlay network 110-1 and through the 0th-level sub-overlay network 10.

Next, the routing of object "101" whose ID (ID id) is "101" will be explained. Node "111" (node 200-7) compares ID (ID=101) of object "101" with ID "nwid" (ID nwid=11) of the node "111" itself from the highest-order bit sequentially, thereby counting the number of bits k (here, k=1) through which they coincide with one another consecutively, beginning with the highest-order bit (step S121). As a result, node "111" selects information on a first entry (table [1]) corresponding to the first-level sub-overlay network 11-1 from adjacent table 52-7 (t=7) managed by itself (step S122). That is, node "111" selects information (table[1].id=100, table.[1].addr=192.168.1.5) on node "100" adjacent to the node "111" on the first-level sub-overlay network 11-1.

Sub-overlay network ID "nwid" of object "101" is "10" and does not coincide with sub-overlay network ID "nwid" ("11") of node "111" (step S123). Moreover, "ring["id$^k$" of node "111," "id$^k$" of object "101," "id$^k$" of node "100" adjacent to node "111")," that is, "ring[1, 1, 1)" is not positive (step S124). In this case, node "111" transfers a search request to search for a node in which object "101" is to be stored to node "100" (i.e., a node whose "table[1].id" is "100") adjacent to the node "111" (step S129).

Having received the search request to search for a node in which object "101" is to be stored from node "111," node "100" (node 200-4) compares ID (ID=101) of the object "101" with ID "nwid" (ID nwid=10) of the node "100" itself from the highest-order bit sequentially, thereby counting the number of bits k (here, k=2) through which they coincide with one another consecutively, beginning with the highest-order bit (step S131). As a result, node "100" selects information on a second entry (table [2]) corresponding to the second-level sub-overlay network 110-0 from adjacent table 52-$t$ (t=4) managed by itself (step S132). That is, node "100" selects information on a node adjacent to node "100" on the second-level sub-overlay network 110-0.

In FIG. 27, adjacent table 52-$t$ (t=4) managed by node "100" is omitted. However, from the configuration of the overlay network in FIG. 27, it is clear that what is adjacent to the node "100" on the second-level sub-overlay network 110-0 is the node "100" itself. Therefore, the selected node information is information (table[2].id=100, table[2].addr= 192.168.1.5) on node "100". The node "100" has node ID (ID nid) closest to node ID "nid" (ID nid=1) of object "101" on the second-level sub-overlay network 110-0.

Sub-overlay network ID "nwid" of object "101" is "10" and coincides with sub-overlay network ID "nwid" ("10") of node "100" (step S133). Moreover, "ring["id" of node "100," "id" of object "101," "id" of the node "100" itself adjacent to node "100")," that is, "ring[100, 101, 100)" is positive because "101" satisfies the condition that it fits into a range of "[100, 100)" on the ring (step S134).

In this case, node "100" determines that storage location node "ObjNode" is the node "100" itself (step S135). Then, node "100" determines that node "100" itself is a node (storage location node "ObjNode") in which object "101" is to be stored and returns a response including its IP address to node "111" (step S136).

As described above, since node "100" (i.e., the only node "100" participating in the second-level sub-overlay network 110-0) is a node having a node ID closest to node ID "nid" (ID nid=1) of object "101," object "101" is routed to the node "100". Here, the routing can be performed without going through the 0th-level sub-overlay network 10 including the first-level sub-overlay network 11-1 and second-level sub-overlay network 110-0.

Next, the routing of object "001" whose ID (ID id) is "001" will be explained. Node "111" (node 200-7) compares ID (ID=001) of object "001" with ID "nwid" (ID nwid=11) of the node "111" itself from the highest-order bit sequentially, thereby counting the number of bits k through which they coincide with one another consecutively, beginning with the highest-order bit (step S121). In this case, there are no bits through which they coincide with one another. That is, the result of the counting is zero (k=0). As a result, node "111" selects information on a 0th entry (table [0]) corresponding to the 0th-level sub-overlay network 10 from adjacent table 52-7 (t=7) managed by itself (step S122). That is, node "111" selects information (table[0].id=000, table.[0].addr= 10.0.1.1) on node "000" adjacent to node "111" on the 0th-level sub-overlay network 10.

Sub-overlay network ID "nwid" of object "001" is "0" and does not coincide with sub-overlay network ID "nwid" ("11") of node "111" (step S123). Moreover, "ring["id$^k$", of node "111," "id$^k$" of object "001," "id$^k$" of node "000" adjacent to node "111")" is not positive because k=0 (step S124). In this case, node "111" transfers a search request to search for a node in which object "001" is to be stored to node "000" (i.e., a node whose "table[0].id" is "000") adjacent to the node "111" (step S129).

Having received the search request to search for a node in which object "001" is to be stored from node "111," node "000" (node 200-0) compares ID (ID=001) of the object "001" with ID "nwid" (ID nwid=10) of the node "000" itself from the highest-order bit sequentially, thereby counting the number of bits k (here, k=1) through which they coincide with one another consecutively, beginning with the highest-order bit (step S131). As a result, node "000" selects information on a first entry (table [1]) corresponding to the first-level sub-overlay network 11-0 from adjacent table 52-$t$ (t=0) managed by itself (step S132). That is, node "000" selects information on a node adjacent to the node "000" on the first-level sub-overlay network 11-0.

In FIG. 27, adjacent table 52-$t$ (t=0) managed by node "000" is omitted. However, from the configuration of the overlay network in FIG. 27, it is clear that the selected node information is information (table[1].id=001, table[1].addr= 192.168.3.1) on node "001" adjacent to node "000" on the first-level sub-overlay network 11-0. The node "001" has node ID (ID nid) closest to node ID "nid" (ID nid=01) of object "001" among node "000," node "001," and node "011" participating in the first-level sub-overlay network 11-0.

Sub-overlay network ID "nwid" of object "001" is "0" and coincides with sub-overlay network ID "nwid" ("0") of node "000" (step S133). Moreover, "ring["id" of node "000," "id" of object "001," "id" of node "001" adjacent to node "000")," that is, "ring[000, 001, 001)" is not positive (step S134). In this case, node "000" transfers a search request for a node in which object "001" is to be stored to node "001" (i.e., a node whose "table[1].id" is "001") adjacent to the node "000" (step S139).

Having received the search request to search for a node in which object "001" is to be stored from node "000," node "001" (node 200-1) compares ID (ID=001) of the object "001" with ID "nwid" (ID nwid=0) of the node "001" itself from the highest-order bit sequentially, thereby counting the number of bits k (here, k=1) through which they coincide with one another consecutively, beginning with the highest-order bit (step S131). As a result, node "001" selects information on a first entry (table [1]) corresponding to the first-level sub-overlay network 11-0 from adjacent table 52-1 (t=1) managed by itself (step S132). That is, node "001" selects information (table[1].id=011, table[1].addr=10.0.0.1) on node "011" adjacent to node "001" on the first-level sub-overlay network 11-0.

Sub-overlay network ID "nwid" of object "001" is "0" and coincides with sub-overlay network ID "nwid" ("0") of node "011" (step S133). Moreover, "ring["id" of node "001," "id" of object "001," "id" of node "011" adjacent to node "001")," that is, "ring[001, 001, 011)" is positive (step S134).

In this case, node "001" determines that storage location node "ObjNode" is the node "001" itself (step S135). Then, node "001" determines that node "001" itself is a node (storage location node "ObjNode") in which object "101" is to be stored and returns a response including its IP address to node "111" (step S136).

As described above, object "001" is routed to node "001" whose node ID is closest to node ID "nid" (ID nid=01) of the object "001" among node "000," node "001," and node "011" participating in the first-level sub-overlay network and whose ID (ID "id") is "001". Here, the routing can be performed without going through the 0th-level sub-overlay network 10 including the first-level sub-overlay network 11-0.

As seen from the explanation, in the third embodiment, the routing of an object (a search for a node in which an object is to be stored) never fails to end in the specified sub-overlay network. That is, an object storage location can be limited. Here, a sub-overlay network in which a node that performs the routing of an object (hereinafter, referred to as a first node) participates is referred to as a first sub-overlay network. A state where a node at the routing destination (hereinafter, referred to as a second node) also participates in the first sub-overlay network is referred to as a first state. In contrast, a state where the second node (a node at the routing destination) does not participate in the first sub-overlay network is referred to as a second state. Furthermore, another sub-overlay network included in a higher-level sub-overlay network (i.e., a sub-overlay network higher in level than the first sub-overlay network) in which the first and second nodes both participate is referred to as a second sub-overlay network.

With the third embodiment, in the first state, routing can be performed without going through sub-overlay networks excluding the first sub-overlay network. Moreover, with the third embodiment, in the second state, too, if the second node has participated in the second sub-overlay network, routing can be performed without going through another sub-overlay network included in a sub-overlay network higher in level than the second sub-overlay network.

In the third embodiment, to search for a node in which an object is to be stored, a skip table 523-$t$ as applied in the second embodiment may be used. In this case, a search for a node in which an object is to be stored can be made with a smaller number of hops than in the third embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An overlay network system comprising:
   an overlay network composed of a plurality of nodes;
   a plurality of sub-overlay networks each of which is composed of a subset of said plurality of nodes and which are hierarchized, the plurality of sub-overlay networks being included in a hierarchical structure where the overlay network is a 0th-level sub-overlay network at the highest hierarchical level, each of the plurality of sub-overlay networks being allocated a sub-overlay network ID for identifying said each of the plurality of sub-overlay networks, the number of bits in the sub-overlay network ID corresponding to the hierarchical level of a sub-overlay network to which the sub-overlay network ID is allocated, the high-order one or more bits in the sub-overlay network ID also indicating the sub-overlay network ID of a sub-overlay network whose hierarchical level not only is higher than that of the sub-overlay network allocated the sub-overlay network ID but also corresponds to the number of the one or more bits, wherein each of the plurality of nodes includes:

a configuration storage unit configured to store an adjacent table, the adjacent table holding IDs and addresses of one or more nodes for each of the hierarchical levels of the sub-overlay networks ranging from a mask-level sub-overlay network to the 0th-level sub-overlay network in the hierarchical structure, the one or more nodes adjoining said each of the plurality of nodes when the IDs of all the nodes included in a sub-overlay network at a corresponding hierarchical level are arranged in a ring in order of magnitude of the IDs, and the mask-level sub-overlay network being the deepest-hierarchical-level one of the plurality of sub-overlay networks which includes said each of the plurality of nodes;

a management module which is configured to manage the ID of said each of the plurality of nodes using the adjacent table and which is further configured to manage not only the ID of said each of the plurality of nodes as an ID composed of the sub-overlay network ID of the mask-level sub-overlay network and node ID of said each of the plurality of nodes but also the sub-overlay network ID of the mask-level sub-overlay network as the sub-overlay network ID of a sub-overlay network in which said each of the plurality of nodes participates, and the node ID of said each of the plurality of nodes being distinguishable from node IDs of other nodes included in the mask-level sub-overlay network; and a routing module which is configured to perform routing for a first node to obtain an address of a second node and which is further configured to obtain the address of the second node on the basis of information in the adjacent table corresponding to the hierarchical level of a sub-overlay network in which the second node participates or a sub-overlay network including the sub-overlay network in which the second node participates by referring to the adjacent table possessed by the first node, using the ID of the second node as an input, the first node being said each of the plurality of nodes, and the second node being an arbitrary one of the plurality of nodes.

2. The overlay network system according to claim 1, wherein the routing module is configured to use an address of a node adjacent to the first node held in the adjacent table when having failed to obtain the address of the second node, thereby requesting the adjacent node to obtain the address of the second node.

3. The overlay network system according to claim 2, wherein:

the ID of each of the plurality of nodes has a length of M bits and is unique in the entire overlay network, the high-order "mask" bits in the ID indicating the sub-overlay network ID of the mask-level sub-overlay network in which said each of the plurality of nodes participates, and the low-order "M-mask" bits in the ID indicating the node ID of said each of the plurality of nodes distinguishable from node IDs of other nodes included in the mask-level sub-overlay network; and the management module of the first node is configured to manage the sub-overlay network ID of the mask-level sub-overlay network in which the first node participates on the basis of the ID of the first node and the number of mask bits "mask".

4. The overlay network system according to claim 3, wherein the routing module is configured to select and use information in the adjacent table corresponding to a second sub-overlay network to obtain the address of the second node, the second sub-overlay network being the deepest-hierarchical-level one of the sub-overlay networks common to a sub-overlay network in which the second node participates and the sub-overlay network including the sub-overlay network in which the second node participates and to a first sub-overlay network and a sub-overlay network including the first sub-overlay network, and the first sub-overlay network being the mask-level sub-overlay network in which the first node participates.

5. The overlay network system according to claim 4, wherein the routing module is configured to count the maximum number of bits k through which the sub-overlay network ID indicated by the ID of the second node coincides with the sub-overlay network ID indicated by the ID of the first node consecutively from the highest-order bit and determines a kth-level sub-overlay network indicated by the counted maximum number of bits k to be the second sub-overlay network.

6. The overlay network system according to claim 1, wherein:

the configuration storage unit is configured to store a skip table which holds the IDs and addresses of a plurality of skip nodes for said each of the plurality of nodes, the plurality of skip nodes being arbitrary ones of the plurality of nodes and including a node not adjoining said each of the plurality of nodes when the IDs of the plurality of nodes are arranged in a ring in order of magnitude of the IDs; and the routing module is configured to refer to the skip table at the time of routing to obtain the address of the second node and obtain the address of the second node on the basis of information in the skip table and, if having failed to obtain the address of the second node, use one of the addresses of the plurality of skip nodes held in the skip table and request a skip node indicated by the one of the addresses to obtain the address of the second node.

7. The overlay network system according to claim 6, wherein the plurality of skip nodes include other nodes participating in the mask-level sub-overlay network in which a node with the skip table holding the IDs and addresses of the plurality of skip nodes participates.

8. The overlay network system according to claim 7, wherein the plurality of skip nodes also include other nodes included in a sub-overlay network including the mask-level sub-overlay network in which a node with the skip table holding the IDs and addresses of the plurality of skip nodes participates.

9. The overlay network system according to claim 8, wherein the routing module is configured to select information in the skip table corresponding to a second sub-overlay network when having failed to obtain the address of the second node and use the selected information in the skip table to determine a skip node which is requested to obtain the address of the second node, the second sub-overlay network being the deepest-hierarchical-level one of the sub-overlay networks common to a sub-overlay network in which the second node participates and a sub-overlay network including the sub-overlay network in which the second node participates and to a first sub-overlay network and a sub-overlay network including the first sub-overlay network, and the first sub-overlay network being the mask-level sub-overlay network in which the first node participates.

10. The overlay network system according to claim 1, wherein said each of the plurality of nodes further includes:

an object storage unit for storing a plurality of objects; and an object storing module configured to store an arbitrary object into the object storage unit of any one of the plurality of nodes, wherein each of the plurality objects is allocated a unique ID composed of an object ID used to determine a storage location node and an object sub-ID for identifying the object in the storage location node, the storage location node being a node in which each of the plurality of objects is to be stored, and the object ID being composed of a sub-overlay network ID specifying a sub-overlay network in which the storage location node participates and a node ID specifying the storage location node, and in the process of storing an arbitrary object, the object storing module is configured to cause the routing module to search for a node whose node ID is closest to the node ID in the object ID of the arbitrary object when the node IDs of all the nodes participating in a sub-overlay network whose sub-overlay network ID is the same as the sub-overlay network ID in the object ID of the arbitrary object are arranged in a ring in order of magnitude of the IDs, and store the arbitrary object into the node searched for.

11. A method of constructing and maintaining an overlay network in an overlay network system, the overlay network system including an overlay network composed of a plurality of nodes and a plurality of sub-overlay networks, the plurality of sub-overlay networks being hierarchized, the plurality of sub-overlay networks being included in a hierarchical structure where the overlay network is a 0th-level sub-overlay network at the highest hierarchical level, each of the plurality of sub-overlay networks being allocated a sub-overlay network ID for identifying said each of the plurality of sub-overlay networks, the number of bits in the sub-overlay network ID corresponding to the hierarchical level of a sub-overlay network to which the sub-overlay network ID is allocated, the high-order one or more bits in the sub-overlay network ID also indicating the sub-overlay network ID of a sub-overlay network whose hierarchical level not only is higher than that of the sub-overlay network allocated the sub-overlay network ID but also corresponds to the number of the one or more bits, the method comprising:

inquiring, by a first node, a node adjacent to the first node from a second node, the first node being a new node participating in a mask-level one of the plurality of sub-overlay networks, and the second node being an arbitrary one of the plurality of nodes;

in response to the inquiry made by the first node, determining whether the second node adjoins the first node for each of the hierarchical levels of the sub-overlay networks ranging from the mask-level sub-overlay network to the 0th-level sub-overlay network, the determining including referring to a second adjacent table stored in a configuration storage unit possessed by the second node, the second adjacent table holding the IDs and addresses of one or more nodes for each of the hierarchical levels of the sub-overlay networks ranging from a sub-overlay network in which the second node participates to the 0th-level sub-overlay network, if the deepest-hierarchical-level sub-overlay network including the second node in the hierarchical structure is a sub-overlay network in which the second node participates, and the one and more nodes adjoining the second node when the IDs of all the nodes included in the sub-overlay network of the corresponding hierarchical level are arranged in order of magnitude of the IDs;

updating, by the second node, information in a first adjacent table and information in the second adjacent table each corresponding to the hierarchical level at which the second node is determined to be adjacent to the first node, the first adjacent table being stored in a configuration storage unit possessed by the first node and having a structure corresponding to the second adjacent table;

after the determining and the updating, transferring, by the second node, the inquiry made by the first node to a node adjacent to the second node on the 0th-level sub-overlay network; and when a third node has to obtain an address of a fourth node, executing, by the third node, routing to obtain the address of the fourth node on the basis of information in a third adjacent table, the third node being an arbitrary one of the plurality of nodes, the fourth node being another arbitrary one of the plurality of nodes, the executing including referring to the third adjacent table, using the ID of the fourth node as an input, the third adjacent table being stored in a configuration storage unit possessed by the third node and having a structure corresponding to the first adjacent table, information in the third adjacent table corresponding to the hierarchical level of a sub-overlay network in which the fourth node participates or a sub-overlay network including a sub-overlay network in which the fourth node participates, the ID of the fourth node being composed of the sub-overlay network ID of a sub-overlay network in which the fourth node participates and node ID of the fourth node, and the node ID of the fourth node being distinguishable from node IDs of other nodes included in a sub-overlay network in which the fourth node participates.

12. The method according to claim 11, further comprising using an address of a node adjacent to the third node held in the third adjacent table when having failed to obtain the address of the fourth node, thereby requiring, by the third node, a node adjacent to the third node to obtain the address of the fourth node.

13. The method according to claim 12, wherein:

the ID of each of the plurality of nodes has a length of M bits and is unique in the entire overlay network, the high-order "mask" bits in the ID indicating the sub-overlay network ID of the mask-level sub-overlay network in which said each of the plurality of nodes participates, and the low-order "M-mask" bits in the ID indicating the node ID of said each of the plurality of nodes distinguishable from node IDs of other nodes included in the mask-level sub-overlay network; and the first node manages the sub-overlay network ID of the mask-level sub-overlay network in which the first node participates on the basis of the ID of the first node and the number of mask bits "mask".

14. The method according to claim 13, wherein the information in the third adjacent table corresponds to the deepest-hierarchical-level one of the sub-overlay networks common to a sub-overlay network in which the fourth node participates and a sub-overlay network including the sub-overlay network in which the fourth node participates and to a sub-overlay network in which the third node participates and a sub-overlay network including the sub-overlay network in which the third sub-overlay network participates.

15. The method according to claim 14, wherein the executing includes counting the maximum number of bits k through which the sub-overlay network ID indicated by the ID of the fourth node coincides with the sub-overlay network ID indicated by the ID of the third node consecutively from the highest-order bit, and selecting a kth-level sub-overlay network indicated by the counted maximum number of bits k as the deepest-hierarchical-level one of the common sub-overlay networks.

16. The method according to claim 11, wherein the executing includes obtaining the address of the fourth node on the basis of information in a skip table holding the IDs and addresses of a plurality of skip nodes for the third node, the skip table being stored in the configuration storage unit possessed by the third node, the plurality of skip nodes being arbitrary ones of the plurality of nodes and including a node not adjoining the third node when the IDs of the plurality of nodes are arranged in a ring in order of magnitude of the IDs.

17. The method according to claim 16, wherein the executing includes using one of the addresses of the plurality of skip nodes held in the skip table when having failed to obtain the address of the fourth node, thereby requiring, by the third node, a skip node indicated by one of the addresses to obtain the address of the fourth node.

18. A Non-transistory computer-readable storage medium storing a computer program product which implements a method of constructing and maintaining an overlay network in an overlay network system, the overlay network system including an overlay network composed of a plurality of nodes including a first node and a plurality of sub-overlay networks, the plurality of sub-overlay networks being hierarchized, each of the plurality of sub-overlay networks included in a hierarchical structure where the overlay network is a 0th-level sub-overlay network at the highest hierarchical level being allocated a sub-overlay network ID for identifying said each of the plurality of sub-overlay networks, the number of bits in the sub-overlay network ID corresponding to the hierarchical level of a sub-overlay network to which the sub-overlay network ID is allocated, the high-order one or more bits in the sub-overlay network ID also indicating the sub-overlay network ID of a sub-overlay network whose hierarchical level not only is higher than that of the sub-overlay network allocated the sub-overlay network ID but also corresponds to the one or more bits, the computer-readable storage medium being used in a storage device possessed by the first node, the method comprising:

when a second node inquires a node adjacent to the second node from the first node, determining by the first node whether the second node adjoins the first node for each of the hierarchical levels of the sub-overlay networks ranging from a mask-level sub-overlay network to the 0th-level sub-overlay network, the second node being a new node participating in the mask-level one of the plurality of sub-overlay networks, the determining including referring, by the first node, to a first adjacent table stored in a configuration storage unit possessed by the first node, the first adjacent table holding the IDs and addresses of a node adjacent to the first node when the IDs of all the nodes included in the sub-overlay network at the corresponding level are arranged in a ring in order of magnitude of the IDs for each of the hierarchical levels of the sub-overlay networks ranging from a sub-overlay network in which the first node participates to the 0th-level sub-overlay network, if the deepest-hierarchical-level sub-overlay network including the first node in the hierarchical structure is a sub-overlay network in which the first node participates;

updating, by the first node, information in the first adjacent table and information in a second adjacent table each corresponding to the hierarchical level at which the first node is determined to be adjacent to the second node, the second adjacent table being stored in a configuration storage unit possessed by the second node and having a structure corresponding to the first adjacent table;

after the determining and the updating, transferring, by the second node, the inquiry made by the first node to a third node, the third node being a node adjacent to the first node on the 0th-level sub-overlay network; and when the first node has to obtain an address of a fourth node, executing, by the first node, routing to obtain the address of the fourth node on the basis of information in the first adjacent table, the fourth node being an arbitrary one of the plurality of nodes, the executing including referring, by the first node, to the first adjacent table, using the ID of the fourth node as an input, information in the first adjacent table corresponding to the hierarchical level of a sub-overlay network in which the fourth node participates or a sub-overlay network including the sub-overlay network in which the fourth node participates, the ID of the fourth node being composed of the sub-overlay network ID of a sub-overlay network in which the fourth node participates and node ID of the fourth node, and the node ID of the fourth node being distinguishable from node IDs of other nodes included in a sub-overlay network in which the fourth node participates.

19. The Non-transistory computer-readable storage medium according to claim 18, wherein the method further comprising using an address of a node adjacent to the first node held in the first adjacent table when having failed to obtain the address of the fourth node, thereby requiring, by the first node, the node adjacent to the first node to obtain the address of the fourth node.

* * * * *

UNITED STATES PATENT AND TRADEMARK OFFICE
CERTIFICATE OF CORRECTION

PATENT NO. : 7,773,609 B2  
APPLICATION NO. : 12/332749  
DATED : August 10, 2010  
INVENTOR(S) : Kobara Page 1 of 1

It is certified that error appears in the above-identified patent and that said Letters Patent is hereby corrected as shown below:

In the Claims:

Claim 10, column 43, line 4, change "plurality objects" to --plurality of objects--.

Claim 18, column 45, line 20, change "A Non-transistory" to --A non-transitory--.

Claim 19, column 46, line 42, change "The Non-transistory" to --The non-transitory--.

Claim 19, column 46, line 44, change "comprising" to --comprises--.

Signed and Sealed this  
Eleventh Day of June, 2013

Teresa Stanek Rea  
*Acting Director of the United States Patent and Trademark Office*